(12) United States Patent
Nichols

(10) Patent No.: US 9,125,169 B2
(45) Date of Patent: Sep. 1, 2015

(54) METHODS AND SYSTEMS FOR PERFORMING ACTIONS BASED ON LOCATION-BASED RULES

(71) Applicant: Rovi Guides, Inc., Santa Clara, CA (US)

(72) Inventor: Michael R. Nichols, La Canada Flintridge, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/316,499

(22) Filed: Jun. 26, 2014

(65) Prior Publication Data

US 2014/0342759 A1 Nov. 20, 2014

Related U.S. Application Data

(63) Continuation of application No. 13/336,678, filed on Dec. 23, 2011, now Pat. No. 8,805,418.

(51) Int. Cl.
| | |
|---|---|
| *H04W 24/00* | (2009.01) |
| *H04W 64/00* | (2009.01) |
| *H04W 4/02* | (2009.01) |
| *H04L 29/08* | (2006.01) |
| *G06Q 10/06* | (2012.01) |

(Continued)

(52) U.S. Cl.
CPC ............ *H04W 64/00* (2013.01); *G06Q 10/06* (2013.01); *G06Q 50/00* (2013.01); *H04L 65/4084* (2013.01); *H04L 67/18* (2013.01); *H04L 67/306* (2013.01); *H04N 21/25841* (2013.01); *H04N 21/41407* (2013.01); *H04N 21/4524* (2013.01); *H04N 21/4532* (2013.01); *H04N 21/4782* (2013.01); *H04N 21/482* (2013.01); *H04N 21/812* (2013.01); *H04W 4/021* (2013.01)

(58) Field of Classification Search
CPC ....... H04W 4/02; H04W 64/00; H04W 4/021; H04L 67/306
USPC .......... 455/456.1, 456.2, 456.3, 456.4, 456.5, 455/456.6
See application file for complete search history.

(56) References Cited

U.S. PATENT DOCUMENTS

| | | | |
|---|---|---|---|
| 4,024,401 A | 5/1977 | Bernstein | |
| 4,079,419 A | 3/1978 | Siegle | |

(Continued)

FOREIGN PATENT DOCUMENTS

| | | |
|---|---|---|
| AU | 731010 | 7/1998 |
| AU | 733993 | 2/1999 |

(Continued)

OTHER PUBLICATIONS

U.S. Appl. No. 08/900,417, filed Jul. 25, 1997, Daniels.

(Continued)

*Primary Examiner* — Khalid Shaheed
(74) *Attorney, Agent, or Firm* — Ropes & Gray LLP

(57) ABSTRACT

Methods and systems for performing actions based on location-based rules are provided. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified. Based on the location-based rule, the location, and the entertainment profile of the user, the action may be performed.

18 Claims, 14 Drawing Sheets

(51) Int. Cl.
*G06Q 50/00* (2012.01)
*H04L 29/06* (2006.01)
*H04N 21/258* (2011.01)
*H04N 21/414* (2011.01)
*H04N 21/45* (2011.01)
*H04N 21/4782* (2011.01)
*H04N 21/482* (2011.01)
*H04N 21/81* (2011.01)

(56) References Cited

U.S. PATENT DOCUMENTS

| | | |
|---|---|---|
| 4,081,753 A | 3/1978 | Miller |
| 4,081,754 A | 3/1978 | Jackson |
| 4,103,524 A | 8/1978 | Mitchell |
| 4,162,513 A | 7/1979 | Beyers, Jr. |
| 4,170,782 A | 10/1979 | Miller |
| 4,193,120 A | 3/1980 | Yello |
| 4,206,483 A | 6/1980 | Nakamura |
| 4,264,924 A | 4/1981 | Freeman |
| 4,264,925 A | 4/1981 | Freeman |
| 4,267,563 A | 5/1981 | Sato |
| 4,271,532 A | 6/1981 | Wine |
| 4,280,148 A | 7/1981 | Saxena |
| 4,287,539 A | 9/1981 | Bixby |
| 4,300,040 A | 11/1981 | Gould |
| 4,305,101 A | 12/1981 | Yarbrough |
| 4,310,924 A | 1/1982 | Miyasaka |
| 4,325,081 A | 4/1982 | Abe |
| 4,331,974 A | 5/1982 | Cogswell |
| 4,334,242 A | 6/1982 | Mangold |
| 4,355,415 A | 10/1982 | George |
| 4,367,559 A | 1/1983 | Tults |
| 4,375,651 A | 3/1983 | Templin |
| 4,381,522 A | 4/1983 | Lambert |
| 4,385,210 A | 5/1983 | Marguiss |
| 4,390,901 A | 6/1983 | Keiser |
| 4,422,105 A | 12/1983 | Rodesch |
| 4,425,579 A | 1/1984 | Merrell |
| 4,429,385 A | 1/1984 | Cichelli |
| 4,435,842 A | 3/1984 | Mayumi |
| 4,449,249 A | 5/1984 | Price |
| 4,475,153 A | 10/1984 | Kiihara |
| 4,488,179 A | 12/1984 | Krüger |
| 4,495,654 A | 1/1985 | Deiss |
| 4,510,623 A | 4/1985 | Bonneau |
| 4,519,003 A | 5/1985 | Scholz |
| 4,527,194 A | 7/1985 | Sirazi |
| 4,536,791 A | 8/1985 | Campbell |
| 4,554,584 A | 11/1985 | Elam |
| 4,573,072 A | 2/1986 | Freeman |
| 4,593,414 A | 6/1986 | Koyanagi |
| 4,598,288 A | 7/1986 | Yarbrough |
| 4,602,279 A | 7/1986 | Freeman |
| 4,605,964 A | 8/1986 | Chard |
| 4,605,973 A | 8/1986 | Von Kohorn |
| 4,621,259 A | 11/1986 | Schepers |
| 4,625,080 A | 11/1986 | Scott |
| 4,630,108 A | 12/1986 | Gomersall |
| 4,631,601 A | 12/1986 | Brugliera |
| 4,635,121 A | 1/1987 | Hoffman |
| 4,638,424 A | 1/1987 | Beglin |
| 4,641,203 A | 2/1987 | Miller |
| 4,641,205 A | 2/1987 | Beyers, Jr. |
| 4,645,873 A | 2/1987 | Chomet |
| 4,677,501 A | 6/1987 | Saltzman |
| 4,680,647 A | 7/1987 | Moriyama |
| 4,685,131 A | 8/1987 | Horne |
| 4,689,022 A | 8/1987 | Peers |
| 4,691,351 A | 9/1987 | Hayashi |
| 4,694,490 A | 9/1987 | Harvey |
| 4,704,725 A | 11/1987 | Harvey |
| 4,706,121 A | 11/1987 | Young |
| 4,718,107 A | 1/1988 | Hayes |
| RE32,632 E | 3/1988 | Atkinson |
| 4,745,549 A | 5/1988 | Hashimoto |
| 4,750,036 A | 6/1988 | Martinez |
| 4,750,213 A | 6/1988 | Novak |
| 4,751,578 A | 6/1988 | Reiter |
| 4,754,326 A | 6/1988 | Kram |
| 4,755,883 A | 7/1988 | Uehira |
| 4,761,684 A | 8/1988 | Clark |
| 4,771,375 A | 9/1988 | Beglin |
| 4,775,935 A | 10/1988 | Yourick |
| 4,787,063 A | 11/1988 | Muguet |
| 4,802,022 A | 1/1989 | Harada |
| 4,829,558 A | 5/1989 | Welsh |
| 4,832,373 A | 5/1989 | Swan |
| 4,837,584 A | 6/1989 | Sharkey |
| 4,841,132 A | 6/1989 | Kajitani |
| 4,841,562 A | 6/1989 | Lem |
| 4,843,482 A | 6/1989 | Hegendorfer |
| 4,847,696 A | 7/1989 | Matsumoto |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,873,584 A | 10/1989 | Hashimoto |
| 4,879,611 A | 11/1989 | Fulcui |
| 4,882,732 A | 11/1989 | Kaminaga |
| 4,885,579 A | 12/1989 | Sandbank |
| 4,890,321 A | 12/1989 | Seth-Smith |
| 4,894,789 A | 1/1990 | Yee |
| 4,899,370 A | 2/1990 | Kameo |
| 4,908,707 A | 3/1990 | Kinghorn |
| 4,908,713 A | 3/1990 | Levine |
| 4,920,432 A | 4/1990 | Eggers |
| 4,930,158 A | 5/1990 | Vogel |
| 4,930,160 A | 5/1990 | Vogel |
| 4,937,806 A | 6/1990 | Babson |
| 4,945,563 A | 7/1990 | Horton |
| 4,947,244 A | 8/1990 | Fenwick |
| 4,949,187 A | 8/1990 | Cohen |
| 4,959,719 A | 9/1990 | Strubbe |
| 4,959,720 A | 9/1990 | Duffield |
| 4,963,994 A | 10/1990 | Levine |
| 4,963,995 A | 10/1990 | Lang |
| 4,965,825 A | 10/1990 | Harvey |
| 4,977,455 A | 12/1990 | Young |
| 4,985,887 A | 1/1991 | Mizuhara |
| 4,991,012 A | 2/1991 | Yoshino |
| 4,994,908 A | 2/1991 | Kuban |
| 4,996,642 A | 2/1991 | Hey |
| 5,001,554 A | 3/1991 | Johnson |
| 5,012,409 A | 4/1991 | Fletcher |
| 5,014,125 A | 5/1991 | Pocock |
| 5,016,273 A | 5/1991 | Hoff |
| 5,027,400 A | 6/1991 | Baji |
| 5,036,314 A | 7/1991 | Barillari |
| 5,038,211 A | 8/1991 | Hallenbeck |
| 5,046,092 A | 9/1991 | Walker |
| 5,047,867 A | 9/1991 | Strubbe |
| 5,053,948 A | 10/1991 | DeClute |
| 5,057,932 A | 10/1991 | Lang |
| 5,058,160 A | 10/1991 | Banker |
| 5,068,733 A | 11/1991 | Bennett |
| 5,075,771 A | 12/1991 | Hashimoto |
| 5,086,385 A | 2/1992 | Launey |
| 5,089,885 A | 2/1992 | Clark |
| 5,090,049 A | 2/1992 | Chen |
| 5,099,319 A | 3/1992 | Esch |
| 5,105,184 A | 4/1992 | Pirani |
| 5,109,279 A | 4/1992 | Ando |
| 5,109,414 A | 4/1992 | Harvey |
| 5,111,296 A | 5/1992 | Duffield |
| 5,113,259 A | 5/1992 | Romesburg |
| 5,119,188 A | 6/1992 | McCalley |
| 5,119,577 A | 6/1992 | Lilly |
| 5,121,476 A | 6/1992 | Yee |
| 5,123,046 A | 6/1992 | Levine |
| 5,126,851 A | 6/1992 | Yoshimura |
| 5,132,992 A | 7/1992 | Yurt |
| 5,134,649 A | 7/1992 | Gutzmer |
| 5,134,719 A | 7/1992 | Mankovitz |

(56) References Cited

U.S. PATENT DOCUMENTS

| | | |
|---|---|---|
| 5,151,789 A | 9/1992 | Young |
| 5,152,012 A | 9/1992 | Schwab |
| 5,155,591 A | 10/1992 | Wachob |
| 5,168,353 A | 12/1992 | Walker |
| 5,168,372 A | 12/1992 | Sweetser |
| 5,170,388 A | 12/1992 | Endoh |
| 5,172,413 A | 12/1992 | Bradley |
| 5,179,439 A | 1/1993 | Hashimoto |
| 5,187,589 A | 2/1993 | Kono |
| 5,189,608 A | 2/1993 | Lyons |
| 5,189,630 A | 2/1993 | Barstow |
| 5,191,423 A | 3/1993 | Yoshida |
| 5,195,092 A | 3/1993 | Wilson |
| 5,195,134 A | 3/1993 | Inoue |
| 5,200,822 A | 4/1993 | Bronfin |
| 5,202,915 A | 4/1993 | Nishii |
| 5,210,611 A | 5/1993 | Yee |
| 5,212,553 A | 5/1993 | Maruoka |
| 5,216,228 A | 6/1993 | Hashimoto |
| 5,220,420 A | 6/1993 | Hoarty |
| 5,223,924 A | 6/1993 | Strubbe |
| 5,225,902 A | 7/1993 | McMullan, Jr. |
| 5,227,874 A | 7/1993 | Von Kohorn |
| 5,228,077 A | 7/1993 | Darbee |
| 5,231,493 A | 7/1993 | Apitz |
| 5,231,494 A | 7/1993 | Wachob |
| 5,231,543 A | 7/1993 | Kubota |
| RE34,340 E | 8/1993 | Freeman |
| 5,233,423 A | 8/1993 | Jernigan |
| 5,233,654 A | 8/1993 | Harvey |
| 5,241,428 A | 8/1993 | Goldwasser |
| 5,247,364 A | 9/1993 | Banker |
| 5,247,575 A | 9/1993 | Sprague |
| 5,249,043 A | 9/1993 | Grandmougin |
| 5,251,921 A | 10/1993 | Daniels |
| 5,253,066 A | 10/1993 | Vogel |
| 5,253,275 A | 10/1993 | Yurt |
| 5,260,778 A | 11/1993 | Kauffman |
| 5,262,860 A | 11/1993 | Fitzpatrick |
| 5,280,392 A | 1/1994 | Koo |
| 5,283,560 A | 2/1994 | Bartlett |
| 5,283,639 A | 2/1994 | Esch |
| 5,283,819 A | 2/1994 | Glick |
| 5,285,284 A | 2/1994 | Takashima |
| 5,291,554 A | 3/1994 | Morales |
| 5,293,357 A | 3/1994 | Hallenbeck |
| 5,296,931 A | 3/1994 | Na |
| 5,297,204 A | 3/1994 | Levine |
| 5,299,006 A | 3/1994 | Kim |
| 5,301,028 A | 4/1994 | Banker |
| 5,301,270 A | 4/1994 | Steinberg |
| 5,307,173 A | 4/1994 | Yuen |
| 5,311,423 A | 5/1994 | Clark |
| 5,315,452 A | 5/1994 | Hong |
| 5,317,403 A | 5/1994 | Keenan |
| 5,317,730 A | 5/1994 | Moore |
| 5,319,445 A | 6/1994 | Fitts |
| 5,323,234 A | 6/1994 | Kawasaki |
| 5,323,240 A | 6/1994 | Amano |
| 5,325,183 A | 6/1994 | Rhee |
| 5,325,423 A | 6/1994 | Lewis |
| 5,329,379 A | 7/1994 | Rodriguez |
| 5,335,079 A | 8/1994 | Yuen |
| 5,335,277 A | 8/1994 | Harvey |
| 5,339,393 A | 8/1994 | Duffy |
| 5,339,434 A | 8/1994 | Rusis |
| 5,341,350 A | 8/1994 | Frank |
| 5,345,430 A | 9/1994 | Moe |
| 5,347,632 A | 9/1994 | Filepp |
| 5,351,075 A | 9/1994 | Herz |
| 5,353,121 A | 10/1994 | Young |
| 5,355,162 A | 10/1994 | Yazolino |
| 5,355,302 A | 10/1994 | Martin |
| 5,357,276 A | 10/1994 | Banker |
| 5,359,367 A | 10/1994 | Stockill |
| 5,371,551 A | 12/1994 | Logan |
| 5,373,288 A | 12/1994 | Blahut |
| 5,374,951 A | 12/1994 | Welsh |
| 5,377,317 A | 12/1994 | Bates |
| 5,382,970 A | 1/1995 | Kiefl |
| 5,382,983 A | 1/1995 | Kwoh |
| 5,386,493 A | 1/1995 | Degen |
| 5,390,027 A | 2/1995 | Henmi |
| 5,392,983 A | 2/1995 | Clarke-Bolling |
| 5,396,546 A | 3/1995 | Remillard |
| 5,398,074 A | 3/1995 | Duffield |
| 5,398,138 A | 3/1995 | Tomita |
| 5,400,402 A | 3/1995 | Garfinkle |
| 5,404,393 A | 4/1995 | Remillard |
| 5,404,567 A | 4/1995 | DePietro |
| 5,410,326 A | 4/1995 | Goldstein |
| 5,410,343 A | 4/1995 | Coddington |
| 5,410,344 A | 4/1995 | Graves |
| 5,410,367 A | 4/1995 | Zahavi |
| 5,412,720 A | 5/1995 | Hoarty |
| 5,414,569 A | 5/1995 | Sekiguchi |
| 5,414,756 A | 5/1995 | Levine |
| 5,416,508 A | 5/1995 | Sakuma |
| 5,418,622 A | 5/1995 | Takeuchi |
| 5,426,699 A | 6/1995 | Wunderlich |
| 5,432,561 A | 7/1995 | Strubbe |
| 5,434,626 A | 7/1995 | Hayashi |
| 5,434,678 A | 7/1995 | Abecassis |
| 5,438,355 A | 8/1995 | Palmer |
| 5,440,678 A | 8/1995 | Eisen |
| 5,442,389 A | 8/1995 | Blahut |
| 5,442,390 A | 8/1995 | Hooper |
| 5,444,499 A | 8/1995 | Saitoh |
| 5,446,488 A | 8/1995 | Vogel |
| 5,446,919 A | 8/1995 | Wilkins |
| 5,450,135 A | 9/1995 | Schick |
| 5,452,012 A | 9/1995 | Saitoh |
| 5,453,779 A | 9/1995 | Dan |
| 5,455,570 A | 10/1995 | Cook |
| 5,457,478 A | 10/1995 | Frank |
| 5,459,522 A | 10/1995 | Pint |
| 5,461,415 A | 10/1995 | Wolf |
| 5,465,113 A | 11/1995 | Gilboy |
| 5,465,385 A | 11/1995 | Ohga |
| 5,467,264 A | 11/1995 | Rauch |
| 5,469,206 A | 11/1995 | Strubbe |
| 5,474,000 A | 12/1995 | Mizuno |
| 5,475,835 A | 12/1995 | Hickey |
| 5,477,262 A | 12/1995 | Banker |
| 5,477,263 A | 12/1995 | O'Callaghan |
| 5,479,266 A | 12/1995 | Young |
| 5,479,268 A | 12/1995 | Young |
| 5,479,302 A | 12/1995 | Haines |
| 5,479,497 A | 12/1995 | Kovarik |
| 5,481,296 A | 1/1996 | Cragun |
| 5,481,312 A | 1/1996 | Cash |
| 5,483,278 A | 1/1996 | Strubbe |
| 5,485,197 A | 1/1996 | Hoarty |
| 5,485,219 A | 1/1996 | Woo |
| 5,485,221 A | 1/1996 | Banker |
| 5,485,518 A | 1/1996 | Hunter |
| 5,488,409 A | 1/1996 | Yuen |
| 5,491,820 A | 2/1996 | Belove |
| 5,497,420 A | 3/1996 | Garneau |
| 5,502,504 A | 3/1996 | Marshall |
| 5,506,932 A | 4/1996 | Holmes |
| 5,508,815 A | 4/1996 | Levine |
| 5,512,934 A | 4/1996 | Kochanski |
| 5,515,098 A | 5/1996 | Carles |
| 5,515,106 A | 5/1996 | Chaney |
| 5,515,511 A | 5/1996 | Nguyen |
| 5,517,254 A | 5/1996 | Monta |
| 5,517,256 A | 5/1996 | Hashimoto |
| 5,517,257 A | 5/1996 | Dunn |
| 5,517,321 A | 5/1996 | Yoshida |
| 5,517,605 A | 5/1996 | Wolf |
| 5,521,631 A | 5/1996 | Budow |
| 5,521,712 A | 5/1996 | Oguro |
| 5,523,794 A | 6/1996 | Mankovitz |

(56) References Cited

U.S. PATENT DOCUMENTS

| | | | |
|---|---|---|---|
| 5,523,796 A | 6/1996 | Marshall |
| 5,524,195 A | 6/1996 | Clanton, III |
| 5,524,271 A | 6/1996 | Hollmann |
| 5,524,272 A | 6/1996 | Podowski |
| 5,526,034 A | 6/1996 | Hoarty |
| 5,526,257 A | 6/1996 | Lerner |
| 5,528,304 A | 6/1996 | Cherrick |
| 5,528,513 A | 6/1996 | Vaitzblit |
| 5,530,754 A | 6/1996 | Garfinkle |
| 5,532,754 A | 7/1996 | Young |
| 5,534,911 A | 7/1996 | Levitan |
| 5,537,141 A | 7/1996 | Harper |
| 5,539,449 A | 7/1996 | Blahut |
| 5,539,822 A | 7/1996 | Lett |
| 5,539,880 A | 7/1996 | Lakhani |
| 5,541,638 A | 7/1996 | Story |
| 5,541,662 A | 7/1996 | Adams |
| 5,541,738 A | 7/1996 | Mankovitz |
| 5,543,852 A | 8/1996 | Yuen |
| 5,543,856 A | 8/1996 | Rosser |
| 5,543,929 A | 8/1996 | Mankovitz |
| 5,543,933 A | 8/1996 | Kang |
| 5,544,321 A | 8/1996 | Theimer |
| 5,548,338 A | 8/1996 | Ellis |
| 5,548,345 A | 8/1996 | Brian |
| 5,550,575 A | 8/1996 | West |
| 5,550,576 A | 8/1996 | Klosterman |
| 5,550,578 A | 8/1996 | Hoarty |
| 5,550,825 A | 8/1996 | McMullan, Jr. |
| 5,550,863 A | 8/1996 | Yurt |
| 5,552,833 A | 9/1996 | Henmi |
| 5,553,123 A | 9/1996 | Chan |
| 5,553,221 A | 9/1996 | Reimer |
| 5,557,338 A | 9/1996 | Maze |
| 5,557,422 A | 9/1996 | Nishigaki |
| 5,557,721 A | 9/1996 | Fite |
| 5,557,724 A | 9/1996 | Sampat |
| 5,558,339 A | 9/1996 | Perlman |
| 5,559,548 A | 9/1996 | Davis |
| 5,559,549 A | 9/1996 | Hendricks |
| 5,559,550 A | 9/1996 | Mankovitz |
| 5,561,709 A | 10/1996 | Remillard |
| 5,563,665 A | 10/1996 | Chang |
| 5,565,922 A | 10/1996 | Krause |
| 5,568,272 A | 10/1996 | Levine |
| 5,568,614 A | 10/1996 | Mendelson |
| 5,570,295 A | 10/1996 | Isenberg |
| 5,570,415 A | 10/1996 | Stretton |
| 5,571,175 A | 11/1996 | Vanney et al. |
| 5,572,442 A | 11/1996 | Schulhof |
| 5,574,778 A | 11/1996 | Ely |
| 5,574,962 A | 11/1996 | Fardeau |
| 5,574,965 A | 11/1996 | Welmer |
| 5,576,755 A | 11/1996 | Davis |
| 5,576,951 A | 11/1996 | Lockwood |
| 5,579,239 A | 11/1996 | Freeman |
| 5,581,479 A | 12/1996 | Mclaughlin |
| 5,581,614 A | 12/1996 | Ng |
| 5,583,560 A | 12/1996 | Florin |
| 5,583,561 A | 12/1996 | Baker |
| 5,583,563 A | 12/1996 | Wanderscheid |
| 5,583,566 A | 12/1996 | Kanno |
| 5,583,576 A | 12/1996 | Perlman |
| 5,583,653 A | 12/1996 | Timmermans |
| 5,583,763 A | 12/1996 | Atcheson |
| 5,585,838 A | 12/1996 | Lawler |
| 5,585,858 A | 12/1996 | Harper |
| 5,585,865 A | 12/1996 | Amano |
| 5,585,866 A | 12/1996 | Miller |
| 5,586,264 A | 12/1996 | Belknap |
| 5,589,892 A | 12/1996 | Knee |
| 5,589,945 A | 12/1996 | Abecassis |
| 5,592,482 A | 1/1997 | Abraham |
| 5,592,551 A | 1/1997 | Lett |
| 5,592,571 A | 1/1997 | Peters |
| 5,594,490 A | 1/1997 | Dawson |
| 5,594,491 A | 1/1997 | Hodge |
| 5,594,509 A | 1/1997 | Florin |
| 5,594,661 A | 1/1997 | Bruner |
| 5,594,779 A | 1/1997 | Goodman |
| 5,595,865 A | 1/1997 | Possanza |
| 5,596,361 A | 1/1997 | Martinez |
| 5,596,373 A | 1/1997 | White |
| 5,596,705 A | 1/1997 | Reimer |
| 5,598,523 A | 1/1997 | Fujita |
| 5,600,364 A | 2/1997 | Hendricks |
| 5,600,365 A | 2/1997 | Kondo |
| 5,600,573 A | 2/1997 | Hendricks |
| 5,602,582 A | 2/1997 | Wanderscheid |
| 5,606,374 A | 2/1997 | Bertram |
| 5,606,642 A | 2/1997 | Stautner |
| 5,606,726 A | 2/1997 | Yoshinobu |
| 5,608,448 A | 3/1997 | Smoral |
| 5,610,653 A | 3/1997 | Abecassis |
| 5,614,940 A | 3/1997 | Cobbley |
| 5,616,876 A | 4/1997 | Cluts |
| 5,617,526 A | 4/1997 | Oran |
| 5,617,565 A | 4/1997 | Augenbraun |
| 5,619,247 A | 4/1997 | Russo |
| 5,619,249 A | 4/1997 | Billock |
| 5,619,274 A | 4/1997 | Roop |
| 5,619,335 A | 4/1997 | Tsinberg |
| 5,619,570 A | 4/1997 | Tsutsui |
| 5,621,456 A | 4/1997 | Florin |
| 5,621,579 A | 4/1997 | Yuen |
| 5,623,613 A | 4/1997 | Rowe |
| 5,625,406 A | 4/1997 | Newberry |
| 5,625,464 A | 4/1997 | Compoint |
| 5,625,678 A | 4/1997 | Blomfield-Brown |
| 5,625,693 A | 4/1997 | Rohatgi |
| 5,629,733 A | 5/1997 | Youman |
| 5,629,867 A | 5/1997 | Goldman |
| 5,629,980 A | 5/1997 | Stefik |
| 5,630,060 A | 5/1997 | Tang |
| 5,630,067 A | 5/1997 | Kindell |
| 5,630,119 A | 5/1997 | Aristides |
| 5,631,995 A | 5/1997 | Weissensteiner |
| 5,632,007 A | 5/1997 | Freeman |
| 5,634,051 A | 5/1997 | Thomson |
| 5,635,978 A | 6/1997 | Alten |
| 5,635,979 A | 6/1997 | Kostreski |
| 5,635,987 A | 6/1997 | Park |
| 5,635,989 A | 6/1997 | Rothmuller |
| 5,636,346 A | 6/1997 | Saxe |
| 5,640,484 A | 6/1997 | Mankovitz |
| 5,646,603 A | 7/1997 | Nagata |
| 5,646,796 A | 7/1997 | Kimura |
| 5,648,813 A | 7/1997 | Tanigawa |
| 5,648,824 A | 7/1997 | Dunn |
| 5,650,826 A | 7/1997 | Eitz |
| 5,650,831 A | 7/1997 | Farwell |
| 5,651,129 A | 7/1997 | Yokote |
| 5,652,613 A | 7/1997 | Lazarus |
| 5,652,615 A | 7/1997 | Bryant |
| 5,654,747 A | 8/1997 | Ottesen |
| 5,654,748 A | 8/1997 | Matthews, III |
| 5,654,886 A | 8/1997 | Zereski, Jr. |
| 5,655,214 A | 8/1997 | Mullett |
| 5,657,072 A | 8/1997 | Aristides |
| 5,657,091 A | 8/1997 | Bertram |
| 5,657,414 A | 8/1997 | Lett |
| 5,659,350 A | 8/1997 | Hendricks |
| 5,659,366 A | 8/1997 | Kerman |
| 5,659,367 A | 8/1997 | Yuen |
| 5,659,742 A | 8/1997 | Beattie |
| 5,661,516 A | 8/1997 | Carles |
| 5,661,517 A | 8/1997 | Budow |
| 5,663,757 A | 9/1997 | Morales |
| 5,666,293 A | 9/1997 | Metz |
| 5,666,498 A | 9/1997 | Amro |
| 5,666,645 A | 9/1997 | Thomas |
| 5,671,276 A | 9/1997 | Eyer |
| 5,671,277 A | 9/1997 | Ikenoue |
| 5,671,377 A | 9/1997 | Bleidt |

(56) References Cited

U.S. PATENT DOCUMENTS

| | | |
|---|---|---|
| 5,671,411 A | 9/1997 | Watts |
| 5,671,607 A | 9/1997 | Clemens |
| 5,675,390 A | 10/1997 | Schindler |
| 5,675,734 A | 10/1997 | Hair |
| 5,675,743 A | 10/1997 | Mavity |
| 5,675,752 A | 10/1997 | Scott |
| 5,677,708 A | 10/1997 | Matthews, III |
| 5,677,981 A | 10/1997 | Kato |
| 5,682,195 A | 10/1997 | Hendricks |
| 5,682,206 A | 10/1997 | Wehmeyer |
| 5,682,525 A | 10/1997 | Bouve |
| 5,684,511 A | 11/1997 | Westerink |
| 5,684,525 A | 11/1997 | Klosterman |
| 5,686,954 A | 11/1997 | Yoshinobu |
| 5,687,331 A | 11/1997 | Volk |
| 5,689,648 A | 11/1997 | Diaz |
| 5,689,663 A | 11/1997 | Williams |
| 5,689,666 A | 11/1997 | Berquist |
| 5,691,476 A | 11/1997 | Madaras |
| 5,692,213 A | 11/1997 | Goldberg |
| 5,692,214 A | 11/1997 | Levine |
| 5,692,335 A | 12/1997 | Magnuson |
| 5,694,163 A | 12/1997 | Harrison |
| 5,694,176 A | 12/1997 | Bruette |
| 5,694,381 A | 12/1997 | Sako |
| 5,696,695 A | 12/1997 | Ehlers |
| 5,696,765 A | 12/1997 | Safadi |
| 5,696,824 A | 12/1997 | Walsh |
| 5,696,869 A | 12/1997 | Abecassis |
| 5,696,905 A | 12/1997 | Reimer |
| 5,699,052 A | 12/1997 | Miyahara |
| 5,699,107 A | 12/1997 | Lawler |
| 5,699,125 A | 12/1997 | Rzeszewski |
| 5,699,528 A | 12/1997 | Hogan |
| 5,701,383 A | 12/1997 | Russo |
| 5,703,604 A | 12/1997 | McCutchen |
| 5,708,478 A | 1/1998 | Tognazzini |
| 5,708,767 A | 1/1998 | Yeo |
| 5,708,780 A | 1/1998 | Levergood |
| 5,708,845 A | 1/1998 | Wistendahl |
| 5,708,961 A | 1/1998 | Hylton |
| 5,710,601 A | 1/1998 | Marshall |
| 5,710,605 A | 1/1998 | Nelson |
| 5,710,815 A | 1/1998 | Ming |
| 5,710,884 A | 1/1998 | Dedrick |
| 5,715,020 A | 2/1998 | Kuroiwa |
| 5,717,452 A | 2/1998 | Janin |
| 5,717,923 A | 2/1998 | Dedrick |
| 5,721,815 A | 2/1998 | Ottesen |
| 5,721,829 A | 2/1998 | Dunn |
| 5,722,041 A | 2/1998 | Freadman |
| 5,724,091 A | 3/1998 | Freeman |
| 5,724,103 A | 3/1998 | Batchelor |
| 5,724,203 A | 3/1998 | Kwoh |
| 5,724,521 A | 3/1998 | Dedrick |
| 5,724,525 A | 3/1998 | Beyers, II |
| 5,724,546 A | 3/1998 | Tsutsui |
| 5,724,567 A | 3/1998 | Rose |
| 5,726,702 A | 3/1998 | Hamaguchi |
| 5,727,060 A | 3/1998 | Young |
| 5,731,844 A | 3/1998 | Rauch |
| 5,732,216 A | 3/1998 | Logan |
| 5,734,119 A | 3/1998 | France |
| 5,734,431 A | 3/1998 | Dachiku |
| 5,734,720 A | 3/1998 | Salganicoff |
| 5,734,853 A | 3/1998 | Hendricks |
| 5,734,886 A | 3/1998 | Grosse |
| 5,734,893 A | 3/1998 | Li |
| 5,737,028 A | 4/1998 | Bertram |
| 5,737,552 A | 4/1998 | Lavallee |
| 5,740,231 A | 4/1998 | Cohn |
| 5,740,388 A | 4/1998 | Hunt |
| 5,740,549 A | 4/1998 | Reilly |
| 5,742,443 A | 4/1998 | Tsao |
| 5,742,816 A | 4/1998 | Barr |
| 5,742,905 A | 4/1998 | Pepe |
| 5,745,710 A | 4/1998 | Clanton, III |
| 5,748,191 A | 5/1998 | Rozak |
| 5,748,716 A | 5/1998 | Levine |
| 5,748,732 A | 5/1998 | Le Berre |
| 5,749,043 A | 5/1998 | Worthy |
| 5,749,081 A | 5/1998 | Whiteis |
| 5,751,282 A | 5/1998 | Girard |
| 5,751,286 A | 5/1998 | Barber |
| 5,751,672 A | 5/1998 | Yankowski |
| 5,751,883 A | 5/1998 | Ottesen |
| 5,752,159 A | 5/1998 | Faust |
| 5,752,160 A | 5/1998 | Dunn |
| 5,752,246 A | 5/1998 | Rogers |
| 5,754,771 A | 5/1998 | Epperson |
| 5,754,938 A | 5/1998 | Herz |
| 5,754,939 A | 5/1998 | Herz |
| 5,757,415 A | 5/1998 | Asamizuya |
| 5,757,417 A | 5/1998 | Aras |
| 5,758,257 A | 5/1998 | Herz |
| 5,758,258 A | 5/1998 | Shoff |
| 5,758,259 A | 5/1998 | Lawler |
| 5,760,767 A | 6/1998 | Shore |
| 5,760,821 A | 6/1998 | Ellis |
| 5,761,372 A | 6/1998 | Yoshinobu |
| 5,761,417 A | 6/1998 | Henley |
| 5,761,601 A | 6/1998 | Nemirofsky |
| 5,761,606 A | 6/1998 | Wolzien |
| 5,761,607 A | 6/1998 | Gudesen |
| 5,761,662 A | 6/1998 | Dasan |
| 5,764,281 A | 6/1998 | Seo |
| 5,767,896 A | 6/1998 | Nemirofsky |
| 5,768,528 A | 6/1998 | Stumm |
| 5,771,275 A | 6/1998 | Brunner |
| 5,771,354 A | 6/1998 | Crawford |
| 5,774,170 A | 6/1998 | Hite |
| 5,774,357 A | 6/1998 | Hoffberg |
| 5,774,534 A | 6/1998 | Mayer |
| 5,774,539 A | 6/1998 | Maass |
| 5,774,664 A | 6/1998 | Hidary |
| 5,774,666 A | 6/1998 | Portuesi |
| 5,774,859 A | 6/1998 | Houser |
| 5,778,181 A | 7/1998 | Hidary |
| 5,778,182 A | 7/1998 | Cathey |
| 5,778,187 A | 7/1998 | Monteiro |
| 5,778,367 A | 7/1998 | Wesinger, Jr. |
| 5,781,226 A | 7/1998 | Sheehan |
| 5,781,227 A | 7/1998 | Goode |
| 5,781,228 A | 7/1998 | Sposato |
| 5,781,246 A | 7/1998 | Alten |
| 5,781,734 A | 7/1998 | Ohno |
| 5,787,259 A | 7/1998 | Haroun |
| 5,788,507 A | 8/1998 | Redford |
| 5,790,176 A | 8/1998 | Craig |
| 5,790,198 A | 8/1998 | Roop |
| 5,790,201 A | 8/1998 | Antos |
| 5,790,202 A | 8/1998 | Kummer |
| 5,790,423 A | 8/1998 | Lau |
| 5,790,426 A | 8/1998 | Robinson |
| 5,790,753 A | 8/1998 | Krishnamoorthy |
| 5,790,835 A | 8/1998 | Case |
| 5,790,935 A | 8/1998 | Payton |
| 5,790,952 A | 8/1998 | Seazholtz |
| 5,793,366 A | 8/1998 | Mario |
| 5,793,409 A | 8/1998 | Tetsumura |
| 5,793,412 A | 8/1998 | Asamizuya |
| 5,793,438 A | 8/1998 | Bedard |
| 5,793,964 A | 8/1998 | Rogers |
| 5,793,971 A | 8/1998 | Fujita |
| 5,793,972 A | 8/1998 | Shane |
| 5,794,217 A | 8/1998 | Allen |
| 5,796,829 A | 8/1998 | Newby |
| 5,796,952 A | 8/1998 | Davis |
| 5,798,785 A | 8/1998 | Hendricks |
| 5,798,921 A | 8/1998 | Johnson |
| 5,801,747 A | 9/1998 | Bedard |
| 5,801,785 A | 9/1998 | Crump |
| 5,801,787 A | 9/1998 | Schein |
| 5,802,284 A | 9/1998 | Karlton |

(56) References Cited

U.S. PATENT DOCUMENTS

| | | |
|---|---|---|
| 5,805,154 A | 9/1998 | Brown |
| 5,805,155 A | 9/1998 | Allibhoy |
| 5,805,167 A | 9/1998 | van Cruyningen |
| 5,805,204 A | 9/1998 | Thompson |
| 5,805,763 A | 9/1998 | Lawler |
| 5,805,804 A | 9/1998 | Laursen |
| 5,805,806 A | 9/1998 | McArthur |
| 5,808,608 A | 9/1998 | Young |
| 5,808,628 A | 9/1998 | Hinson |
| 5,808,662 A | 9/1998 | Kinney |
| 5,808,694 A | 9/1998 | Usui |
| 5,809,204 A | 9/1998 | Young |
| 5,809,214 A | 9/1998 | Nureki |
| 5,809,242 A | 9/1998 | Shaw |
| 5,809,246 A | 9/1998 | Goldman |
| 5,809,471 A | 9/1998 | Brodsky |
| 5,812,123 A | 9/1998 | Rowe |
| 5,812,124 A | 9/1998 | Eick |
| 5,812,134 A | 9/1998 | Pooser |
| 5,812,205 A | 9/1998 | Milnes |
| 5,812,763 A | 9/1998 | Teng |
| 5,812,930 A | 9/1998 | Zavrel |
| 5,812,931 A | 9/1998 | Yuen |
| 5,812,937 A | 9/1998 | Takahisa |
| 5,813,009 A | 9/1998 | Johnson |
| 5,815,145 A | 9/1998 | Matthews, III |
| 5,815,146 A | 9/1998 | Youden |
| 5,815,297 A | 9/1998 | Ciciora |
| 5,815,662 A | 9/1998 | Ong |
| 5,815,671 A | 9/1998 | Morrison |
| 5,818,438 A | 10/1998 | Howe |
| 5,818,439 A | 10/1998 | Nagasaka |
| 5,818,441 A | 10/1998 | Throckmorton |
| 5,818,511 A | 10/1998 | Farry |
| 5,818,935 A | 10/1998 | Maa |
| 5,819,019 A | 10/1998 | Nelson |
| 5,819,156 A | 10/1998 | Belmont |
| 5,819,160 A | 10/1998 | Foladare |
| 5,819,284 A | 10/1998 | Farber |
| 5,819,285 A | 10/1998 | Damico |
| 5,822,123 A | 10/1998 | Davis |
| 5,822,530 A | 10/1998 | Brown |
| 5,822,606 A | 10/1998 | Morton |
| 5,825,407 A | 10/1998 | Cowe |
| 5,828,419 A | 10/1998 | Bruette |
| 5,828,420 A | 10/1998 | Marshall |
| 5,828,839 A | 10/1998 | Moncreiff |
| 5,828,945 A | 10/1998 | Klosterman |
| RE35,954 E | 11/1998 | Levine |
| 5,830,068 A | 11/1998 | Brenner |
| 5,831,664 A | 11/1998 | Wharton |
| 5,832,223 A | 11/1998 | Hara |
| 5,832,287 A | 11/1998 | Atalla |
| 5,833,468 A | 11/1998 | Guy |
| 5,835,126 A | 11/1998 | Lewis |
| 5,835,717 A | 11/1998 | Karlton |
| 5,838,314 A | 11/1998 | Neel |
| 5,838,319 A | 11/1998 | Guzak |
| 5,838,383 A | 11/1998 | Chimoto |
| 5,841,979 A | 11/1998 | Schulhof |
| 5,842,010 A | 11/1998 | Jain |
| 5,842,199 A | 11/1998 | Miller |
| 5,844,552 A | 12/1998 | Gaughan |
| 5,844,620 A | 12/1998 | Coleman |
| 5,848,396 A | 12/1998 | Gerace |
| 5,850,218 A | 12/1998 | LaJoie |
| 5,851,149 A | 12/1998 | Xidos |
| 5,852,437 A | 12/1998 | Wugofski |
| 5,861,881 A | 1/1999 | Freeman |
| 5,861,906 A | 1/1999 | Dunn |
| 5,862,292 A | 1/1999 | Kubota |
| 5,864,704 A | 1/1999 | Battle |
| 5,864,823 A | 1/1999 | Levitan |
| 5,867,223 A | 2/1999 | Schindler |
| 5,867,226 A | 2/1999 | Wehmeyer |
| 5,867,227 A | 2/1999 | Yamaguchi |
| 5,867,233 A | 2/1999 | Tanaka |
| 5,867,799 A | 2/1999 | Lang |
| 5,870,543 A | 2/1999 | Ronning |
| 5,870,754 A | 2/1999 | Dimitrova |
| 5,872,588 A | 2/1999 | Aras |
| 5,873,660 A | 2/1999 | Walsh |
| 5,874,985 A | 2/1999 | Matthews, III |
| 5,875,108 A | 2/1999 | Hoffberg |
| 5,877,906 A | 3/1999 | Nagasawa |
| 5,878,222 A | 3/1999 | Harrison |
| 5,880,720 A | 3/1999 | Iwafune |
| 5,880,768 A | 3/1999 | Lemmons |
| 5,881,245 A | 3/1999 | Thompson |
| 5,883,621 A | 3/1999 | Iwamura |
| 5,883,677 A | 3/1999 | Hofmann |
| 5,884,028 A | 3/1999 | Kindell |
| 5,884,141 A | 3/1999 | Inoue |
| 5,884,298 A | 3/1999 | Smith, II |
| 5,886,691 A | 3/1999 | Furuya |
| 5,886,707 A | 3/1999 | Berg |
| 5,886,731 A | 3/1999 | Ebisawa |
| 5,886,732 A | 3/1999 | Humpleman |
| 5,886,742 A | 3/1999 | Hibi |
| 5,887,243 A | 3/1999 | Harvey |
| 5,889,950 A | 3/1999 | Kuzma |
| 5,890,138 A | 3/1999 | Godin |
| 5,892,535 A | 4/1999 | Allen |
| 5,892,536 A | 4/1999 | Logan |
| 5,892,767 A | 4/1999 | Bell |
| 5,892,915 A | 4/1999 | Duso |
| 5,894,589 A | 4/1999 | Reber |
| 5,895,474 A | 4/1999 | Maarek |
| 5,896,414 A | 4/1999 | Meyer |
| 5,898,441 A | 4/1999 | Flurry |
| 5,898,456 A | 4/1999 | Wahl |
| 5,899,576 A | 5/1999 | Fukuzawa |
| 5,899,582 A | 5/1999 | DuLac |
| 5,899,920 A | 5/1999 | DeSatnick |
| 5,900,867 A | 5/1999 | Schindler |
| 5,900,904 A | 5/1999 | Okada |
| 5,900,905 A | 5/1999 | Shoff |
| 5,901,366 A | 5/1999 | Nakano |
| 5,903,234 A | 5/1999 | Kimura |
| 5,903,263 A | 5/1999 | Emura |
| 5,903,264 A | 5/1999 | Moeller |
| 5,903,314 A | 5/1999 | Niijima |
| 5,903,454 A | 5/1999 | Hoffberg |
| 5,903,545 A | 5/1999 | Sabourin |
| 5,903,723 A | 5/1999 | Beck |
| 5,903,816 A | 5/1999 | Broadwin |
| 5,903,892 A | 5/1999 | Hoffert |
| 5,905,522 A | 5/1999 | Lawler |
| 5,905,847 A | 5/1999 | Kobayashi |
| 5,905,865 A | 5/1999 | Palmer |
| 5,907,322 A | 5/1999 | Kelly |
| 5,907,323 A | 5/1999 | Lawler |
| 5,907,366 A | 5/1999 | Farmer |
| 5,909,212 A | 6/1999 | Nishina |
| 5,909,638 A | 6/1999 | Allen |
| 5,911,046 A | 6/1999 | Amano |
| 5,911,139 A | 6/1999 | Jain |
| 5,912,664 A | 6/1999 | Eick |
| 5,913,039 A | 6/1999 | Nakamura |
| 5,914,712 A | 6/1999 | Sartain |
| 5,914,746 A | 6/1999 | Matthews, III |
| 5,914,941 A | 6/1999 | Janky |
| 5,915,026 A | 6/1999 | Mankovitz |
| 5,915,068 A | 6/1999 | Levine |
| 5,915,090 A | 6/1999 | Joseph |
| 5,915,094 A | 6/1999 | Kouloheris |
| 5,915,250 A | 6/1999 | Jain |
| 5,916,303 A | 6/1999 | Scott |
| 5,917,405 A | 6/1999 | Joao |
| 5,917,481 A | 6/1999 | Rzeszewski |
| 5,917,538 A | 6/1999 | Asamizuya |
| 5,917,830 A | 6/1999 | Chen |
| 5,917,835 A | 6/1999 | Barrett |
| 5,918,014 A | 6/1999 | Robinson |

(56) References Cited

U.S. PATENT DOCUMENTS

| | | |
|---|---|---|
| 5,920,700 A | 7/1999 | Gordon |
| 5,920,702 A | 7/1999 | Bleidt |
| 5,920,800 A | 7/1999 | Schafer |
| 5,922,045 A | 7/1999 | Hanson |
| 5,922,048 A | 7/1999 | Emura |
| 5,923,361 A | 7/1999 | Sutton, Jr. |
| 5,923,848 A | 7/1999 | Goodhand |
| 5,926,204 A | 7/1999 | Mayer |
| 5,926,205 A | 7/1999 | Krause |
| 5,926,624 A | 7/1999 | Katz |
| 5,928,327 A | 7/1999 | Wang |
| 5,929,849 A | 7/1999 | Kikinis |
| 5,929,850 A | 7/1999 | Broadwin |
| 5,929,932 A | 7/1999 | Otsuki |
| 5,930,444 A | 7/1999 | Camhi |
| 5,930,473 A | 7/1999 | Teng |
| 5,930,493 A | 7/1999 | Ottesen |
| 5,931,901 A | 8/1999 | Wolfe |
| 5,931,905 A | 8/1999 | Hashimoto |
| 5,933,603 A | 8/1999 | Vahalia |
| 5,933,835 A | 8/1999 | Adams |
| 5,935,206 A | 8/1999 | Dixon |
| 5,936,569 A | 8/1999 | Stahle |
| 5,936,673 A | 8/1999 | Agarwal |
| 5,937,160 A | 8/1999 | Davis |
| 5,940,071 A | 8/1999 | Treffers |
| 5,940,073 A | 8/1999 | Klosterman |
| 5,940,387 A | 8/1999 | Humpleman |
| 5,940,572 A | 8/1999 | Balaban |
| 5,943,046 A | 8/1999 | Cave |
| 5,943,047 A | 8/1999 | Suzuki |
| 5,945,987 A | 8/1999 | Dunn |
| 5,945,988 A | 8/1999 | Williams |
| 5,946,386 A | 8/1999 | Rogers |
| 5,947,746 A | 9/1999 | Tsai |
| 5,949,411 A | 9/1999 | Doerr |
| 5,949,954 A | 9/1999 | Young |
| 5,951,642 A | 9/1999 | Onoe |
| 5,953,005 A | 9/1999 | Liu |
| 5,953,485 A | 9/1999 | Abecassis |
| 5,955,988 A | 9/1999 | Blonstein |
| 5,956,025 A | 9/1999 | Goulden |
| 5,956,482 A | 9/1999 | Agraharam |
| 5,956,716 A | 9/1999 | Kenner |
| 5,957,695 A | 9/1999 | Redford |
| 5,959,592 A | 9/1999 | Petruzzelli |
| 5,959,659 A | 9/1999 | Dokic |
| 5,959,688 A | 9/1999 | Schein |
| 5,960,411 A | 9/1999 | Hartman |
| 5,961,603 A | 10/1999 | Kunkel |
| 5,963,202 A | 10/1999 | Polish |
| 5,963,264 A | 10/1999 | Jackson |
| 5,963,645 A | 10/1999 | Kigawa |
| 5,964,455 A | 10/1999 | Catanzarite |
| 5,966,187 A | 10/1999 | Do |
| 5,969,283 A | 10/1999 | Looney |
| 5,969,714 A | 10/1999 | Butcher |
| 5,969,748 A | 10/1999 | Casement |
| 5,970,473 A | 10/1999 | Gerszberg |
| 5,970,486 A | 10/1999 | Yoshida |
| 5,973,680 A | 10/1999 | Ueda |
| 5,973,683 A | 10/1999 | Cragun |
| 5,973,722 A | 10/1999 | Wakai |
| 5,974,217 A | 10/1999 | Haraguchi |
| 5,974,222 A | 10/1999 | Yuen |
| 5,977,963 A | 11/1999 | Gaughan |
| 5,977,964 A | 11/1999 | Williams |
| 5,978,567 A | 11/1999 | Rebane |
| 5,978,843 A | 11/1999 | Wu |
| 5,982,411 A | 11/1999 | Eyer |
| 5,983,236 A | 11/1999 | Yager |
| 5,986,650 A | 11/1999 | Ellis |
| 5,987,213 A | 11/1999 | Mankovitz |
| 5,987,454 A | 11/1999 | Hobbs |
| 5,987,509 A | 11/1999 | Portuesi |
| 5,987,621 A | 11/1999 | Duso |
| 5,988,078 A | 11/1999 | Levine |
| 5,990,881 A | 11/1999 | Inoue |
| 5,990,885 A | 11/1999 | Gopinath |
| 5,990,890 A | 11/1999 | Etheredge |
| 5,990,927 A | 11/1999 | Hendricks |
| 5,991,498 A | 11/1999 | Young |
| 5,991,735 A | 11/1999 | Gerace |
| 5,991,799 A | 11/1999 | Yen |
| 5,991,832 A | 11/1999 | Sato |
| 5,995,155 A | 11/1999 | Schindler |
| 5,999,688 A | 12/1999 | Lggulden |
| 5,999,970 A | 12/1999 | Krisbergh |
| 6,002,393 A | 12/1999 | Hite |
| 6,002,394 A | 12/1999 | Schein |
| 6,002,443 A | 12/1999 | Iggulden |
| 6,002,444 A | 12/1999 | Marshall |
| 6,002,450 A | 12/1999 | Darbee |
| 6,002,720 A | 12/1999 | Yurt |
| 6,003,030 A | 12/1999 | Kenner |
| 6,005,561 A | 12/1999 | Hawkins |
| 6,005,563 A | 12/1999 | White |
| 6,005,564 A | 12/1999 | Ahmad |
| 6,005,565 A | 12/1999 | Legall |
| 6,005,566 A | 12/1999 | Jones |
| 6,005,597 A | 12/1999 | Barrett |
| 6,005,600 A | 12/1999 | Hill |
| 6,005,631 A | 12/1999 | Anderson |
| 6,006,257 A | 12/1999 | Slezak |
| 6,008,802 A | 12/1999 | Iki |
| 6,008,803 A | 12/1999 | Rowe |
| 6,009,153 A | 12/1999 | Houghton |
| 6,009,465 A | 12/1999 | Decker |
| 6,011,546 A | 1/2000 | Bertram |
| 6,012,086 A | 1/2000 | Lowell |
| 6,012,089 A | 1/2000 | Hasegawa |
| 6,012,091 A | 1/2000 | Boyce |
| 6,014,184 A | 1/2000 | Knee |
| 6,014,381 A | 1/2000 | Troxel |
| 6,014,502 A | 1/2000 | Morales |
| 6,014,689 A | 1/2000 | Budge et al. |
| 6,014,693 A | 1/2000 | Ito |
| 6,014,694 A | 1/2000 | Aharoni |
| 6,014,706 A | 1/2000 | Cannon |
| 6,016,141 A | 1/2000 | Knudson |
| 6,018,359 A | 1/2000 | Kemiode |
| 6,018,372 A | 1/2000 | Etheredge |
| 6,018,612 A | 1/2000 | Thomason |
| 6,018,765 A | 1/2000 | Durana |
| 6,018,768 A | 1/2000 | Ullman |
| 6,020,880 A | 2/2000 | Naimpally |
| 6,020,883 A | 2/2000 | Herz |
| 6,020,912 A | 2/2000 | De Lang |
| 6,020,929 A | 2/2000 | Marshall |
| 6,020,930 A | 2/2000 | Legrand |
| 6,022,223 A | 2/2000 | Taniguchi |
| 6,023,267 A | 2/2000 | Chapuis |
| 6,023,725 A | 2/2000 | Ozawa |
| 6,025,837 A | 2/2000 | Matthews |
| 6,025,868 A | 2/2000 | Russo |
| 6,025,869 A | 2/2000 | Stas |
| 6,025,886 A | 2/2000 | Koda |
| 6,026,305 A * | 2/2000 | Salinger et al. ............ 455/456.3 |
| 6,028,599 A | 2/2000 | Yuen |
| 6,028,600 A | 2/2000 | Rosin |
| 6,028,603 A | 2/2000 | Wang |
| 6,029,045 A | 2/2000 | Picco |
| 6,029,064 A | 2/2000 | Farris |
| 6,029,176 A | 2/2000 | Cannon |
| 6,029,195 A | 2/2000 | Herz |
| 6,031,806 A | 2/2000 | Tomita |
| 6,032,202 A | 2/2000 | Lea |
| 6,035,091 A | 3/2000 | Kazo |
| 6,035,339 A | 3/2000 | Agraharam |
| 6,038,367 A | 3/2000 | Abescassis |
| 6,038,591 A | 3/2000 | Wolfe |
| 6,038,614 A | 3/2000 | Chan |
| 6,040,829 A | 3/2000 | Croy |
| 6,049,823 A | 4/2000 | Hwang |

(56) References Cited

U.S. PATENT DOCUMENTS

| | | |
|---|---|---|
| 6,049,824 A | 4/2000 | Simonin |
| 6,049,831 A | 4/2000 | Gardell |
| 6,052,145 A | 4/2000 | Macrae |
| 6,057,872 A | 5/2000 | Candelore |
| 6,057,890 A | 5/2000 | Virden |
| 6,058,238 A | 5/2000 | Ng |
| 6,058,242 A | 5/2000 | Kim |
| 6,061,056 A | 5/2000 | Menard |
| 6,061,082 A | 5/2000 | Park |
| 6,061,097 A | 5/2000 | Satterfield |
| 6,061,779 A | 5/2000 | Garde |
| 6,064,376 A | 5/2000 | Berezowski |
| 6,064,380 A | 5/2000 | Swenson |
| 6,064,980 A | 5/2000 | Jacobi |
| 6,065,047 A | 5/2000 | Carpenter |
| 6,067,561 A | 5/2000 | Dillon |
| 6,067,564 A | 5/2000 | Urakoshi |
| 6,072,460 A | 6/2000 | Marshall |
| 6,072,982 A | 6/2000 | Haddad |
| 6,075,526 A | 6/2000 | Rothmuller |
| 6,075,530 A | 6/2000 | Lucas |
| 6,075,568 A | 6/2000 | Matsuura |
| 6,075,575 A | 6/2000 | Schein |
| 6,078,348 A | 6/2000 | Klosterman |
| 6,078,914 A | 6/2000 | Redfern |
| 6,081,291 A | 6/2000 | Ludwig, Jr. |
| 6,081,750 A | 6/2000 | Hoffberg |
| 6,081,830 A | 6/2000 | Schindler |
| 6,085,236 A | 7/2000 | Lea |
| 6,088,722 A | 7/2000 | Herz |
| 6,088,945 A | 7/2000 | Sanderfoot |
| 6,091,823 A | 7/2000 | Hosomi |
| 6,091,883 A | 7/2000 | Artigalas |
| 6,091,884 A | 7/2000 | Yuen |
| RE36,801 E | 8/2000 | Logan |
| 6,097,441 A | 8/2000 | Allport |
| 6,098,065 A | 8/2000 | Skillen |
| 6,098,082 A | 8/2000 | Gibbon |
| 6,104,334 A | 8/2000 | Allport |
| 6,104,705 A | 8/2000 | Ismail |
| 6,111,614 A | 8/2000 | Mugura |
| 6,111,677 A | 8/2000 | Shintani |
| 6,112,181 A | 8/2000 | Shear |
| 6,112,186 A | 8/2000 | Bergh |
| 6,115,057 A | 9/2000 | Kwoh |
| 6,118,450 A | 9/2000 | Proehl |
| 6,118,492 A | 9/2000 | Milnes |
| 6,119,098 A | 9/2000 | Guyot |
| 6,119,101 A | 9/2000 | Peckover |
| 6,119,144 A | 9/2000 | Fujita |
| 6,122,011 A | 9/2000 | Dias |
| 6,124,854 A | 9/2000 | Sartain |
| 6,125,230 A | 9/2000 | Yaginuma |
| 6,125,231 A | 9/2000 | Yuen |
| 6,130,726 A | 10/2000 | Darbee |
| 6,133,847 A | 10/2000 | Yang |
| 6,133,909 A | 10/2000 | Schein |
| 6,133,910 A | 10/2000 | Stinebruner |
| 6,133,912 A | 10/2000 | Montero |
| 6,139,177 A | 10/2000 | Venkatraman |
| 6,141,003 A | 10/2000 | Chor |
| 6,141,488 A | 10/2000 | Knudson |
| 6,141,693 A | 10/2000 | Perlman |
| 6,144,401 A | 11/2000 | Casement |
| 6,144,702 A | 11/2000 | Yurt |
| 6,147,715 A | 11/2000 | Yuen |
| 6,151,059 A | 11/2000 | Schein |
| 6,151,643 A | 11/2000 | Cheng |
| 6,154,203 A | 11/2000 | Yuen |
| 6,154,206 A | 11/2000 | Ludtke |
| 6,154,771 A | 11/2000 | Rangan |
| 6,155,001 A | 12/2000 | Marin |
| 6,157,411 A | 12/2000 | Williams |
| 6,157,413 A | 12/2000 | Hanafee |
| 6,160,545 A | 12/2000 | Eyer |
| 6,160,546 A | 12/2000 | Thompson |
| 6,160,570 A | 12/2000 | Sitnik |
| 6,160,796 A | 12/2000 | Zou |
| 6,160,988 A | 12/2000 | Shroyer |
| 6,163,316 A | 12/2000 | Killian |
| 6,163,345 A | 12/2000 | Noguchi |
| 6,166,730 A | 12/2000 | Goode |
| 6,166,735 A | 12/2000 | Dom |
| 6,166,778 A | 12/2000 | Yamamoto |
| 6,167,188 A | 12/2000 | Young |
| 6,169,542 B1 | 1/2001 | Hooks |
| 6,169,543 B1 | 1/2001 | Wehmeyer |
| 6,169,725 B1 | 1/2001 | Gibbs |
| 6,169,844 B1 | 1/2001 | Arai |
| 6,170,006 B1 | 1/2001 | Namba |
| 6,172,674 B1 | 1/2001 | Etheredge |
| 6,172,677 B1 | 1/2001 | Stautner |
| 6,172,712 B1 | 1/2001 | Beard |
| 6,177,931 B1 | 1/2001 | Alexander |
| 6,178,446 B1 | 1/2001 | Gerszberg |
| 6,181,335 B1 | 1/2001 | Hendricks |
| 6,181,867 B1 | 1/2001 | Kenner |
| 6,182,094 B1 | 1/2001 | Humpleman |
| 6,184,877 B1 | 2/2001 | Dodson |
| 6,184,878 B1 | 2/2001 | Alonso |
| 6,185,360 B1 | 2/2001 | Inoue |
| 6,185,573 B1 | 2/2001 | Angelucci |
| 6,186,287 B1 | 2/2001 | Heidenreich |
| 6,188,381 B1 | 2/2001 | van der Wal |
| 6,188,397 B1 | 2/2001 | Humpleman |
| 6,192,340 B1 | 2/2001 | Abecassis |
| 6,195,501 B1 | 2/2001 | Perry |
| 6,199,076 B1 | 3/2001 | Logan |
| 6,201,536 B1 | 3/2001 | Hendricks |
| 6,202,211 B1 | 3/2001 | Williams, Jr. |
| 6,202,212 B1 | 3/2001 | Sturgeon |
| 6,208,335 B1 | 3/2001 | Gordon |
| 6,208,341 B1 | 3/2001 | van Ee |
| 6,208,384 B1 | 3/2001 | Schultheiss |
| 6,208,799 B1 | 3/2001 | Marsh |
| 6,209,103 B1 | 3/2001 | Schreiber |
| 6,209,129 B1 | 3/2001 | Carr |
| 6,209,130 B1 | 3/2001 | Rector, Jr. |
| 6,212,327 B1 | 4/2001 | Berstis |
| 6,212,553 B1 | 4/2001 | Lee |
| 6,216,264 B1 | 4/2001 | Maze |
| 6,219,489 B1 | 4/2001 | Ohta |
| 6,219,839 B1 | 4/2001 | Sampsell |
| 6,226,444 B1 | 5/2001 | Goldschmidt |
| 6,226,447 B1 | 5/2001 | Sasaki |
| 6,230,200 B1 | 5/2001 | Forecast |
| 6,230,325 B1 | 5/2001 | Iinuma |
| 6,232,539 B1 | 5/2001 | Looney |
| 6,233,389 B1 | 5/2001 | Barton |
| 6,233,393 B1 | 5/2001 | Yanagihara |
| 6,233,734 B1 | 5/2001 | Macrae |
| 6,236,395 B1 | 5/2001 | Sezan |
| 6,236,801 B1 | 5/2001 | Engle |
| 6,236,978 B1 | 5/2001 | Tuzhilin |
| 6,237,049 B1 | 5/2001 | Ludtke |
| 6,239,794 B1 | 5/2001 | Yuen |
| 6,240,241 B1 | 5/2001 | Yuen |
| 6,240,555 B1 | 5/2001 | Shoff |
| 6,243,419 B1 | 6/2001 | Satou |
| 6,243,707 B1 | 6/2001 | Humpleman |
| 6,243,725 B1 | 6/2001 | Hempleman |
| 6,243,865 B1 | 6/2001 | Wei |
| 6,246,719 B1 | 6/2001 | Agarwal |
| 6,247,176 B1 | 6/2001 | Schein |
| 6,256,071 B1 | 7/2001 | Hiroi |
| 6,256,785 B1 | 7/2001 | Klappert |
| 6,260,088 B1 | 7/2001 | Gove |
| 6,262,721 B1 | 7/2001 | Tsukidate |
| 6,262,772 B1 | 7/2001 | Shen |
| 6,263,501 B1 | 7/2001 | Schein |
| 6,263,503 B1 | 7/2001 | Margulis |
| 6,263,507 B1 | 7/2001 | Ahmad |
| 6,266,657 B1 | 7/2001 | deVries |
| 6,266,814 B1 | 7/2001 | Lemmons |

(56) References Cited

U.S. PATENT DOCUMENTS

| | | |
|---|---|---|
| 6,268,394 B1 | 7/2001 | Shikenove |
| 6,268,849 B1 | 7/2001 | Boyer |
| 6,269,394 B1 | 7/2001 | Kenner |
| 6,271,840 B1 | 8/2001 | Finseth |
| 6,275,268 B1 | 8/2001 | Ellis |
| 6,275,532 B1 | 8/2001 | Hibi |
| 6,275,648 B1 | 8/2001 | Knudson |
| 6,275,829 B1 | 8/2001 | Angiulo |
| 6,278,466 B1 | 8/2001 | Chen |
| 6,279,029 B1 | 8/2001 | Sampat |
| 6,279,157 B1 | 8/2001 | Takasu |
| 6,285,685 B1 | 9/2001 | Bum |
| 6,286,005 B1 | 9/2001 | Cannon |
| 6,286,140 B1 | 9/2001 | Ivanyl |
| 6,286,142 B1 | 9/2001 | Ehreth |
| 6,288,716 B1 | 9/2001 | Humpleman |
| 6,289,165 B1 | 9/2001 | Abecassis |
| 6,289,346 B1 | 9/2001 | Milewski |
| 6,292,624 B1 | 9/2001 | Saib |
| 6,298,482 B1 | 10/2001 | Seidman |
| 6,305,018 B1 | 10/2001 | Usui |
| 6,305,019 B1 | 10/2001 | Dyer |
| 6,310,886 B1 | 10/2001 | Barton |
| 6,311,011 B1 | 10/2001 | Kuroda |
| 6,312,336 B1 | 11/2001 | Handelman |
| 6,314,432 B1 | 11/2001 | Potts |
| 6,314,575 B1 | 11/2001 | Billock |
| 6,317,881 B1 | 11/2001 | Shah-Nazaroff |
| 6,317,884 B1 | 11/2001 | Eames |
| 6,317,885 B1 | 11/2001 | Fries |
| 6,320,588 B1 | 11/2001 | Palmer |
| 6,321,318 B1 | 11/2001 | Baltz |
| 6,323,911 B1 | 11/2001 | Schein |
| 6,324,338 B1 | 11/2001 | Wood |
| 6,324,538 B1 | 11/2001 | Wesinger, Jr. |
| 6,326,982 B1 | 12/2001 | Wu |
| 6,327,049 B1 | 12/2001 | Ohtsuka |
| 6,327,418 B1 | 12/2001 | Barton |
| 6,330,665 B1 | 12/2001 | Wise |
| 6,331,877 B1 | 12/2001 | Bennington |
| 6,334,022 B1 | 12/2001 | Ohba |
| 6,335,963 B1 | 1/2002 | Bosco |
| 6,336,099 B1 | 1/2002 | Barnett |
| 6,337,715 B1 | 1/2002 | Inagaki |
| 6,341,374 B2 | 1/2002 | Schein |
| 6,344,939 B2 | 2/2002 | Oguro |
| 6,347,400 B1 | 2/2002 | Ohkura |
| 6,348,932 B1 | 2/2002 | Nishikawa |
| 6,349,410 B1 | 2/2002 | Lortz |
| 6,351,765 B1 | 2/2002 | Pietropaolo |
| 6,353,700 B1 | 3/2002 | Zhou |
| 6,356,971 B1 | 3/2002 | Katz |
| 6,357,042 B2 | 3/2002 | Srinivasan |
| 6,357,043 B1 | 3/2002 | Ellis |
| 6,359,636 B1 | 3/2002 | Schindler |
| 6,359,661 B1 | 3/2002 | Nickum |
| 6,363,525 B1 | 3/2002 | Dougherty |
| 6,366,890 B1 | 4/2002 | Usrey |
| 6,367,080 B1 | 4/2002 | Enomoto |
| 6,370,543 B2 | 4/2002 | Hoffert |
| 6,370,688 B1 | 4/2002 | Hejna |
| 6,373,528 B1 | 4/2002 | Bennington |
| 6,374,406 B2 | 4/2002 | Hirata |
| 6,377,745 B2 | 4/2002 | Akiba |
| 6,378,130 B1 | 4/2002 | Adams |
| 6,388,714 B1 | 5/2002 | Schein |
| 6,389,593 B1 | 5/2002 | Yamagishi |
| 6,392,710 B1 | 5/2002 | Gonsalves |
| 6,393,430 B1 | 5/2002 | Van Ryzin |
| 6,396,544 B1 | 5/2002 | Schindler |
| 6,396,546 B1 | 5/2002 | Alten |
| 6,397,080 B1 | 5/2002 | Viktorsson |
| 6,397,387 B1 | 5/2002 | Rosin |
| 6,400,407 B1 | 6/2002 | Zigmond |
| 6,405,370 B1 | 6/2002 | Jarrell |
| 6,405,371 B1 | 6/2002 | Oosterhout |
| 6,408,435 B1 | 6/2002 | Sato |
| 6,408,437 B1 | 6/2002 | Hendricks |
| 6,411,696 B1 | 6/2002 | Iverson |
| 6,412,110 B1 | 6/2002 | Schein |
| 6,418,556 B1 | 7/2002 | Bennington |
| 6,419,137 B1 | 7/2002 | Marshall |
| 6,421,067 B1 | 7/2002 | Kamen |
| 6,425,000 B1 | 7/2002 | Carmello |
| 6,433,835 B1 | 8/2002 | Hartson |
| 6,434,524 B1 | 8/2002 | Weber |
| 6,434,614 B1 | 8/2002 | Blumenau |
| 6,437,836 B1 | 8/2002 | Huang |
| 6,441,832 B1 | 8/2002 | Tao |
| 6,442,332 B1 | 8/2002 | Knudson |
| 6,445,306 B1 | 9/2002 | Trovato |
| 6,445,398 B1 | 9/2002 | Gerba |
| 6,445,872 B1 | 9/2002 | Sano |
| 6,449,608 B1 | 9/2002 | Morita |
| 6,449,767 B1 | 9/2002 | Krapf |
| 6,453,471 B1 | 9/2002 | Klosterman |
| 6,456,621 B1 | 9/2002 | Wada |
| RE37,881 E | 10/2002 | Haines |
| 6,463,206 B1 | 10/2002 | Yuen |
| 6,463,585 B1 | 10/2002 | Hendricks |
| 6,466,080 B2 | 10/2002 | Kawai |
| 6,469,753 B1 | 10/2002 | Klosterman |
| 6,470,497 B1 | 10/2002 | Ellis |
| 6,473,463 B2 | 10/2002 | Agarwal |
| 6,473,559 B1 | 10/2002 | Knudson |
| 6,477,579 B1 | 11/2002 | Kunkel |
| 6,477,705 B1 | 11/2002 | Yuen |
| 6,480,667 B1 | 11/2002 | O'Connor |
| 6,480,889 B1 | 11/2002 | Saito |
| 6,483,986 B1 | 11/2002 | Krapf |
| 6,486,892 B1 | 11/2002 | Stern |
| 6,487,145 B1 | 11/2002 | Berhan |
| 6,487,362 B1 | 11/2002 | Yuen |
| 6,493,875 B1 | 12/2002 | Eames |
| 6,496,856 B1 | 12/2002 | Kenner |
| 6,496,981 B1 | 12/2002 | Wistendahl |
| 6,498,895 B2 | 12/2002 | Young |
| 6,499,138 B1 | 12/2002 | Swix |
| 6,505,348 B1 | 1/2003 | Knowles |
| 6,507,953 B1 | 1/2003 | Horlander |
| 6,509,908 B1 | 1/2003 | Croy |
| 6,515,680 B1 | 2/2003 | Hendricks |
| 6,516,323 B1 | 2/2003 | Kamba |
| 6,516,467 B1 | 2/2003 | Schindler |
| 6,526,577 B1 | 2/2003 | Knudson |
| 6,530,082 B1 | 3/2003 | Del Sesto |
| 6,530,083 B1 | 3/2003 | Liebenow |
| 6,532,589 B1 | 3/2003 | Proehl |
| 6,539,548 B1 | 3/2003 | Hendricks |
| 6,543,053 B1 | 4/2003 | Li |
| 6,545,578 B2 | 4/2003 | Yoshiyama |
| 6,545,722 B1 | 4/2003 | Schultheiss |
| 6,546,399 B1 | 4/2003 | Reed |
| 6,553,178 B2 | 4/2003 | Abecassis |
| 6,557,031 B1 | 4/2003 | Mimura |
| 6,564,005 B1 | 5/2003 | Berstis |
| 6,564,378 B1 | 5/2003 | Satterfield |
| 6,564,379 B1 | 5/2003 | Knudson |
| 6,564,383 B1 | 5/2003 | Combs |
| 6,567,982 B1 | 5/2003 | Howe |
| 6,571,279 B1 | 5/2003 | Herz |
| 6,571,390 B1 | 5/2003 | Dunn |
| 6,573,907 B1 | 6/2003 | Madrane |
| 6,577,735 B1 | 6/2003 | Bharat |
| 6,578,070 B1 | 6/2003 | Weaver |
| 6,588,013 B1 | 7/2003 | Lumley |
| 6,594,699 B1 | 7/2003 | Sahai |
| 6,594,826 B1 | 7/2003 | Rao |
| 6,598,228 B2 | 7/2003 | Hejna, Jr. |
| 6,600,503 B2 | 7/2003 | Stautner |
| 6,601,074 B1 | 7/2003 | Liebenow |
| 6,601,237 B1 | 7/2003 | Ten Kate |
| 6,603,488 B2 | 8/2003 | Humpleman |
| 6,611,654 B1 | 8/2003 | Shteyn |

(56) References Cited

U.S. PATENT DOCUMENTS

| | | |
|---|---|---|
| 6,611,842 B1 | 8/2003 | Brown |
| 6,611,958 B1 | 8/2003 | Shintani |
| 6,614,987 B1 | 9/2003 | Ismail |
| 6,622,171 B2 | 9/2003 | Gupta |
| 6,622,304 B1 | 9/2003 | Carhart |
| 6,622,306 B1 | 9/2003 | Kamada |
| 6,630,954 B1 | 10/2003 | Okada |
| 6,631,523 B1 | 10/2003 | Matthews, III |
| 6,637,029 B1 | 10/2003 | Maissel |
| 6,647,417 B1 | 11/2003 | Hunter |
| 6,654,933 B1 | 11/2003 | Abbott |
| 6,657,116 B1 | 12/2003 | Gunnerson |
| 6,661,468 B2 | 12/2003 | Alten |
| 6,665,869 B1 | 12/2003 | Ellis |
| 6,668,377 B1 | 12/2003 | Dunn |
| 6,670,971 B1 | 12/2003 | Oral |
| 6,671,882 B1 | 12/2003 | Murphy |
| 6,675,384 B1 | 1/2004 | Block |
| 6,675,385 B1 | 1/2004 | Wang |
| 6,675,386 B1 | 1/2004 | Hendricks |
| 6,678,004 B1 | 1/2004 | Schultheiss |
| 6,681,396 B1 | 1/2004 | Bates |
| 6,696,373 B2 | 2/2004 | Kinn |
| 6,698,020 B1 | 2/2004 | Zigmond |
| 6,701,060 B2 | 3/2004 | Yuen |
| 6,701,523 B1 | 3/2004 | Hancock |
| 6,701,527 B2 | 3/2004 | Schein |
| 6,704,028 B2 | 3/2004 | Wugofski |
| 6,704,931 B1 | 3/2004 | Schaffer |
| 6,711,622 B1 | 3/2004 | Fuller |
| 6,718,552 B1 | 4/2004 | Goode |
| 6,721,954 B1 | 4/2004 | Nickum |
| 6,727,914 B1 | 4/2004 | Gutta |
| 6,732,366 B1 | 5/2004 | Russo |
| 6,732,369 B1 | 5/2004 | Schein |
| 6,732,372 B2 | 5/2004 | Tomita |
| 6,738,978 B1 | 5/2004 | Hendricks |
| 6,741,617 B2 | 5/2004 | Rosengren |
| 6,742,183 B1 | 5/2004 | Reynolds |
| 6,744,967 B2 | 6/2004 | Kaminski |
| 6,745,391 B1 | 6/2004 | Macrae |
| 6,746,127 B2 | 6/2004 | Suyama |
| 6,750,881 B1 | 6/2004 | Appelman |
| 6,751,402 B1 | 6/2004 | Elliott |
| 6,751,802 B1 | 6/2004 | Huizer |
| 6,754,904 B1 | 6/2004 | Cooper |
| 6,756,987 B2 | 6/2004 | Goyins |
| 6,756,997 B1 | 6/2004 | Ward, III |
| 6,760,537 B2 | 7/2004 | Mankovitz |
| 6,760,538 B1 | 7/2004 | Bumgardner |
| 6,760,758 B1 | 7/2004 | Lund |
| 6,762,797 B1 | 7/2004 | Pelletier |
| 6,766,100 B1 | 7/2004 | Komar |
| 6,769,127 B1 | 7/2004 | Bonomi |
| 6,771,317 B2 | 8/2004 | Ellis |
| 6,771,886 B1 | 8/2004 | Mendelsohn |
| 6,772,433 B1 | 8/2004 | LaJoie |
| 6,792,197 B1 | 9/2004 | Helmstetter |
| 6,792,618 B1 | 9/2004 | Bendinelli |
| 6,799,174 B2 | 9/2004 | Chipman |
| 6,799,326 B2 | 9/2004 | Boylan, III |
| 6,799,327 B1 | 9/2004 | Reynolds |
| 6,813,775 B1 | 11/2004 | Finseth |
| 6,816,172 B1 | 11/2004 | Iki |
| 6,816,175 B1 | 11/2004 | Hamp |
| 6,816,904 B1 | 11/2004 | Ludwig |
| 6,820,278 B1 | 11/2004 | Ellis |
| 6,822,661 B2 | 11/2004 | Sai |
| 6,826,512 B2 | 11/2004 | Dara-Abrams |
| 6,828,993 B1 | 12/2004 | Hendricks |
| 6,832,385 B2 | 12/2004 | Young |
| 6,837,789 B2 | 1/2005 | Garahi |
| 6,837,791 B1 | 1/2005 | McNutt |
| 6,839,769 B2 | 1/2005 | Needham |
| 6,847,686 B2 | 1/2005 | Morad |
| 6,850,693 B2 | 2/2005 | Young |
| 6,859,799 B1 | 2/2005 | Yuen |
| 6,859,839 B1 | 2/2005 | Zahorjan |
| 6,865,746 B1 | 3/2005 | Herrington |
| 6,868,225 B1 | 3/2005 | Brown |
| 6,868,551 B1 | 3/2005 | Lawler |
| 6,869,799 B1 | 3/2005 | Guan |
| 6,871,146 B1 | 3/2005 | Kelly |
| 6,871,186 B1 | 3/2005 | Tuzhilin |
| 6,882,299 B1 | 4/2005 | Allport |
| 6,882,793 B1 | 4/2005 | Fu |
| 6,898,762 B2 | 5/2005 | Ellis |
| 6,901,603 B2 | 5/2005 | Zeidler |
| 6,920,278 B1 | 7/2005 | Yano |
| 6,920,281 B1 | 7/2005 | Agnibotri |
| 6,925,035 B2 | 8/2005 | Ueki |
| 6,925,246 B1 | 8/2005 | Behl |
| 6,925,567 B1 | 8/2005 | Hirata |
| 6,927,806 B2 | 8/2005 | Chan |
| 6,931,593 B1 | 8/2005 | Grooters |
| 6,934,964 B1 | 8/2005 | Schaffer |
| 6,938,101 B2 | 8/2005 | Hayes |
| 6,950,624 B2 | 9/2005 | Kim |
| 6,973,474 B2 | 12/2005 | Hatayama |
| 6,973,663 B1 | 12/2005 | Brown |
| 6,973,669 B2 | 12/2005 | Daniels |
| 6,983,478 B1 | 1/2006 | Grauch |
| 6,983,483 B2 | 1/2006 | Maze |
| 6,985,188 B1 | 1/2006 | Hurst |
| 6,993,788 B1 | 1/2006 | Lawrence |
| 7,003,792 B1 | 2/2006 | Yuen |
| 7,006,881 B1 | 2/2006 | Hoffberg |
| 7,013,339 B2 | 3/2006 | Schwager |
| 7,013,478 B1 | 3/2006 | Hendricks |
| 7,017,118 B1 | 3/2006 | Carroll |
| 7,017,171 B1 | 3/2006 | Horlander |
| 7,017,179 B1 | 3/2006 | Asamoto |
| 7,027,716 B1 | 4/2006 | Boyle |
| 7,028,323 B2 | 4/2006 | Franken |
| 7,028,326 B1 | 4/2006 | Westlake |
| 7,035,804 B2 | 4/2006 | Saindon |
| 7,039,643 B2 | 5/2006 | Sena |
| 7,039,935 B2 | 5/2006 | Knudson |
| 7,047,241 B1 | 5/2006 | Erickson |
| 7,047,377 B2 | 5/2006 | Elder |
| 7,047,549 B2 | 5/2006 | Schein |
| 7,047,550 B1 | 5/2006 | Yasukawa |
| 7,050,988 B2 | 5/2006 | Atcheson |
| 7,051,353 B2 | 5/2006 | Yamashita |
| 7,058,635 B1 | 6/2006 | Shah-Nazaroff |
| 7,069,576 B1 | 6/2006 | Knudson |
| 7,084,780 B2 | 8/2006 | Nguyen |
| 7,086,077 B2 | 8/2006 | Giammaressi |
| 7,088,910 B2 | 8/2006 | Potrebic |
| 7,095,949 B2 | 8/2006 | Okada |
| 7,096,486 B1 | 8/2006 | Ukai |
| 7,098,958 B2 | 8/2006 | Wredenhagen |
| 7,103,906 B1 | 9/2006 | Katz |
| 7,117,518 B1 | 10/2006 | Takahashi |
| 7,124,424 B2 | 10/2006 | Gordon |
| 7,127,735 B1 | 10/2006 | Lee |
| 7,134,131 B1 | 11/2006 | Hendricks |
| 7,143,430 B1 | 11/2006 | Fingerman |
| 7,143,432 B1 | 11/2006 | Brooks |
| 7,151,886 B2 | 12/2006 | Young |
| 7,152,236 B1 | 12/2006 | Wugofski |
| 7,155,451 B1 | 12/2006 | Torres |
| 7,159,232 B1 | 1/2007 | Blackketter |
| 7,159,235 B2 | 1/2007 | Son |
| 7,162,729 B2 | 1/2007 | Schein |
| 7,165,098 B1 | 1/2007 | Boyer |
| 7,168,086 B1 | 1/2007 | Carpenter |
| 7,171,677 B1 | 1/2007 | Ochiai |
| 7,178,161 B1 | 2/2007 | Fristoe |
| 7,181,128 B1 | 2/2007 | Wada |
| 7,185,355 B1 | 2/2007 | Ellis |
| 7,187,847 B2 | 3/2007 | Young |
| 7,188,356 B1 | 3/2007 | Miura |
| 7,194,755 B1 | 3/2007 | Nakata |

(56) References Cited

U.S. PATENT DOCUMENTS

| | | |
|---|---|---|
| 7,200,859 B1 | 4/2007 | Perlman |
| 7,209,640 B2 | 4/2007 | Young |
| 7,213,071 B2 | 5/2007 | DeLima |
| 7,218,839 B2 | 5/2007 | Plourde |
| 7,224,886 B2 | 5/2007 | Akamatsu |
| 7,229,012 B1 | 6/2007 | Enright |
| 7,229,354 B2 | 6/2007 | McNutt |
| 7,231,175 B2 | 6/2007 | Ellis |
| 7,237,253 B1 | 6/2007 | Blackketter |
| 7,240,356 B2 | 7/2007 | Iki |
| 7,242,324 B2 | 7/2007 | Lai |
| 7,243,139 B2 | 7/2007 | Ullman |
| 7,243,364 B2 | 7/2007 | Dunn |
| 7,248,778 B1 | 7/2007 | Anderson |
| 7,260,461 B2 | 8/2007 | Rao |
| 7,260,564 B1 | 8/2007 | Lynn |
| 7,263,709 B2 | 8/2007 | Krapf |
| 7,266,833 B2 | 9/2007 | Ward, III |
| 7,269,733 B1 | 9/2007 | O'Toole |
| 7,272,298 B1 | 9/2007 | Lang |
| 7,277,859 B2 | 10/2007 | Watanabe |
| 7,284,202 B1 | 10/2007 | Zenith |
| 7,287,267 B2 | 10/2007 | Knudson |
| 7,292,774 B1 | 11/2007 | Masters |
| 7,293,276 B2 | 11/2007 | Phillips |
| 7,293,279 B1 | 11/2007 | Asmussen |
| 7,302,697 B1 | 11/2007 | Wilson |
| 7,305,254 B2 | 12/2007 | Findikli |
| 7,328,450 B2 | 2/2008 | Macrae |
| 7,330,693 B1 | 2/2008 | Goss |
| 7,334,090 B2 | 2/2008 | Zellner |
| 7,343,614 B1 | 3/2008 | Hendricks |
| 7,343,616 B1 | 3/2008 | Takahashi |
| 7,346,920 B2 | 3/2008 | Lamkin |
| 7,349,976 B1 | 3/2008 | Glaser |
| 7,356,246 B1 | 4/2008 | Kobb |
| 7,356,829 B1 | 4/2008 | Terakado |
| 7,363,645 B1 | 4/2008 | Hendricks |
| 7,366,199 B1 | 4/2008 | Vaughan |
| 7,369,749 B2 | 5/2008 | Ichioka |
| 7,369,750 B2 | 5/2008 | Cheng |
| 7,372,976 B2 | 5/2008 | Rhoads |
| 7,392,532 B2 | 6/2008 | White |
| 7,403,693 B2 | 7/2008 | Shteyn |
| 7,437,751 B2 | 10/2008 | Daniels |
| 7,454,515 B2 | 11/2008 | Lamkin |
| 7,477,832 B2 | 1/2009 | Young |
| 7,480,929 B2 | 1/2009 | Klosterman |
| 7,483,964 B1 | 1/2009 | Jackson |
| 7,493,641 B2 | 2/2009 | Klosterman |
| 7,503,055 B2 | 3/2009 | Reynolds |
| 7,505,913 B2 | 3/2009 | Tobin |
| 7,519,268 B2 | 4/2009 | Juen |
| 7,529,465 B2 | 5/2009 | Barton |
| 7,533,400 B1 | 5/2009 | Hailey |
| 7,536,704 B2 | 5/2009 | Pierre |
| 7,540,010 B2 | 5/2009 | Hanaya |
| 7,543,320 B2 | 6/2009 | Schein |
| 7,567,747 B2 | 7/2009 | Hira |
| 7,574,723 B2 | 8/2009 | Putterman |
| 7,577,336 B2 | 8/2009 | Srinivasan |
| 7,599,753 B2 | 10/2009 | Taylor |
| 7,603,685 B2 | 10/2009 | Knudson |
| 7,614,066 B2 | 11/2009 | Urdang |
| 7,624,337 B2 | 11/2009 | Sull |
| 7,624,412 B2 | 11/2009 | McEvilly |
| 7,650,621 B2 | 1/2010 | Thomas |
| 7,665,109 B2 | 2/2010 | Matthews |
| 7,673,315 B1 | 3/2010 | Wong |
| 7,684,673 B2 | 3/2010 | Monroe |
| 7,689,510 B2 | 3/2010 | Lamkin |
| 7,689,995 B1 | 3/2010 | Francis |
| 7,721,307 B2 | 5/2010 | Hendricks |
| 7,757,254 B2 | 7/2010 | Shoff |
| 7,761,892 B2 | 7/2010 | Ellis |
| 7,765,235 B2 | 7/2010 | Day |
| 7,769,775 B2 | 8/2010 | Yuen |
| 7,770,196 B1 | 8/2010 | Hendricks |
| 7,774,816 B2 | 8/2010 | Bumgardner |
| 7,778,158 B2 | 8/2010 | Vogel |
| 7,779,445 B2 | 8/2010 | Ellis |
| 7,784,081 B2 | 8/2010 | Hassell |
| 7,787,010 B2 | 8/2010 | DiFrancesco |
| 7,788,393 B2 | 8/2010 | Pickens |
| 7,793,322 B2 | 9/2010 | Hassell |
| 7,793,326 B2 | 9/2010 | McCoskey |
| 7,802,285 B2 | 9/2010 | Ellis |
| 7,822,760 B2 | 10/2010 | Yuen |
| 7,823,055 B2 | 10/2010 | Sull |
| 7,827,585 B2 | 11/2010 | Hassell |
| 7,840,977 B2 | 11/2010 | Walker |
| 7,870,585 B2 | 1/2011 | Ellis |
| 7,873,760 B2 | 1/2011 | Versteeg |
| 7,877,766 B1 | 1/2011 | Wu |
| 7,895,625 B1 | 2/2011 | Bryan |
| 7,913,278 B2 | 3/2011 | Ellis |
| 7,917,933 B2 | 3/2011 | Thomas |
| 7,925,141 B2 | 4/2011 | Geer |
| 7,929,551 B2 | 4/2011 | Dietrich |
| 7,962,935 B2 | 6/2011 | Kurosaki |
| 7,962,946 B2 | 6/2011 | Creamer |
| 7,971,222 B2 | 6/2011 | Ellis |
| 7,987,174 B2 | 7/2011 | Yuen |
| 7,987,175 B2 | 7/2011 | Yuen |
| 7,992,163 B1 | 8/2011 | Jerding |
| 7,996,864 B2 | 8/2011 | Yuen |
| 8,001,564 B2 | 8/2011 | Hassell |
| 8,006,263 B2 | 8/2011 | Ellis |
| RE42,728 E | 9/2011 | Madrane |
| 8,046,801 B2 | 10/2011 | Ellis |
| 8,051,450 B2 | 11/2011 | Robarts |
| 8,060,905 B1 | 11/2011 | Hendricks |
| 8,069,460 B2 | 11/2011 | Young |
| 8,073,921 B2 | 12/2011 | Thomas |
| 8,078,751 B2 | 12/2011 | Janik |
| 8,082,568 B2 | 12/2011 | Ellis |
| 8,087,048 B2 | 12/2011 | Hassell |
| 8,091,110 B2 | 1/2012 | Ellis |
| 8,112,776 B2 | 2/2012 | Schein |
| 8,214,869 B2 | 7/2012 | Day |
| 8,265,458 B2 | 9/2012 | Helmstetter |
| 8,286,207 B1 | 10/2012 | Schneidewend |
| 8,295,674 B2 | 10/2012 | Sasaki |
| 8,302,127 B2 | 10/2012 | Klarfeld |
| 8,341,136 B2 | 12/2012 | Yuen |
| 8,341,137 B2 | 12/2012 | Yuen |
| 8,363,679 B2 | 1/2013 | Sorenson |
| 8,370,884 B2 | 2/2013 | Ellis |
| 8,381,249 B2 | 2/2013 | Rasanen |
| 8,397,255 B2 | 3/2013 | Wachtfogel |
| 8,478,750 B2 | 7/2013 | Rao |
| 8,528,019 B1 | 9/2013 | Dimitrova |
| 8,584,184 B2 | 11/2013 | Thomas |
| 8,613,024 B2 | 12/2013 | Bovenschulte |
| 8,627,389 B2 | 1/2014 | Craner |
| 8,707,366 B2 | 4/2014 | Wong |
| 8,832,742 B2 | 9/2014 | Rasanen |
| 2001/0001160 A1 | 5/2001 | Shoff |
| 2001/0004338 A1 | 6/2001 | Yankowski |
| 2001/0007147 A1 | 7/2001 | Goldschmidt Iki |
| 2001/0013122 A1 | 8/2001 | Hirata |
| 2001/0018693 A1 | 8/2001 | Jain |
| 2001/0022558 A1* | 9/2001 | Karr et al. ............ 342/450 |
| 2001/0022815 A1 | 9/2001 | Agarwal |
| 2001/0026287 A1 | 10/2001 | Watanabe |
| 2001/0026533 A1 | 10/2001 | Schwager |
| 2001/0027555 A1 | 10/2001 | Franken |
| 2001/0027562 A1 | 10/2001 | Schein |
| 2001/0028782 A1 | 10/2001 | Ohno |
| 2001/0029610 A1 | 10/2001 | Corvin |
| 2001/0033343 A1 | 10/2001 | Yap |
| 2001/0034237 A1 | 10/2001 | Garahi |
| 2001/0039660 A1 | 11/2001 | Vasilevsky |
| 2001/0042098 A1 | 11/2001 | Gupta |

(56) References Cited

U.S. PATENT DOCUMENTS

| | | |
|---|---|---|
| 2001/0042107 A1 | 11/2001 | Palm |
| 2001/0042246 A1 | 11/2001 | Yuen |
| 2001/0043700 A1 | 11/2001 | Shima |
| 2001/0043795 A1 | 11/2001 | Wood |
| 2001/0047298 A1 | 11/2001 | Moore |
| 2001/0049820 A1 | 12/2001 | Barton |
| 2002/0009283 A1 | 1/2002 | Ichioka |
| 2002/0010652 A1 | 1/2002 | Deguchi |
| 2002/0013941 A1 | 1/2002 | Ward, III |
| 2002/0013949 A1 | 1/2002 | Hejna |
| 2002/0026496 A1 | 2/2002 | Boyer |
| 2002/0026639 A1 | 2/2002 | Haneda |
| 2002/0026644 A1 | 2/2002 | Hatayama |
| 2002/0028026 A1 | 3/2002 | Chen |
| 2002/0032907 A1 | 3/2002 | Daniels |
| 2002/0040475 A1 | 4/2002 | Yap |
| 2002/0042913 A1 | 4/2002 | Ellis |
| 2002/0042914 A1 | 4/2002 | Walker |
| 2002/0043700 A1 | 4/2002 | Sasaki |
| 2002/0046315 A1 | 4/2002 | Miller |
| 2002/0048448 A1 | 4/2002 | Daniels |
| 2002/0056087 A1 | 5/2002 | Berezowski |
| 2002/0057892 A1 | 5/2002 | Mano |
| 2002/0057893 A1 | 5/2002 | Wood |
| 2002/0059342 A1 | 5/2002 | Gupta |
| 2002/0059588 A1 | 5/2002 | Huber |
| 2002/0059599 A1 | 5/2002 | Schein |
| 2002/0059602 A1 | 5/2002 | Macrae |
| 2002/0059610 A1 | 5/2002 | Ellis |
| 2002/0059621 A1 | 5/2002 | Thomas |
| 2002/0059626 A1 | 5/2002 | Lemmons |
| 2002/0059642 A1 | 5/2002 | Russ |
| 2002/0069218 A1 | 6/2002 | Sull |
| 2002/0069746 A1 | 6/2002 | Taira |
| 2002/0070982 A1 | 6/2002 | Hill |
| 2002/0073424 A1 | 6/2002 | Ward |
| 2002/0076203 A1 | 6/2002 | Takahashi |
| 2002/0078293 A1 | 6/2002 | Kou |
| 2002/0082901 A1 | 6/2002 | Dunning |
| 2002/0083439 A1 | 6/2002 | Eldering |
| 2002/0083455 A1 | 6/2002 | Sato |
| 2002/0085719 A1* | 7/2002 | Crosbie ............... 380/248 |
| 2002/0087588 A1 | 7/2002 | McBride |
| 2002/0088011 A1 | 7/2002 | Lamkin |
| 2002/0090203 A1 | 7/2002 | Mankovitz |
| 2002/0092017 A1 | 7/2002 | Klosterman |
| 2002/0095673 A1 | 7/2002 | Leung |
| 2002/0100044 A1 | 7/2002 | Daniels |
| 2002/0100052 A1 | 7/2002 | Daniels |
| 2002/0103920 A1 | 8/2002 | Berkun |
| 2002/0104091 A1 | 8/2002 | Prabhu |
| 2002/0110353 A1 | 8/2002 | Potrebic |
| 2002/0111172 A1 | 8/2002 | DeWolf |
| 2002/0112239 A1 | 8/2002 | Goldman |
| 2002/0112249 A1 | 8/2002 | Hendricks |
| 2002/0113824 A1 | 8/2002 | Myers, Jr. |
| 2002/0116509 A1 | 8/2002 | DeLaHuerga |
| 2002/0116712 A1 | 8/2002 | Schein |
| 2002/0118676 A1 | 8/2002 | Tonnby |
| 2002/0120935 A1 | 8/2002 | Huber |
| 2002/0124249 A1 | 9/2002 | Shintani |
| 2002/0129360 A1 | 9/2002 | Lee |
| 2002/0129368 A1 | 9/2002 | Schlack |
| 2002/0138840 A1 | 9/2002 | Schein |
| 2002/0138843 A1 | 9/2002 | Samaan |
| 2002/0144279 A1 | 10/2002 | Zhou |
| 2002/0147975 A1 | 10/2002 | Seo |
| 2002/0147977 A1 | 10/2002 | Hammett |
| 2002/0154888 A1 | 10/2002 | Allen |
| 2002/0166120 A1 | 11/2002 | Boylan |
| 2002/0166123 A1 | 11/2002 | Schrader |
| 2002/0169712 A1 | 11/2002 | Ginzboorg |
| 2002/0170068 A1 | 11/2002 | Rafey |
| 2002/0174424 A1 | 11/2002 | Chang |
| 2002/0174430 A1 | 11/2002 | Ellis |
| 2002/0174433 A1 | 11/2002 | Baumgartner |
| 2002/0174444 A1 | 11/2002 | Gatto |
| 2002/0180803 A1 | 12/2002 | Kaplan |
| 2002/0184457 A1 | 12/2002 | Yuasa |
| 2002/0184626 A1 | 12/2002 | Darbee |
| 2002/0184629 A1 | 12/2002 | Sie |
| 2002/0186958 A1 | 12/2002 | Ikeda |
| 2002/0188735 A1 | 12/2002 | Needham |
| 2002/0188944 A1 | 12/2002 | Noble |
| 2002/0191954 A1 | 12/2002 | Beach |
| 2002/0194011 A1 | 12/2002 | Boies |
| 2002/0194585 A1 | 12/2002 | Connelly |
| 2002/0194596 A1 | 12/2002 | Srivastava |
| 2002/0194598 A1 | 12/2002 | Connelly |
| 2002/0194607 A1 | 12/2002 | Connelly |
| 2002/0199185 A1 | 12/2002 | Kaminski |
| 2003/0005432 A1 | 1/2003 | Ellis |
| 2003/0005445 A1 | 1/2003 | Schein |
| 2003/0005446 A1 | 1/2003 | Jaff |
| 2003/0009766 A1 | 1/2003 | Marolda |
| 2003/0012554 A1 | 1/2003 | Zeidler |
| 2003/0012555 A1 | 1/2003 | Yuen |
| 2003/0028878 A1 | 2/2003 | Schein |
| 2003/0028889 A1 | 2/2003 | McCoskey |
| 2003/0031465 A1 | 2/2003 | Blake |
| 2003/0033601 A1 | 2/2003 | Sakata |
| 2003/0035404 A1 | 2/2003 | Ozluturk |
| 2003/0037068 A1 | 2/2003 | Thomas |
| 2003/0037336 A1 | 2/2003 | Leftwich |
| 2003/0040962 A1 | 2/2003 | Lewis |
| 2003/0044165 A1 | 3/2003 | Wood |
| 2003/0046437 A1 | 3/2003 | Eytchison |
| 2003/0061610 A1 | 3/2003 | Errico |
| 2003/0066084 A1 | 4/2003 | Kaars |
| 2003/0066085 A1 | 4/2003 | Boyer |
| 2003/0066092 A1 | 4/2003 | Wagner |
| 2003/0067554 A1 | 4/2003 | Klarfeld |
| 2003/0068154 A1 | 4/2003 | Zylka |
| 2003/0072556 A1 | 4/2003 | Okujima |
| 2003/0084461 A1 | 5/2003 | Hoang |
| 2003/0088554 A1 | 5/2003 | Ryan |
| 2003/0088613 A1 | 5/2003 | Goldschmidt Iki |
| 2003/0088872 A1 | 5/2003 | Maissel |
| 2003/0088873 A1 | 5/2003 | McCoy |
| 2003/0093329 A1 | 5/2003 | Gutta |
| 2003/0097227 A1 | 5/2003 | Bloch |
| 2003/0098891 A1 | 5/2003 | Molander |
| 2003/0099457 A1 | 5/2003 | Takahashi |
| 2003/0101104 A1 | 5/2003 | Dimitrova |
| 2003/0103088 A1 | 6/2003 | Dresti |
| 2003/0103645 A1 | 6/2003 | Levy |
| 2003/0105813 A1 | 6/2003 | Mizutani |
| 2003/0110499 A1 | 6/2003 | Knudson |
| 2003/0115602 A1 | 6/2003 | Knee |
| 2003/0118323 A1 | 6/2003 | Ismail |
| 2003/0126607 A1 | 7/2003 | Phillips |
| 2003/0131356 A1 | 7/2003 | Proehl |
| 2003/0135860 A1 | 7/2003 | Dureau |
| 2003/0142957 A1 | 7/2003 | Young |
| 2003/0149975 A1 | 8/2003 | Eldering |
| 2003/0149980 A1 | 8/2003 | Ellis |
| 2003/0149988 A1 | 8/2003 | Ellis |
| 2003/0152096 A1 | 8/2003 | Chapman |
| 2003/0154485 A1 | 8/2003 | Johnson |
| 2003/0154486 A1 | 8/2003 | Dunn |
| 2003/0159157 A1 | 8/2003 | Chan |
| 2003/0162096 A1 | 8/2003 | Michot |
| 2003/0163813 A1 | 8/2003 | Klosterman |
| 2003/0163832 A1 | 8/2003 | Tsuria |
| 2003/0164858 A1 | 9/2003 | Klosterman |
| 2003/0165324 A1 | 9/2003 | O'Connor |
| 2003/0167471 A1 | 9/2003 | Roth |
| 2003/0188310 A1 | 10/2003 | Klosterman |
| 2003/0188311 A1 | 10/2003 | Yuen |
| 2003/0194260 A1 | 10/2003 | Ward |
| 2003/0196201 A1 | 10/2003 | Schein |
| 2003/0196203 A1 | 10/2003 | Ellis |
| 2003/0198462 A1 | 10/2003 | Bumgardner |
| 2003/0204847 A1 | 10/2003 | Ellis |

(56) References Cited

U.S. PATENT DOCUMENTS

| | | |
|---|---|---|
| 2003/0206710 A1 | 11/2003 | Ferman |
| 2003/0206719 A1 | 11/2003 | Bumgardner |
| 2003/0208756 A1 | 11/2003 | Macrae |
| 2003/0208758 A1 | 11/2003 | Schein |
| 2003/0208763 A1 | 11/2003 | McElhatten |
| 2003/0208767 A1 | 11/2003 | Williamson |
| 2003/0214955 A1 | 11/2003 | Kim |
| 2003/0217057 A1 | 11/2003 | Kuroiwa |
| 2003/0226147 A1 | 12/2003 | Richmond |
| 2003/0229900 A1 | 12/2003 | Reisman |
| 2003/0237085 A1 | 12/2003 | Boston |
| 2004/0001690 A1 | 1/2004 | Boston |
| 2004/0003413 A1 | 1/2004 | Boston |
| 2004/0008971 A1 | 1/2004 | Young |
| 2004/0008972 A1 | 1/2004 | Haken |
| 2004/0010807 A1 | 1/2004 | Urdang |
| 2004/0019900 A1 | 1/2004 | Knightbridge |
| 2004/0031050 A1 | 2/2004 | Klosterman |
| 2004/0049787 A1 | 3/2004 | Maissel |
| 2004/0049794 A1 | 3/2004 | Shao |
| 2004/0060063 A1 | 3/2004 | Russ |
| 2004/0070594 A1 | 4/2004 | Burke |
| 2004/0073924 A1 | 4/2004 | Pendakur |
| 2004/0078809 A1 | 4/2004 | Drazin |
| 2004/0078815 A1 | 4/2004 | Lemmons |
| 2004/0078820 A1 | 4/2004 | Nickum |
| 2004/0088731 A1 | 5/2004 | Putterman |
| 2004/0098744 A1 | 5/2004 | Gutta |
| 2004/0101271 A1 | 5/2004 | Boston |
| 2004/0103434 A1 | 5/2004 | Ellis |
| 2004/0103439 A1 | 5/2004 | Macrae |
| 2004/0111742 A1 | 6/2004 | Hendricks |
| 2004/0111745 A1 | 6/2004 | Schein |
| 2004/0111756 A1 | 6/2004 | Stuckman |
| 2004/0117831 A1 | 6/2004 | Ellis |
| 2004/0117845 A1 | 6/2004 | Karaoguz |
| 2004/0125779 A1 | 7/2004 | Kelton |
| 2004/0128514 A1 | 7/2004 | Rhoads |
| 2004/0128685 A1 | 7/2004 | Hassell |
| 2004/0128686 A1 | 7/2004 | Boyer |
| 2004/0128690 A1 | 7/2004 | Zohar Ariely |
| 2004/0133655 A1 | 7/2004 | Yen |
| 2004/0133907 A1 | 7/2004 | Rodriguez |
| 2004/0139233 A1 | 7/2004 | Kellerman |
| 2004/0139465 A1 | 7/2004 | Matthews |
| 2004/0154040 A1 | 8/2004 | Ellis |
| 2004/0156614 A1 | 8/2004 | Bumgardner |
| 2004/0160862 A1 | 8/2004 | Ueki |
| 2004/0163104 A1 | 8/2004 | Schein |
| 2004/0181814 A1 | 9/2004 | Ellis |
| 2004/0187150 A1 | 9/2004 | Gonder |
| 2004/0187164 A1 | 9/2004 | Kandasamy |
| 2004/0194131 A1 | 9/2004 | Ellis |
| 2004/0194138 A1 | 9/2004 | Boylan |
| 2004/0210932 A1 | 10/2004 | Mori |
| 2004/0210935 A1 | 10/2004 | Schein |
| 2004/0220091 A1 | 11/2004 | Adam |
| 2004/0221310 A1 | 11/2004 | Herrington |
| 2004/0226034 A1 | 11/2004 | Kaczowka |
| 2004/0226042 A1 | 11/2004 | Ellis |
| 2004/0237104 A1 | 11/2004 | Cooper |
| 2004/0255326 A1 | 12/2004 | Hicks, III |
| 2004/0257939 A1 | 12/2004 | Kawamura |
| 2004/0259537 A1 | 12/2004 | Ackley |
| 2004/0261108 A1 | 12/2004 | Yuen |
| 2004/0264920 A1 | 12/2004 | Helmstetter |
| 2004/0267965 A1 | 12/2004 | Vasudevan |
| 2005/0013462 A1 | 1/2005 | Rhoads |
| 2005/0015804 A1 | 1/2005 | LaJoie |
| 2005/0015815 A1 | 1/2005 | Shoff |
| 2005/0028208 A1 | 2/2005 | Ellis |
| 2005/0028218 A1 | 2/2005 | Blake |
| 2005/0033760 A1 | 2/2005 | Fuller |
| 2005/0039208 A1 | 2/2005 | Veeck |
| 2005/0044567 A1 | 2/2005 | Young |
| 2005/0046174 A1 | 3/2005 | Botes |
| 2005/0050218 A1 | 3/2005 | Sheldon |
| 2005/0055715 A1 | 3/2005 | Minnick |
| 2005/0066353 A1 | 3/2005 | Fransdonk |
| 2005/0071876 A1 | 3/2005 | van Beek |
| 2005/0081159 A1 | 4/2005 | Gupta |
| 2005/0097622 A1 | 5/2005 | Zigmond |
| 2005/0102324 A1 | 5/2005 | Spring |
| 2005/0105528 A1 | 5/2005 | Kobayashi |
| 2005/0120003 A1 | 6/2005 | Drury |
| 2005/0120373 A1 | 6/2005 | Thomas |
| 2005/0123001 A1 | 6/2005 | Craven |
| 2005/0129049 A1 | 6/2005 | Srinivasan |
| 2005/0132264 A1 | 6/2005 | Joshi |
| 2005/0138137 A1 | 6/2005 | Encarnacion |
| 2005/0138305 A1 | 6/2005 | Zellner |
| 2005/0138658 A1 | 6/2005 | Bryan |
| 2005/0138660 A1 | 6/2005 | Boyer |
| 2005/0155056 A1 | 7/2005 | Knee |
| 2005/0157217 A1 | 7/2005 | Hendricks |
| 2005/0160283 A1 | 7/2005 | Hirata |
| 2005/0160458 A1 | 7/2005 | Baumgartner |
| 2005/0160461 A1 | 7/2005 | Baumgartner |
| 2005/0177859 A1 | 8/2005 | Valentino |
| 2005/0182759 A1 | 8/2005 | Yuen |
| 2005/0183123 A1 | 8/2005 | Lee |
| 2005/0188415 A1 | 8/2005 | Riley |
| 2005/0193015 A1 | 9/2005 | Logston |
| 2005/0193414 A1 | 9/2005 | Horvitz |
| 2005/0198006 A1 | 9/2005 | Boicey |
| 2005/0198668 A1 | 9/2005 | Yuen |
| 2005/0204388 A1 | 9/2005 | Knudson |
| 2005/0210526 A1 | 9/2005 | Levy |
| 2005/0213938 A1 | 9/2005 | Ozawa |
| 2005/0227611 A1 | 10/2005 | Ellis |
| 2005/0229214 A1 | 10/2005 | Young |
| 2005/0229215 A1 | 10/2005 | Schein |
| 2005/0234992 A1 | 10/2005 | Haberman |
| 2005/0235320 A1 | 10/2005 | Maze |
| 2005/0235323 A1 | 10/2005 | Ellis |
| 2005/0238168 A1 | 10/2005 | Lee |
| 2005/0240962 A1 | 10/2005 | Cooper |
| 2005/0240968 A1 | 10/2005 | Knudson |
| 2005/0244138 A1 | 11/2005 | O'Connor |
| 2005/0246393 A1 | 11/2005 | Coates |
| 2005/0249130 A1 | 11/2005 | Schutte |
| 2005/0251822 A1 | 11/2005 | Knowles |
| 2005/0251827 A1 | 11/2005 | Ellis |
| 2005/0265169 A1 | 12/2005 | Yoshimaru |
| 2005/0267819 A1 | 12/2005 | Kaplan |
| 2005/0271357 A1 | 12/2005 | Adler |
| 2005/0271363 A1 | 12/2005 | Tanikawa |
| 2005/0271364 A1 | 12/2005 | Collar |
| 2005/0271365 A1 | 12/2005 | Hisatomi |
| 2005/0271366 A1 | 12/2005 | Wiinter |
| 2005/0273819 A1 | 12/2005 | Knudson |
| 2005/0278741 A1 | 12/2005 | Robarts |
| 2005/0283796 A1 | 12/2005 | Flickinger |
| 2005/0283800 A1 | 12/2005 | Ellis |
| 2005/0289618 A1 | 12/2005 | Hardin |
| 2006/0004685 A1 | 1/2006 | Pyhalammi |
| 2006/0010470 A1 | 1/2006 | Kurosaki |
| 2006/0015888 A1 | 1/2006 | Shih |
| 2006/0031883 A1 | 2/2006 | Ellis |
| 2006/0034341 A1 | 2/2006 | Vasudevan |
| 2006/0037044 A1 | 2/2006 | Daniels |
| 2006/0037054 A1 | 2/2006 | McDowell |
| 2006/0062550 A1 | 3/2006 | Lee |
| 2006/0064728 A1 | 3/2006 | Son |
| 2006/0080707 A1 | 4/2006 | Laksono |
| 2006/0083484 A1 | 4/2006 | Wada |
| 2006/0085825 A1 | 4/2006 | Istvan |
| 2006/0085826 A1 | 4/2006 | Funk |
| 2006/0085835 A1 | 4/2006 | Istvan |
| 2006/0090186 A1 | 4/2006 | Santangelo |
| 2006/0095942 A1 | 5/2006 | van Beek |
| 2006/0111038 A1 | 5/2006 | Tatsumi |
| 2006/0112410 A1 | 5/2006 | Poli |
| 2006/0136965 A1 | 6/2006 | Ellis |

(56) References Cited

U.S. PATENT DOCUMENTS

| | | |
|---|---|---|
| 2006/0136966 A1 | 6/2006 | Folk |
| 2006/0140584 A1 | 6/2006 | Ellis |
| 2006/0143665 A1 | 6/2006 | Meek |
| 2006/0146787 A1 | 7/2006 | Wijnands |
| 2006/0165379 A1 | 7/2006 | Agnihotri |
| 2006/0168620 A1 | 7/2006 | Schein |
| 2006/0173838 A1 | 8/2006 | Garg |
| 2006/0174270 A1 | 8/2006 | Westberg |
| 2006/0206912 A1 | 9/2006 | Klarfeld |
| 2006/0212904 A1 | 9/2006 | Klarfeld |
| 2006/0215650 A1 | 9/2006 | Wollmershauser |
| 2006/0218601 A1 | 9/2006 | Michel |
| 2006/0238648 A1 | 10/2006 | Wogsberg |
| 2006/0248570 A1 | 11/2006 | Witwer |
| 2006/0253874 A1 | 11/2006 | Stark |
| 2006/0259949 A1 | 11/2006 | Schaefer |
| 2006/0271953 A1 | 11/2006 | Jacoby |
| 2007/0011206 A1 | 1/2007 | Gupta |
| 2007/0011709 A1 | 1/2007 | Katz |
| 2007/0022032 A1 | 1/2007 | Anderson |
| 2007/0022442 A1 | 1/2007 | Gil |
| 2007/0028267 A1 | 2/2007 | Ostojic |
| 2007/0055689 A1 | 3/2007 | Rhoads |
| 2007/0055980 A1 | 3/2007 | Megeid |
| 2007/0067800 A1 | 3/2007 | Wachtfogel |
| 2007/0071399 A1 | 3/2007 | Ellis |
| 2007/0074245 A1 | 3/2007 | Nyako |
| 2007/0089160 A1 | 4/2007 | Ando |
| 2007/0094684 A1 | 4/2007 | Schein |
| 2007/0094702 A1 | 4/2007 | Khare |
| 2007/0101377 A1 | 5/2007 | Six |
| 2007/0104456 A1 | 5/2007 | Craner |
| 2007/0107010 A1 | 5/2007 | Jolna |
| 2007/0116048 A1 | 5/2007 | Addington |
| 2007/0121678 A1 | 5/2007 | Brooks |
| 2007/0124781 A1 | 5/2007 | Casey |
| 2007/0136751 A1 | 6/2007 | Garbow |
| 2007/0136753 A1 | 6/2007 | Bovenschulte |
| 2007/0147351 A1 | 6/2007 | Dietrich |
| 2007/0157234 A1 | 7/2007 | Walker |
| 2007/0157240 A1 | 7/2007 | Walker |
| 2007/0157241 A1 | 7/2007 | Walker |
| 2007/0157242 A1 | 7/2007 | Cordray |
| 2007/0157260 A1 | 7/2007 | Walker |
| 2007/0157266 A1 | 7/2007 | Ellis |
| 2007/0162661 A1 | 7/2007 | Fu |
| 2007/0174774 A1 | 7/2007 | Lerman |
| 2007/0180072 A1 | 8/2007 | Siripunkaw |
| 2007/0180465 A1 | 8/2007 | Ou |
| 2007/0198659 A1 | 8/2007 | Lam |
| 2007/0204285 A1 | 8/2007 | Louw |
| 2007/0204308 A1 | 8/2007 | Nicholas |
| 2007/0204311 A1 | 8/2007 | Hasek |
| 2007/0212023 A1 | 9/2007 | Whillock |
| 2007/0220024 A1 | 9/2007 | Putterman |
| 2007/0220580 A1 | 9/2007 | Putterman |
| 2007/0245371 A1 | 10/2007 | Quinard |
| 2007/0255755 A1 | 11/2007 | Zhang |
| 2007/0266401 A1 | 11/2007 | Hallberg |
| 2007/0271582 A1 | 11/2007 | Ellis |
| 2007/0282969 A1 | 12/2007 | Dietrich |
| 2007/0283046 A1 | 12/2007 | Dietrich |
| 2008/0010655 A1 | 1/2008 | Ellis |
| 2008/0013429 A1 | 1/2008 | Chen |
| 2008/0034396 A1 | 2/2008 | Lev |
| 2008/0060001 A1 | 3/2008 | Logan |
| 2008/0066016 A1 | 3/2008 | Dowdy |
| 2008/0077957 A1 | 3/2008 | Schein |
| 2008/0086747 A1 | 4/2008 | Rasanen |
| 2008/0092168 A1 | 4/2008 | Logan |
| 2008/0098436 A1 | 4/2008 | White |
| 2008/0115169 A1 | 5/2008 | Ellis |
| 2008/0133378 A1 | 6/2008 | Tobin |
| 2008/0133485 A1 | 6/2008 | Yuen |
| 2008/0170622 A1 | 7/2008 | Gordon |
| 2008/0175143 A1 | 7/2008 | Ansley |
| 2008/0177706 A1 | 7/2008 | Yuen |
| 2008/0178221 A1 | 7/2008 | Schein |
| 2008/0184304 A1 | 7/2008 | Ellis |
| 2008/0184305 A1 | 7/2008 | Schein |
| 2008/0184308 A1 | 7/2008 | Herrington |
| 2008/0184312 A1 | 7/2008 | Schein |
| 2008/0184313 A1 | 7/2008 | Knudson |
| 2008/0184315 A1 | 7/2008 | Ellis |
| 2008/0184319 A1 | 7/2008 | Mankovitz |
| 2008/0184322 A1 | 7/2008 | Blake |
| 2008/0189742 A1 | 8/2008 | Ellis |
| 2008/0189743 A1 | 8/2008 | Ellis |
| 2008/0189744 A1 | 8/2008 | Schein |
| 2008/0189745 A1 | 8/2008 | Hassell |
| 2008/0216136 A1 | 9/2008 | Pfeffer |
| 2008/0229379 A1 | 9/2008 | Akhter |
| 2008/0232769 A1 | 9/2008 | Jureczki |
| 2008/0235725 A1 | 9/2008 | Hendricks |
| 2008/0263227 A1 | 10/2008 | Roberts |
| 2008/0263600 A1 | 10/2008 | Olague |
| 2008/0288980 A1 | 11/2008 | Schein |
| 2008/0307477 A1 | 12/2008 | Omerick |
| 2008/0320540 A1 | 12/2008 | Brooks |
| 2009/0019492 A1 | 1/2009 | Grasset |
| 2009/0025027 A1 | 1/2009 | Craner |
| 2009/0025052 A1 | 1/2009 | Schlack |
| 2009/0031335 A1 | 1/2009 | Hendricks |
| 2009/0044226 A1 | 2/2009 | Ellis |
| 2009/0060468 A1 | 3/2009 | Carlberg |
| 2009/0060469 A1 | 3/2009 | Olague |
| 2009/0070817 A1 | 3/2009 | Ellis |
| 2009/0074380 A1 | 3/2009 | Boston |
| 2009/0077589 A1 | 3/2009 | Boyer |
| 2009/0094113 A1 | 4/2009 | Berry |
| 2009/0138922 A1 | 5/2009 | Thomas |
| 2009/0241144 A1 | 9/2009 | LaJoie |
| 2009/0271286 A1 | 10/2009 | Tobin |
| 2009/0271818 A1 | 10/2009 | Schlack |
| 2009/0297124 A1 | 12/2009 | Ng |
| 2010/0015999 A1 | 1/2010 | Belz |
| 2010/0115413 A1 | 5/2010 | Schein |
| 2010/0115541 A1 | 5/2010 | Schein |
| 2010/0175090 A1 | 7/2010 | Cordray |
| 2010/0186034 A1 | 7/2010 | Walker |
| 2010/0211969 A1 | 8/2010 | Schein |
| 2010/0211975 A1 | 8/2010 | Boyer |
| 2010/0247065 A1 | 9/2010 | Cooper |
| 2010/0312761 A1 | 12/2010 | Yuen |
| 2010/0312795 A1 | 12/2010 | Yuen |
| 2010/0313130 A1 | 12/2010 | Yuen |
| 2010/0313131 A1 | 12/2010 | Yuen |
| 2011/0004897 A1 | 1/2011 | Alexander |
| 2011/0013885 A1 | 1/2011 | Wong |
| 2011/0030027 A1 | 2/2011 | Nishioka |
| 2011/0131607 A1 | 6/2011 | Thomas |
| 2011/0173660 A1 | 7/2011 | Schein |
| 2011/0185387 A1 | 7/2011 | Schein |
| 2011/0185392 A1 | 7/2011 | Walker |
| 2011/0209170 A1 | 8/2011 | Schein |
| 2011/0258663 A1 | 10/2011 | Lemmons |
| 2011/0265124 A1 | 10/2011 | Goldenberg |
| 2012/0003989 A1 | 1/2012 | Gravino |
| 2012/0079539 A1 | 3/2012 | Schein |
| 2012/0116861 A1* | 5/2012 | Dobyns ................ 705/14.34 |
| 2012/0135744 A1* | 5/2012 | Curtis et al. ............ 455/456.1 |
| 2012/0209843 A1 | 8/2012 | DeVries |
| 2012/0239661 A1 | 9/2012 | Giblin |
| 2012/0272270 A1 | 10/2012 | Boyer |
| 2012/0304211 A1 | 11/2012 | Berezowski |
| 2013/0097145 A1 | 4/2013 | Yuen |
| 2013/0304586 A1 | 11/2013 | Angles |
| 2014/0040938 A1 | 2/2014 | Thomas |

FOREIGN PATENT DOCUMENTS

| | | |
|---|---|---|
| CA | 1030505 | 5/1978 |
| CA | 1187197 | 5/1985 |
| CA | 1188811 | 6/1985 |

(56) References Cited

FOREIGN PATENT DOCUMENTS

| | | |
|---|---|---|
| CA | 1196082 | 10/1985 |
| CA | 1200911 | 2/1986 |
| CA | 2091160 | 3/1992 |
| CA | 2151458 | 6/1994 |
| CA | 2345161 | 6/1994 |
| CA | 2164608 | 12/1994 |
| CA | 2257971 | 12/1997 |
| CA | 2260993 | 2/1998 |
| CA | 2764753 | 6/1998 |
| CA | 2285645 | 7/1998 |
| CA | 2312326 | 6/1999 |
| CA | 2364020 | 5/2002 |
| CA | 2232003 | 6/2002 |
| CA | 2635571 | 5/2009 |
| DE | 2918846 | 11/1980 |
| DE | 3151492 | 7/1983 |
| DE | 3246225 | 6/1984 |
| DE | 3337204 | 4/1985 |
| DE | 3610600 | 10/1987 |
| DE | 3621263 | 1/1988 |
| DE | 3640436 | 6/1988 |
| DE | 3909334 | 7/1993 |
| DE | 4201031 | 7/1993 |
| DE | 4217246 | 12/1993 |
| DE | 4240187 | 6/1994 |
| DE | 4407701 | 9/1995 |
| DE | 4431438 | 3/1996 |
| DE | 4440174 | 5/1996 |
| DE | 4440419 | 5/1996 |
| DE | 19502922 | 8/1996 |
| DE | 19531121 | 2/1997 |
| DE | 19615437 | 7/1997 |
| DE | 19740079 | 3/1999 |
| DE | 19931046 | 1/2001 |
| EP | 0072153 | 2/1983 |
| EP | 0122626 | 10/1984 |
| EP | 0133985 | 3/1985 |
| EP | 0160545 | 11/1985 |
| EP | 0276425 | 8/1988 |
| EP | 0396062 | 11/1990 |
| EP | 0401930 | 12/1990 |
| EP | 0408892 | 1/1991 |
| EP | 0420123 | 4/1991 |
| EP | 0424469 | 5/1991 |
| EP | 0424648 | 5/1991 |
| EP | 0439281 | 7/1991 |
| EP | 0439290 | 7/1991 |
| EP | 0444496 | 9/1991 |
| EP | 0447968 | 9/1991 |
| EP | 0463451 | 1/1992 |
| EP | 0472147 | 2/1992 |
| EP | 0472521 | 3/1992 |
| EP | 0477754 | 4/1992 |
| EP | 0477756 | 4/1992 |
| EP | 0492853 | 7/1992 |
| EP | 0525427 | 2/1993 |
| EP | 0532322 | 3/1993 |
| EP | 0535749 | 4/1993 |
| EP | 0550911 | 7/1993 |
| EP | 0560593 | 9/1993 |
| EP | 0572090 | 12/1993 |
| EP | 0575956 | 12/1993 |
| EP | 0583196 | 2/1994 |
| EP | 0584991 | 3/1994 |
| EP | 0605115 | 7/1994 |
| EP | 0617563 | 9/1994 |
| EP | 0624039 | 11/1994 |
| EP | 0624040 | 11/1994 |
| EP | 0627857 | 12/1994 |
| EP | 0631437 | 12/1994 |
| EP | 0660221 | 12/1994 |
| EP | 0644689 | 3/1995 |
| EP | 0650114 | 4/1995 |
| EP | 0658048 | 6/1995 |
| EP | 0662769 | 7/1995 |
| EP | 0662771 | 7/1995 |
| EP | 0665551 | 8/1995 |
| EP | 0682452 | 11/1995 |
| EP | 0696140 | 2/1996 |
| EP | 0705036 | 4/1996 |
| EP | 0711073 | 5/1996 |
| EP | 0711076 | 5/1996 |
| EP | 0713334 | 5/1996 |
| EP | 0721253 | 7/1996 |
| EP | 0723369 | 7/1996 |
| EP | 0725539 | 8/1996 |
| EP | 0737979 | 10/1996 |
| EP | 0737980 | 10/1996 |
| EP | 0744853 | 11/1996 |
| EP | 0744866 | 11/1996 |
| EP | 0751648 | 1/1997 |
| EP | 0752767 | 1/1997 |
| EP | 0753964 | 1/1997 |
| EP | 0757873 | 1/1997 |
| EP | 0758833 | 2/1997 |
| EP | 0762657 | 3/1997 |
| EP | 0762751 | 3/1997 |
| EP | 0762756 | 3/1997 |
| EP | 0763938 | 3/1997 |
| EP | 0772360 | 5/1997 |
| EP | 0773682 | 5/1997 |
| EP | 0774853 | 5/1997 |
| EP | 0774866 | 5/1997 |
| EP | 0774868 | 5/1997 |
| EP | 0775417 | 5/1997 |
| EP | 0782332 | 7/1997 |
| EP | 0784405 | 7/1997 |
| EP | 0789488 | 8/1997 |
| EP | 0793225 | 9/1997 |
| EP | 0795994 | 9/1997 |
| EP | 0797355 | 9/1997 |
| EP | 0239884 | 10/1997 |
| EP | 0801389 | 10/1997 |
| EP | 0801390 | 10/1997 |
| EP | 0805594 | 11/1997 |
| EP | 0806721 | 12/1997 |
| EP | 0821856 | 2/1998 |
| EP | 0822713 | 2/1998 |
| EP | 0822718 | 2/1998 |
| EP | 0827340 | 3/1998 |
| EP | 0834798 | 4/1998 |
| EP | 0836320 | 4/1998 |
| EP | 0836321 | 4/1998 |
| EP | 0837599 | 4/1998 |
| EP | 0843468 | 5/1998 |
| EP | 0848554 | 6/1998 |
| EP | 0849948 | 6/1998 |
| EP | 0849958 | 6/1998 |
| EP | 0851681 | 7/1998 |
| EP | 0852361 | 7/1998 |
| EP | 0852442 | 7/1998 |
| EP | 0854645 | 7/1998 |
| EP | 0854654 | 7/1998 |
| EP | 0673160 | 8/1998 |
| EP | 0856847 | 8/1998 |
| EP | 0858223 | 8/1998 |
| EP | 0872834 | 10/1998 |
| EP | 0874524 | 10/1998 |
| EP | 0880856 | 12/1998 |
| EP | 0892554 | 1/1999 |
| EP | 0897242 | 2/1999 |
| EP | 0905985 | 3/1999 |
| EP | 0921682 | 6/1999 |
| EP | 0924927 | 6/1999 |
| EP | 0932275 | 7/1999 |
| EP | 0935393 | 8/1999 |
| EP | 0936811 | 8/1999 |
| EP | 0940983 | 9/1999 |
| EP | 0940985 | 9/1999 |
| EP | 0944253 | 9/1999 |
| EP | 0944257 | 9/1999 |
| EP | 0742669 | 10/1999 |
| EP | 0963119 | 12/1999 |
| EP | 0969661 | 1/2000 |

(56) References Cited

FOREIGN PATENT DOCUMENTS

| | | |
|---|---|---|
| EP | 0986046 | 3/2000 |
| EP | 0988876 | 3/2000 |
| EP | 1014715 | 6/2000 |
| EP | 1059749 | 12/2000 |
| EP | 1094665 | 4/2001 |
| EP | 1095504 | 5/2001 |
| EP | 1099339 | 5/2001 |
| EP | 1099341 | 5/2001 |
| EP | 1107588 | 6/2001 |
| EP | 0806111 | 10/2001 |
| EP | 1152605 | 11/2001 |
| EP | 1158793 | 11/2001 |
| EP | 1187467 | 3/2002 |
| EP | 1213919 | 6/2002 |
| EP | 1217787 | 6/2002 |
| EP | 0969662 | 7/2002 |
| EP | 1237372 | 9/2002 |
| EP | 1244300 | 9/2002 |
| EP | 1271952 | 1/2003 |
| EP | 1292137 | 3/2003 |
| EP | 1327209 | 7/2003 |
| EP | 0945003 | 8/2003 |
| EP | 1355489 | 10/2003 |
| EP | 1377049 | 1/2004 |
| EP | 1473934 | 11/2004 |
| EP | 1515549 | 3/2005 |
| EP | 1687951 | 5/2005 |
| EP | 1538838 | 6/2005 |
| EP | 1581001 | 9/2005 |
| EP | 0848383 | 10/2005 |
| EP | 1613066 | 1/2006 |
| EP | 1427148 | 6/2006 |
| EP | 1763234 | 3/2007 |
| EP | 1796393 | 6/2007 |
| FR | 2572235 | 4/1986 |
| FR | 2579397 | 9/1986 |
| FR | 2662895 | 12/1991 |
| FR | 2678091 | 12/1992 |
| GB | 1554411 | 10/1979 |
| GB | 2034995 | 6/1980 |
| GB | 2126002 | 3/1984 |
| GB | 2185670 | 7/1987 |
| GB | 2210526 | 6/1989 |
| GB | 2219886 | 12/1989 |
| GB | 2227622 | 8/1990 |
| GB | 2229595 | 9/1990 |
| GB | 2256115 | 11/1992 |
| GB | 2256116 | 11/1992 |
| GB | 2256546 | 12/1992 |
| GB | 2265792 | 10/1993 |
| GB | 2275800 | 9/1994 |
| GB | 2286754 | 8/1995 |
| GB | 2289782 | 11/1995 |
| GB | 2294173 | 4/1996 |
| GB | 2298544 | 9/1996 |
| GB | 2300551 | 11/1996 |
| GB | 2309134 | 7/1997 |
| GB | 2325537 | 11/1998 |
| GB | 2346251 | 8/2000 |
| GB | 2375674 | 11/2002 |
| JP | 58137334 | 8/1983 |
| JP | 58196738 | 11/1983 |
| JP | 58210776 | 12/1983 |
| JP | 59141878 | 8/1984 |
| JP | 06061935 | 4/1985 |
| JP | 60069850 | 4/1985 |
| JP | 60061935 | 9/1985 |
| JP | 60171685 | 9/1985 |
| JP | 61050470 | 3/1986 |
| JP | 61074476 | 4/1986 |
| JP | 62060370 | 3/1987 |
| JP | 62060372 | 3/1987 |
| JP | 62060378 | 3/1987 |
| JP | 62060384 | 3/1987 |
| JP | 63054884 | 3/1988 |
| JP | 06392177 | 4/1988 |
| JP | 63141467 | 6/1988 |
| JP | 63234679 | 9/1988 |
| JP | 63289619 | 11/1988 |
| JP | 64013278 | 1/1989 |
| JP | 10093933 | 4/1989 |
| JP | 10093936 | 4/1989 |
| JP | 01209399 | 8/1989 |
| JP | 01212986 | 8/1989 |
| JP | 01213853 | 8/1989 |
| JP | 01307944 | 12/1989 |
| JP | 02048879 | 2/1990 |
| JP | 00245495 | 3/1990 |
| JP | 00281385 | 3/1990 |
| JP | 03022770 | 1/1991 |
| JP | 03035451 | 2/1991 |
| JP | 03059837 | 3/1991 |
| JP | 03063990 | 3/1991 |
| JP | 03215781 | 9/1991 |
| JP | 03226083 | 10/1991 |
| JP | 03286483 | 12/1991 |
| JP | 04042454 | 2/1992 |
| JP | 04079053 | 3/1992 |
| JP | 04105285 | 4/1992 |
| JP | 04227380 | 8/1992 |
| JP | 04250760 | 9/1992 |
| JP | 04276342 | 10/1992 |
| JP | 05053378 | 3/1993 |
| JP | 05101471 | 4/1993 |
| JP | 05137104 | 6/1993 |
| JP | 05183826 | 7/1993 |
| JP | 05260400 | 10/1993 |
| JP | 05260554 | 10/1993 |
| JP | 05284437 | 10/1993 |
| JP | 05314186 | 11/1993 |
| JP | 06014129 | 1/1994 |
| JP | 06021907 | 1/1994 |
| JP | 00638165 | 2/1994 |
| JP | 06046345 | 2/1994 |
| JP | 06111413 | 4/1994 |
| JP | 06121262 | 4/1994 |
| JP | 06124309 | 5/1994 |
| JP | 06133334 | 5/1994 |
| JP | 06504165 | 5/1994 |
| JP | 06208500 | 7/1994 |
| JP | 06217271 | 8/1994 |
| JP | 06236592 | 8/1994 |
| JP | 06243539 | 9/1994 |
| JP | 06261139 | 9/1994 |
| JP | 06303541 | 10/1994 |
| JP | 06350546 | 12/1994 |
| JP | 07020254 | 1/1995 |
| JP | 07021619 | 1/1995 |
| JP | 07023356 | 1/1995 |
| JP | 07044930 | 2/1995 |
| JP | 07050259 | 2/1995 |
| JP | 07076592 | 3/1995 |
| JP | 07123326 | 5/1995 |
| JP | 07135621 | 5/1995 |
| JP | 07147657 | 6/1995 |
| JP | 07154349 | 6/1995 |
| JP | 07160732 | 6/1995 |
| JP | 07162776 | 6/1995 |
| JP | 07184131 | 7/1995 |
| JP | 07193762 | 7/1995 |
| JP | 07193763 | 7/1995 |
| JP | 07212328 | 8/1995 |
| JP | 07212331 | 8/1995 |
| JP | 07212732 | 8/1995 |
| JP | 07230666 | 8/1995 |
| JP | 07231437 | 8/1995 |
| JP | 07288759 | 10/1995 |
| JP | 07298153 | 11/1995 |
| JP | 07321748 | 12/1995 |
| JP | 07336318 | 12/1995 |
| JP | 08018882 | 1/1996 |
| JP | 08032528 | 2/1996 |
| JP | 08032538 | 2/1996 |
| JP | 08056352 | 2/1996 |

(56) References Cited

FOREIGN PATENT DOCUMENTS

| | | |
|---|---|---|
| JP | 08077763 | 3/1996 |
| JP | 08116495 | 5/1996 |
| JP | 08125497 | 5/1996 |
| JP | 08130517 | 5/1996 |
| JP | 08180505 | 7/1996 |
| JP | 08506941 | 7/1996 |
| JP | 08242313 | 9/1996 |
| JP | 08242436 | 9/1996 |
| JP | 08251122 | 9/1996 |
| JP | 08275077 | 10/1996 |
| JP | 08314979 | 11/1996 |
| JP | 08317331 | 11/1996 |
| JP | 08331546 | 12/1996 |
| JP | 09009245 | 1/1997 |
| JP | 09037151 | 2/1997 |
| JP | 09037168 | 2/1997 |
| JP | 09037172 | 2/1997 |
| JP | 09065300 | 3/1997 |
| JP | 09070020 | 3/1997 |
| JP | 09102827 | 4/1997 |
| JP | 09120686 | 5/1997 |
| JP | 09138804 | 5/1997 |
| JP | 09139915 | 5/1997 |
| JP | 09148994 | 6/1997 |
| JP | 09162818 | 6/1997 |
| JP | 09162821 | 6/1997 |
| JP | 09182035 | 7/1997 |
| JP | 09204286 | 8/1997 |
| JP | 09214873 | 8/1997 |
| JP | 09233387 | 9/1997 |
| JP | 09245467 | 9/1997 |
| JP | 09259515 | 10/1997 |
| JP | 09261609 | 10/1997 |
| JP | 09270965 | 10/1997 |
| JP | 09289630 | 11/1997 |
| JP | 09298677 | 11/1997 |
| JP | 09322213 | 12/1997 |
| JP | 01040057 | 2/1998 |
| JP | 10042235 | 2/1998 |
| JP | 10042242 | 2/1998 |
| JP | 10065978 | 3/1998 |
| JP | 01093905 | 4/1998 |
| JP | 10091534 | 4/1998 |
| JP | 10092161 | 4/1998 |
| JP | 10093879 | 4/1998 |
| JP | 10108122 | 4/1998 |
| JP | 10112087 | 4/1998 |
| JP | 10143340 | 5/1998 |
| JP | 10143349 | 5/1998 |
| JP | 10164487 | 6/1998 |
| JP | 10174037 | 6/1998 |
| JP | 10191221 | 7/1998 |
| JP | 10215440 | 8/1998 |
| JP | 10228500 | 8/1998 |
| JP | 10234007 | 9/1998 |
| JP | 10243309 | 9/1998 |
| JP | 10243344 | 9/1998 |
| JP | 10243352 | 9/1998 |
| JP | 10247344 | 9/1998 |
| JP | 10257400 | 9/1998 |
| JP | 10289205 | 10/1998 |
| JP | 10512420 | 11/1998 |
| JP | 11032272 | 2/1999 |
| JP | 11032311 | 2/1999 |
| JP | 01169317 | 3/1999 |
| JP | 11088280 | 3/1999 |
| JP | 11136615 | 5/1999 |
| JP | 11136658 | 5/1999 |
| JP | 11177682 | 7/1999 |
| JP | 11177962 | 7/1999 |
| JP | 11205711 | 7/1999 |
| JP | 11261917 | 9/1999 |
| JP | 11266414 | 9/1999 |
| JP | 11308561 | 11/1999 |
| JP | 11313280 | 11/1999 |
| JP | 11317937 | 11/1999 |
| JP | 11512903 | 11/1999 |
| JP | 11341040 | 12/1999 |
| JP | 11353071 | 12/1999 |
| JP | 2000004272 | 1/2000 |
| JP | 2000013708 | 1/2000 |
| JP | 2000138886 | 5/2000 |
| JP | 2000216845 | 8/2000 |
| JP | 2000224533 | 8/2000 |
| JP | 2000235546 | 8/2000 |
| JP | 2000261750 | 9/2000 |
| JP | 2000287179 | 10/2000 |
| JP | 2000306314 | 11/2000 |
| JP | 2000312333 | 11/2000 |
| JP | 2000339931 | 12/2000 |
| JP | 2001022282 | 1/2001 |
| JP | 2001086423 | 3/2001 |
| JP | 2001088372 | 4/2001 |
| JP | 2001103404 | 4/2001 |
| JP | 2001165669 | 6/2001 |
| JP | 2001167491 | 6/2001 |
| JP | 2001167522 | 6/2001 |
| JP | 2001213595 | 8/2001 |
| JP | 2001257950 | 9/2001 |
| JP | 2002010153 | 1/2002 |
| JP | 2002063385 | 2/2002 |
| JP | 2002514794 | 5/2002 |
| JP | 2002176610 | 6/2002 |
| JP | 2002185931 | 6/2002 |
| JP | 2002185951 | 6/2002 |
| JP | 2002199318 | 7/2002 |
| JP | 2002522977 | 7/2002 |
| JP | 2002223425 | 8/2002 |
| JP | 2002279969 | 9/2002 |
| JP | 2002335463 | 11/2002 |
| JP | 2002335473 | 11/2002 |
| JP | 2002354354 | 12/2002 |
| JP | 2002369108 | 12/2002 |
| JP | 2002374506 | 12/2002 |
| JP | 2003067226 | 3/2003 |
| JP | 2003076598 | 3/2003 |
| JP | 2003162444 | 6/2003 |
| JP | 2003169087 | 6/2003 |
| JP | 2003189267 | 7/2003 |
| JP | 2003199004 | 7/2003 |
| JP | 2003209893 | 7/2003 |
| JP | 2003219340 | 7/2003 |
| JP | 2003219367 | 7/2003 |
| JP | 2003304503 | 10/2003 |
| JP | 2003339000 | 11/2003 |
| JP | 2004007592 | 1/2004 |
| JP | 2004023326 | 1/2004 |
| JP | 2004080083 | 3/2004 |
| JP | 2004120038 | 4/2004 |
| JP | 2004159004 | 6/2004 |
| JP | 2004193920 | 7/2004 |
| JP | 2004343520 | 12/2004 |
| JP | 2005094175 | 4/2005 |
| JP | 2005115790 | 4/2005 |
| JP | 2005117236 | 4/2005 |
| JP | 2006025444 | 1/2006 |
| JP | 2006066968 | 3/2006 |
| JP | 2006088052 | 3/2006 |
| JP | 2007053566 | 3/2007 |
| JP | 01078328 | 5/2009 |
| JP | 2010506299 | 2/2010 |
| JP | 2010187389 | 8/2010 |
| KR | 19920015347 | 8/1992 |
| KR | 1019970064188 | 9/1997 |
| KR | 19970078662 | 12/1997 |
| KR | 19990086454 | 12/1999 |
| KR | 1020000054561 | 9/2000 |
| KR | 1020000059522 | 10/2000 |
| KR | 1020030029410 | 4/2003 |
| KR | 20050108181 | 11/2005 |
| KR | 20050113493 | 12/2005 |
| TW | 247388 | 10/1994 |
| WO | WO-8302208 | 6/1983 |
| WO | WO-8601359 | 2/1986 |

(56) References Cited

FOREIGN PATENT DOCUMENTS

| | | |
|---|---|---|
| WO | WO-8601962 | 3/1986 |
| WO | WO-8703766 | 6/1987 |
| WO | WO-8801465 | 2/1988 |
| WO | WO-8804507 | 6/1988 |
| WO | WO-8902682 | 3/1989 |
| WO | WO-8903085 | 4/1989 |
| WO | WO-8911199 | 11/1989 |
| WO | WO-8912370 | 12/1989 |
| WO | WO-9000847 | 1/1990 |
| WO | WO-9001243 | 2/1990 |
| WO | WO-9015507 | 12/1990 |
| WO | WO-9100670 | 1/1991 |
| WO | WO-9107050 | 5/1991 |
| WO | WO-9108629 | 6/1991 |
| WO | WO-9118476 | 11/1991 |
| WO | WO-9204801 | 3/1992 |
| WO | WO-9217027 | 10/1992 |
| WO | WO-9222983 | 12/1992 |
| WO | WO-9304473 | 3/1993 |
| WO | WO-9305452 | 3/1993 |
| WO | WO-9310606 | 5/1993 |
| WO | WO-9311638 | 6/1993 |
| WO | WO-9311639 | 6/1993 |
| WO | WO-9311640 | 6/1993 |
| WO | WO-9322877 | 11/1993 |
| WO | WO-9323957 | 11/1993 |
| WO | WO-9413107 | 6/1994 |
| WO | WO-9413284 | 6/1994 |
| WO | WO-9414281 | 6/1994 |
| WO | WO-9414282 | 6/1994 |
| WO | WO-9414283 | 6/1994 |
| WO | WO-9414284 | 6/1994 |
| WO | WO-9415284 | 7/1994 |
| WO | WO-9416441 | 7/1994 |
| WO | WO-9421085 | 9/1994 |
| WO | WO-9423383 | 10/1994 |
| WO | WO-9429811 | 12/1994 |
| WO | WO-9501056 | 1/1995 |
| WO | WO-9501058 | 1/1995 |
| WO | WO-9501059 | 1/1995 |
| WO | WO-9502945 | 1/1995 |
| WO | WO-9504431 | 2/1995 |
| WO | WO-9506389 | 3/1995 |
| WO | WO-9507003 | 3/1995 |
| WO | WO-9510910 | 4/1995 |
| WO | WO-9510916 | 4/1995 |
| WO | WO-9511567 | 4/1995 |
| WO | WO-9515649 | 6/1995 |
| WO | WO-9515657 | 6/1995 |
| WO | WO-9515658 | 6/1995 |
| WO | WO-9516568 | 6/1995 |
| WO | WO-9518449 | 7/1995 |
| WO | WO-9519092 | 7/1995 |
| WO | WO-9526095 | 9/1995 |
| WO | WO-9526608 | 10/1995 |
| WO | WO-9528055 | 10/1995 |
| WO | WO-9528799 | 10/1995 |
| WO | WO-9530961 | 11/1995 |
| WO | WO-9531069 | 11/1995 |
| WO | WO-9532583 | 11/1995 |
| WO | WO-9532584 | 11/1995 |
| WO | WO-9532585 | 11/1995 |
| WO | WO-9532587 | 11/1995 |
| WO | WO-9533338 | 12/1995 |
| WO | WO-9607270 | 3/1996 |
| WO | WO-9608109 | 3/1996 |
| WO | WO-9608113 | 3/1996 |
| WO | WO-9609721 | 3/1996 |
| WO | WO-9613013 | 5/1996 |
| WO | WO-9613124 | 5/1996 |
| WO | WO-9613932 | 5/1996 |
| WO | WO-9613935 | 5/1996 |
| WO | WO-9617467 | 6/1996 |
| WO | WO-9617473 | 6/1996 |
| WO | WO-9620555 | 7/1996 |
| WO | WO-9621990 | 7/1996 |
| WO | WO-9625821 | 8/1996 |
| WO | WO-9626605 | 8/1996 |
| WO | WO-9627270 | 9/1996 |
| WO | WO-9627982 | 9/1996 |
| WO | WO-9627989 | 9/1996 |
| WO | WO-9631980 | 10/1996 |
| WO | WO-9632583 | 10/1996 |
| WO | WO-9633572 | 10/1996 |
| WO | WO-9633579 | 10/1996 |
| WO | WO-9634467 | 10/1996 |
| WO | WO-9634486 | 10/1996 |
| WO | WO-9634491 | 10/1996 |
| WO | WO-9636172 | 11/1996 |
| WO | WO-9637075 | 11/1996 |
| WO | WO-9637983 | 11/1996 |
| WO | WO-9637996 | 11/1996 |
| WO | WO-9638799 | 12/1996 |
| WO | WO-9638962 | 12/1996 |
| WO | WO-9641285 | 12/1996 |
| WO | WO-9641418 | 12/1996 |
| WO | WO-9641470 | 12/1996 |
| WO | WO-9641471 | 12/1996 |
| WO | WO-9641472 | 12/1996 |
| WO | WO-9641477 | 12/1996 |
| WO | WO-9641478 | 12/1996 |
| WO | WO-9702568 | 1/1997 |
| WO | WO-9702702 | 1/1997 |
| WO | WO-9704595 | 2/1997 |
| WO | WO-9705616 | 2/1997 |
| WO | WO-9707656 | 3/1997 |
| WO | WO-9712486 | 4/1997 |
| WO | WO-9713368 | 4/1997 |
| WO | WO-9717774 | 5/1997 |
| WO | WO-9718670 | 5/1997 |
| WO | WO-9718675 | 5/1997 |
| WO | WO-9719555 | 5/1997 |
| WO | WO-9719565 | 5/1997 |
| WO | WO-9721291 | 6/1997 |
| WO | WO-9722207 | 6/1997 |
| WO | WO-9723997 | 7/1997 |
| WO | WO-9726612 | 7/1997 |
| WO | WO-9730546 | 8/1997 |
| WO | WO-9731479 | 8/1997 |
| WO | WO-9731480 | 8/1997 |
| WO | WO-9732434 | 9/1997 |
| WO | WO-9734413 | 9/1997 |
| WO | WO-9734414 | 9/1997 |
| WO | WO-9735428 | 9/1997 |
| WO | WO-9736422 | 10/1997 |
| WO | WO-9737500 | 10/1997 |
| WO | WO-9740623 | 10/1997 |
| WO | WO-9741673 | 11/1997 |
| WO | WO-9742763 | 11/1997 |
| WO | WO-9745786 | 12/1997 |
| WO | WO-9746008 | 12/1997 |
| WO | WO-9746016 | 12/1997 |
| WO | WO-9746943 | 12/1997 |
| WO | WO-9746950 | 12/1997 |
| WO | WO-9747106 | 12/1997 |
| WO | WO-9747124 | 12/1997 |
| WO | WO-9747143 | 12/1997 |
| WO | WO-9748228 | 12/1997 |
| WO | WO-9748230 | 12/1997 |
| WO | WO-9749057 | 12/1997 |
| WO | WO-9749237 | 12/1997 |
| WO | WO-9749241 | 12/1997 |
| WO | WO-9749242 | 12/1997 |
| WO | WO-9750250 | 12/1997 |
| WO | WO-9750251 | 12/1997 |
| WO | WO-9801995 | 1/1998 |
| WO | WO-9806098 | 2/1998 |
| WO | WO-9806219 | 2/1998 |
| WO | WO-9807277 | 2/1998 |
| WO | WO-9810589 | 3/1998 |
| WO | WO-9810598 | 3/1998 |
| WO | WO-9812872 | 3/1998 |
| WO | WO-9814009 | 4/1998 |
| WO | WO-9816056 | 4/1998 |

(56) References Cited

FOREIGN PATENT DOCUMENTS

| | | |
|---|---|---|
| WO | WO-9816062 | 4/1998 |
| WO | WO-9817033 | 4/1998 |
| WO | WO-9817063 | 4/1998 |
| WO | WO-9817064 | 4/1998 |
| WO | WO-9818260 | 4/1998 |
| WO | WO-9819459 | 5/1998 |
| WO | WO-9820675 | 5/1998 |
| WO | WO-9821664 | 5/1998 |
| WO | WO-9821877 | 5/1998 |
| WO | WO-9826528 | 6/1998 |
| WO | WO-9826569 | 6/1998 |
| WO | WO-9826584 | 6/1998 |
| WO | WO-9826594 | 6/1998 |
| WO | WO-9826596 | 6/1998 |
| WO | WO-9827723 | 6/1998 |
| WO | WO-9828906 | 7/1998 |
| WO | WO-9831115 | 7/1998 |
| WO | WO-9831116 | 7/1998 |
| WO | WO-9831148 | 7/1998 |
| WO | WO-9834405 | 8/1998 |
| WO | WO-9837694 | 8/1998 |
| WO | WO-9838831 | 9/1998 |
| WO | WO-9839893 | 9/1998 |
| WO | WO-9841020 | 9/1998 |
| WO | WO-9843183 | 10/1998 |
| WO | WO-9843416 | 10/1998 |
| WO | WO-9847084 | 10/1998 |
| WO | WO-9847279 | 10/1998 |
| WO | WO-9847283 | 10/1998 |
| WO | WO-9847287 | 10/1998 |
| WO | WO-9847289 | 10/1998 |
| WO | WO-9847290 | 10/1998 |
| WO | WO-9848566 | 10/1998 |
| WO | WO-9851076 | 11/1998 |
| WO | WO-9853611 | 11/1998 |
| WO | WO-9856172 | 12/1998 |
| WO | WO-9856173 | 12/1998 |
| WO | WO-9856176 | 12/1998 |
| WO | WO-9859478 | 12/1998 |
| WO | WO-9901984 | 1/1999 |
| WO | WO-9903267 | 1/1999 |
| WO | WO-9904561 | 1/1999 |
| WO | WO-9904570 | 1/1999 |
| WO | WO-9907142 | 2/1999 |
| WO | WO-9911060 | 3/1999 |
| WO | WO-9912320 | 3/1999 |
| WO | WO-9912346 | 3/1999 |
| WO | WO-9914945 | 3/1999 |
| WO | WO-9918722 | 4/1999 |
| WO | WO-9927681 | 6/1999 |
| WO | WO-9928897 | 6/1999 |
| WO | WO-9929109 | 6/1999 |
| WO | WO-9930491 | 6/1999 |
| WO | WO-9931480 | 6/1999 |
| WO | WO-9933265 | 7/1999 |
| WO | WO-9935584 | 7/1999 |
| WO | WO-9935753 | 7/1999 |
| WO | WO-9935827 | 7/1999 |
| WO | WO-9937045 | 7/1999 |
| WO | WO-9938092 | 7/1999 |
| WO | WO-9939466 | 8/1999 |
| WO | WO-9945700 | 9/1999 |
| WO | WO-9945701 | 9/1999 |
| WO | WO-9945702 | 9/1999 |
| WO | WO-9952279 | 10/1999 |
| WO | WO-9952285 | 10/1999 |
| WO | WO-9956466 | 11/1999 |
| WO | WO-9956473 | 11/1999 |
| WO | WO-9957837 | 11/1999 |
| WO | WO-9957839 | 11/1999 |
| WO | WO-9960493 | 11/1999 |
| WO | WO-9960783 | 11/1999 |
| WO | WO-9960789 | 11/1999 |
| WO | WO-9960790 | 11/1999 |
| WO | WO-9964969 | 12/1999 |
| WO | WO-9965237 | 12/1999 |
| WO | WO-9965244 | 12/1999 |
| WO | WO-9966725 | 12/1999 |
| WO | WO-0001149 | 1/2000 |
| WO | WO-0002385 | 1/2000 |
| WO | WO-0004706 | 1/2000 |
| WO | WO-0004707 | 1/2000 |
| WO | WO-0004708 | 1/2000 |
| WO | WO-0004709 | 1/2000 |
| WO | WO-0005885 | 2/2000 |
| WO | WO-0005889 | 2/2000 |
| WO | WO-0007368 | 2/2000 |
| WO | WO-0008850 | 2/2000 |
| WO | WO-0008851 | 2/2000 |
| WO | WO-0008852 | 2/2000 |
| WO | WO-0011865 | 3/2000 |
| WO | WO-0011869 | 3/2000 |
| WO | WO-0013415 | 3/2000 |
| WO | WO-0013416 | 3/2000 |
| WO | WO-0016336 | 3/2000 |
| WO | WO-0016548 | 3/2000 |
| WO | WO-0017738 | 3/2000 |
| WO | WO-0027122 | 5/2000 |
| WO | WO-0028379 | 5/2000 |
| WO | WO-0028734 | 5/2000 |
| WO | WO-0028739 | 5/2000 |
| WO | WO-0030345 | 5/2000 |
| WO | WO-0033160 | 6/2000 |
| WO | WO-0033208 | 6/2000 |
| WO | WO-0033224 | 6/2000 |
| WO | WO-0033560 | 6/2000 |
| WO | WO-0033565 | 6/2000 |
| WO | WO-0033573 | 6/2000 |
| WO | WO-0033578 | 6/2000 |
| WO | WO-0034891 | 6/2000 |
| WO | WO-0035193 | 6/2000 |
| WO | WO-0040012 | 7/2000 |
| WO | WO-0040014 | 7/2000 |
| WO | WO-0040026 | 7/2000 |
| WO | WO-0049801 | 8/2000 |
| WO | WO-0051310 | 8/2000 |
| WO | WO-0058214 | 10/2000 |
| WO | WO-0058833 | 10/2000 |
| WO | WO-0058967 | 10/2000 |
| WO | WO-0059214 | 10/2000 |
| WO | WO-0059223 | 10/2000 |
| WO | WO-0059230 | 10/2000 |
| WO | WO-0059233 | 10/2000 |
| WO | WO-0062298 | 10/2000 |
| WO | WO-0062299 | 10/2000 |
| WO | WO-0062533 | 10/2000 |
| WO | WO-0067475 | 11/2000 |
| WO | WO-0074383 | 12/2000 |
| WO | WO-0078050 | 12/2000 |
| WO | WO-0079798 | 12/2000 |
| WO | WO-0101677 | 1/2001 |
| WO | WO-0101689 | 1/2001 |
| WO | WO-0103088 | 1/2001 |
| WO | WO-0106784 | 1/2001 |
| WO | WO-0110126 | 2/2001 |
| WO | WO-0110128 | 2/2001 |
| WO | WO-0111865 | 2/2001 |
| WO | WO-0115438 | 3/2001 |
| WO | WO-0122729 | 3/2001 |
| WO | WO-0135662 | 5/2001 |
| WO | WO-0137549 | 5/2001 |
| WO | WO-0146843 | 6/2001 |
| WO | WO-0147238 | 6/2001 |
| WO | WO-0147249 | 6/2001 |
| WO | WO-0147257 | 6/2001 |
| WO | WO-0147273 | 6/2001 |
| WO | WO-0147279 | 6/2001 |
| WO | WO-0150743 | 7/2001 |
| WO | WO-0169929 | 9/2001 |
| WO | WO-0176239 | 10/2001 |
| WO | WO-0176248 | 10/2001 |
| WO | WO-0176704 | 10/2001 |
| WO | WO-0182600 | 11/2001 |
| WO | WO-0189213 | 11/2001 |

(56) References Cited

FOREIGN PATENT DOCUMENTS

| | | |
|---|---|---|
| WO | WO-0193588 | 12/2001 |
| WO | WO-0198920 | 12/2001 |
| WO | WO-9914947 | 2/2002 |
| WO | WO-0231731 | 4/2002 |
| WO | WO-02067579 | 8/2002 |
| WO | WO-02069636 | 9/2002 |
| WO | WO-02078317 | 10/2002 |
| WO | WO-02084992 | 10/2002 |
| WO | WO-03005712 | 1/2003 |
| WO | WO-03032634 | 4/2003 |
| WO | WO-03041410 | 5/2003 |
| WO | WO-03046727 | 6/2003 |
| WO | WO-03047235 | 6/2003 |
| WO | WO-03060157 | 7/2003 |
| WO | WO-03098932 | 11/2003 |
| WO | WO-04002156 | 12/2003 |
| WO | WO-2004019602 | 3/2004 |
| WO | WO-2004032511 | 4/2004 |
| WO | WO-2004040906 | 5/2004 |
| WO | WO-2004054264 | 6/2004 |
| WO | WO-2004061699 | 7/2004 |
| WO | WO-2004091217 | 10/2004 |
| WO | WO-2004100526 | 11/2004 |
| WO | WO-2005002214 | 1/2005 |
| WO | WO-2005003921 | 1/2005 |
| WO | WO-2005027512 | 3/2005 |
| WO | WO-2005046174 | 5/2005 |
| WO | WO-2005084031 | 9/2005 |
| WO | WO-2005091626 | 9/2005 |
| WO | WO-2005022764 | 10/2005 |
| WO | WO-2005101188 | 10/2005 |
| WO | WO-2006060157 | 6/2006 |
| WO | WO-2006113404 | 10/2006 |
| WO | WO-2007078503 | 7/2007 |
| WO | WO-2007078739 | 7/2007 |
| WO | WO-2007096815 | 8/2007 |
| WO | WO-2007106464 | 9/2007 |
| WO | WO-2008045305 | 4/2008 |
| WO | WO-2009009106 | 1/2009 |
| WO | WO-2009014593 | 1/2009 |

OTHER PUBLICATIONS

U.S. Appl. No. 09/157,256, filed Sep. 17, 1998, Hassell.
U.S. Appl. No. 09/329,850, filed Jun. 11, 1999, Lemmons.
U.S. Appl. No. 09/330,860, filed Jun. 11, 1999, Ellis.
U.S. Appl. No. 09/332,244, filed Jun. 11, 1999, Ellis.
U.S. Appl. No. 60/019,351, filed Jun. 6, 1996, Williams.
U.S. Appl. No. 60/020,580, filed Jun. 26, 1996, Goldschmidt.
U.S. Appl. No. 60/022,436, filed Aug. 6, 1996, Schein.
U.S. Appl. No. 60/024,435, filed Aug. 22, 1996, Goldschmidt.
U.S. Appl. No. 60/024,436, filed Aug. 22, 1996, Goldschmidt.
U.S. Appl. No. 60/024,452, filed Aug. 27, 1996, Goldschmidt.
2720R Satellite Receiver User's Guide, General Instrument, 1991, pp. 58-61.
A Financial Times Survey: Viewdata (Advertisement), Financial Times, Mar. 20, 1979 (3 pages).
A New Approach to Addressability, Brochure CableData, undated. (9 pages).
A Wonderworld of Services, The Sunday Times, Innovation section, p. 4, Jan. 7, 1996.
Abarca, et al., Telecommunications Information Networking Architecture Consortium "TINA-C Deliverable" Service Architecture, Version 5.0, Jun. 16, 1997 (168 pgs.).
Abbott et al.; "Video Formats and Resolutions", Nuclear Plan Journal, 1994, pp. 1-11.
ACM Multimedia 93 Proceedings, A Digital On-Demand Video Service Suporting Content-Based Queries, Little et al. pp. 427-436, Jul. 1993.
Addressable Converters: A New Development at CableData, via Cable, vol. 1, No. 12 (Dec. 1981) (11 pages).
Advanced Analog Systems—Addressable Terminals General Instrument Corp. of Horsham, Pennsylvania (URL:http//www.gi.com/BUSAREA/ANALOG/TERMINAL/WATCH/watch.html) Printed from the Internet on Mar. 4, 1999. (1 page).
Advertisement for "TV Decisions," Cable Vision, Aug. 4, 1986, 3 pages.
Aho, "New Delphi Ads Push Envelope: Starting Visuals From Upstart Agency Go Too Far for One Paper's Tastes," Advertising Age 0.0, May 30, 1994, p. 16, Abstract (2 pages).
Alexander, Michael "Visualizing cleared-off desktops," Computerworld, May 6, 1991, p. 20.
Andrews, "A Chip That Allows Parents to Censor TV Sex and Violence," The New York Times, Sunday, Jul. 18, 1993, 2 pages.
Antonoff, "Stay Tuned for Smart TV," Popular Science, Nov. 1990, pp. 62-65.
Apers et al., "Content-based retrieval in Multimedia databases based on feature models"—Advanced Multimedia Content, Springer Berlin/Heidelberg vol. 1554, Jan. 1999 (pp. 119-130).
Arango et al., "The Touring Machine System," Communications of the ACM, Jan. 1993, vol. 36, No. 1, pp. 68-77.
Intel Intercast's Website from Archieve. Org, "How Does It Work?", <http://web.archive.org/web/19990429214537/www.intercast.com/intercast/howitwks.htm>, Acessed on Jul. 8, 2008. (2 pages).
Intel Intercast's Website from Archieve. Org, "What Is It?", <http://web.archive.org/web/19990422195517/www.intercast.com/intercast/whatisit.htm>, Acessed on Jul. 8, 2008. (1 page).
Armstrong, "Channel-Surfing's next wave: Henry Yuen's interactive TV guide takes on TCI and Viacom," BusinessWeek, Jul. 31, 1995. (3 pages).
Arnold, "Britain to get wired city—via telephone," Electronics, Mar. 4, 1976, at 76. (3 pages).
Automating in a digital world, servers lead the way into the new realm of DTV, Broadcasting and Cable, published Nov. 24, 1997 (5 pages).
Bach et al., "Multimedia-Terminal ALS Endgeraet," Funkschau, De, Franzis-Verlag K.G. Munchen, vol. 68, No. 6, Mar. 1, 1996, pp. 70-75, Xp 000556486, ISSN: 0016-2841 (Translation, pp. 1-7).
Bach et al, "Multimediales-TV-Great," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach et al., "Multimedia TV Set, Part 1" Radio-Fernsehen Elektronik (RFE), 9-96, pp. 28, 30, 31.
Bach et al., "Multimedia TV Set, Part 2 and Conclusion," Radio-Fernsehen Elektronik (RFE), 10-96, pp. 38-40.
Bacon, "Concurrent Systems," 2nd Ed, Addison Wesley Longman Ltd., 59 pages, 1998.
Baer, "Innovative Add-On TV Products," IEEE Transactions on Consumer Electronics, vol. CE-25, Nov. 1979, pp. 765-771.
Bell Atlantic Buys Cable TV Company for $22bn, Financial Times (London), Oct. 14, 1993 p. 65.
Bensch, "VPV Videotext Programs Videorecorder," IEEE Paper, Jun. 1988, pp. 788-792.
Berniker, "DEC Develops Server/Set-Top Alliance: Company Wants to Insure Compatibility for Next Generation of TV Sets," Dec. 5, 1994, 1 page.
Berniker, "TV Guide going online", Broadcasting & Cable, pp. 49-52 (Jun. 13, 1994).
Bestler, "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, Jul. 1995, 17 pages.
Bolle, et al., "Video Query: Research Directions," IMB Journal of Research and Development 42, 2: ProQuest p. 233, Mar. 1998. (20 pages).
Bowen et al., The Datacycle Architecture, Communications of the ACM, vol. 35, No. 12 pp. 71-81, Dec. 1992.
Boyd-Merritt, "Television wires two-way video," Electronic Engineering Times, Apr. 25, 1994. (3 pages).
Brochure, "Westar and Videotoken Network Present the CableComputer," Revised Aug. 15, 1985, 41 pages.

(56) References Cited

OTHER PUBLICATIONS

Brochure, Time Inc., "Now, Through the Advances of the Computer Age, You Can Get the Information You Want, When You Want 1t. Instantly and Conveniently, on Your Home TV Screen," Time Teletext, Time Video Information Services, Inc., undated (V 79167-79175). (9 pages).
Brochure, VTN "Videotoken Network, New Dimension Television," Dec. 1985, 10 pages.
Brody H., Information highway: The Home Front, Technology Review, vol. 96:6 (Aug./Sep. 1993) p. 30, 7 pages.
Brown, "The Next Step: Searchable Television,"Broadcasting & Cable, 128, 22: ProQuest, p. 30, May 25, 1998. (2 pages).
Brugliera, "Digital On-Screen Display—A New Technology for the Consumer Interface," Symposium Record Cable Sessions, 18th International Television Symposium and Technical Exhibition, Montreux, Switzerland, Jun. 10-15, 1993, pp. 572-586, Jun. 11, 1993.
Bryhni et al. "On-demand Regional Television over the Internet." ACM Multimedia '96 Boston MA USA 1996 ACM (pp. 99-107).
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39.
Business Wire, Gemstar Adopts Shareholder Rights Plan and Amendments to Articles and Memorandum of Association, Jul. 12, 1998, 2 pages.
Bwanausi, D., 'Daily News' Zones Into New Editions, Adweek Western Edition, Sep. 17 1990, 2 pages.
Cable Computer User's Guide, Rev. 1, Dec. 1985, 4 pages.
Cable Data, "What's a software company doing manufacturing addressable converters?" (2011), p. 331, 10 pages.
Cable Television Equipment, Jerrold Communications Publication, dated 1992 and 1993, pp. 8-2.1 to 8-6 and 8-14.1 to 8-14.3. (15 pages).
CableData, Roseville Consumer Presentation, Mar. 1986, 12 pages.
Carne, E.B., "The Wired Household," IEEE Spectrum, vol. 16 No. 10, Oct. 1979, pp. 61-66.
Case 4: 11-cv-06591-PJH, Complaint for Declaratory Relief (plaintiff), dated Dec. 21, 2011, 16 pages.
Chan, Patrick P., "Learning Considerations in User Interface Design: The Room Model," Publication of the Software Portability Laboratory, University of Waterloo, Ontario, Canada, Jul. 1984, 52 pages.
Chang, Yee-Hsiang et al., "An Open-Systems Approach to Video on Demand," IEEE Communications Magazine, May 1994, pp. 68-80.
Chawathe, Y., et al., "A Proxy Architecture for Reliable Multicast in Heterogeneous Environments", ACM Multimedia '98, Bristol, UK, pp. 151-159, 1998.
Chen et al., "Real Time Video and Audio in the World Wide Web," Proc. 4th World Wide Web Conference, 1995, 15 pages.
Cheng et al., "Extended Relational Database Technology for New Applications," IBM Systems Journal, vol. 33, No. 2 (1994), 16 pages.
Cherrick, S. et al., Individually addressable receiver with interactive channel guide display, VCR, and cable box control, IEEE Transactions on Consumer Electronics, 40:3 (1994), pp. 317-328.
Chiueh—"Content-based Image Indexing"—Proc. of the 20th International Conference on Very Large Database 1994 (pp. 582-593).
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Cleland, Kim, "Look Out MSN, Here Comes MCI," Advertising Age, vol. 66, No. 32, Aug. 14, 1995, p. 19 (2 pages).
CNN Tech: Sonicblue revives ReplayTV, articles cnn.com, Sep. 10, 2001, retrieved from the internet http://articles.cnn.com/2001-09-10/tech/replay.tv.idg_1_replaytv-sonicblue-digital-video?_s= PM:TECH, 2 pages.
Columbia House CD-ROM Direct: Detail Page, accessed from the internet at http://web.archive.org/web/19961221160255/http://www.columbiahouse.com/cd/cgis . . . , copyright 1996, printed on Sep. 19, 2013. (1 pages).
Columbia House CD-ROM Direct: Download Demos!, accessed from the internet at http://web.archive.org/web/19961221095819/http://www.columbiahouse.com/cd/cgis . . . , copyright 1996, printed on Sep. 19, 2013. (3 pages).
Columbia House CD-ROM Direct: Member Center, accessed from the internet at http://web.archive.org/web/19961221085905/http://www.columbiahouse.com/repl/cd/ . . . , copyright 1996, printed on Sep. 19, 2013. (2 pages).
Columbia House CD-ROM Direct: Member Center, copyright 1996. (1 pages).
Columbia House CD-ROM Direct: The Connection, accessed from the internet at http://web.archive.org/web/19961221100721/http://www.columbiahouse.com/repl/cd/ . . . , copyright 1996, printed on Sep. 20, 2013. (1 page).
Columbia House CD-ROM Direct: The Connection, accessed from the internet at http://web.archive.org/web/19961223152924/http://www.columbiahouse.com/repl/cd/ . . . , copyright 1996, printed on Sep. 20, 2013. (1 page).
Columbia House Laser Disc Club: FAQ Answers, accessed from the internet at http://web.archive.org/web/19961223165516/http://www.columbiahouse.com/repl/lc/t . . . , copyright 1996, printed on Sep. 20, 2013. (5 pages).
Columbia House Laser Disc Club: Join the Club, accessed from the internet at http://web.archive.org/web/19961221094037/http://www.columbiahouse.com/rep1/1c/t . . . , copyright 1996, printed on Sep. 20, 2013. (2 pages).
Columbia House Music Club: Join the Club, accessed from the internet at http://web.archive.org/web/19961221091101/http://www.columbiahouse.com/repl/mc . . . , copyright 1996, printed on Sep. 20, 2013. (2 Pages).
Columbia House Music Club: Search, accessed from the internet at http://web.archive.org/web/19961221114653/http://www.columbiahouse.com/repl/mc . . . , copyright 1996, printed on Sep. 19, 2013. (1 page).
Columbia House Music Club: Shopping Cart, accessed from the internet at http://web.archive.org/web/19961221120941/http://www.columbiahouse.com/mc/cgis . . . , copyright 1996, printed on Sep. 19, 2013. (1 page).
Columbia House Video Club: Essential Collection, accessed from the internet at http://web.archive.org/web/199612211131908/http://www.columbiahouse.com/vc/cgis/j . . . , copyright 1996, printed on Sep. 20, 2013. (2 pages).
Comdex—Mitsubishi Previews 40-Inch DiamondWeb TV, Newsbytes, Nov. 19, 1996, Abstract (2 pages).
Compton et al., "Internet CNN Newsroom: a digital video news magazine and library," Proc. of the Intl. Conf. on Multimedia Computing and Systems. Washington, May 15-18, 1995; [Proceedings of the International Conference on Multimedia Computing and Systems], Los Alamitos, IEEE Comp. Soc. Press, US, May 15, 1995, pp. 296-301, XP010154611.
Computer Network: Current Status and Outlook on Leading Science and Technology, Bureau of Science & Technology (Japan), vol. 1, Dec. 1986. (326 pages).
Computer Science: An Overview, 5th Edition, Addison Wesley, ISBN 0-8053-4632-5, pp. 25 to 28 (undated).
Cool Websites: [2 Star Edition], Houston Chronicle, Houston, Texas, Jul. 11, 1996, p. 3, Abstract.
Results listing from web.archive.org showing the archive date of Oct. 9, 1997 as the archived date of document, 1 page.
Costello, "VideoGuide vs. StarSight—Going Screen-to-Screen," Dealerscope Consumer Electronics Marketplace 38.1, Copyright North American Publishing Company, Jan. 1996, 4 pages.
Costello, M., On-screen TV program guides, Stereo Review, 60:8 (Aug. 1995), 3 pages.
Counterstatement of the Patentee for European Patent EP 1099341B dated Feb. 23, 2006) (16 pages).
Counterstatement of the Patentee for European Patent EP 1213919B dated Sep. 20, 2011. (17 pages).
Cox, J. et al, "Extended Services in a Digital Compression System," Proceedings from Eleven Technical Sessions: 42nd Annual Convention and Exposition of the National Cable Television Association, Jun. 1993, pp. 185-191.

(56) References Cited

OTHER PUBLICATIONS

Creation-Modification of the Audio Signal Processor Setup for a PC Audio Editor, IBM Technical Disclosure Bulletin, vol. 30, No. 10, Mar. 1988, pp. 367-376.
D2B-Home Bus Für Audio and Video, Selektor, Apr. 1990, pp. 10, 12. (English language translation attached) 8 pages.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, N.G., "Teletext Decoders—Keeping up With the Latest Advances," IEEE Transactions on Consumer Electronics, vol. CE-30, No. 3, Aug. 1984, pp. 429-435.
Dan et al., "Evolution and Challenges in Multimedia," IBM Journal of Research and Development, 42, 2: ProQuest p. 177, Mar. 1998.
DAVIC 1.3.1 Specification Part 1, Published in 1998 by Digital Audio-Visual Counsel, (85 pages).
Davidson, Ken, "CEBus: A New Standard in Home Automation" Circuit Cellar Ink, pp. 40-52 (1989).
Davis, B., "Violence on Television", TV Guide on Screen to the US House of Representatives Committee of Energy and Commerce Subcommittee on Telecommunications and Finance, pp. 93-163, Jun. 25, 1993.
Day, "The Great PC/TV Debate," OEM Magazine, Jul. 1, 1996, 6 pages.
December, J., "Understanding the Potential of Java and the Web", Presenting Java, published Sep. 20, 1995 (2 parts; 97 and 122 pages).
Declaration of Rosetta Rogers Under 37 CFR 1.131 in U.S. Appl. No. 09/393,955, executed Mar. 9, 2001 (13 pages).
Declaration Under 37 C.F.R. § 1.132 of Richard E. Glassberg, signed Oct. 20, 2006, filed Oct. 24, 2006, from U.S. Appl. No. 10/346,266, 5 pages.
Defense and Counterclaim of the First and Second Defendants, No. HC1 1 C 04556, between Starsight Telecast and United Video Properties (Claimants) and Virgin Media, Virgin Media Payments, and TiVo Defendants (pp. 10-11) (Mar. 14, 2012).
Derwent Abstracts, RD 385002 A, "Electronic Program Guide System via Internet Uses Television Programs Displayed on Internet Pages and Associates it With Program Label and On-Screen Icons to Remotely Program and Control TV Receiver w.r.t. Selected Program," published May 10, 1996 (2 pages).
Description of Digital Audio-Visual Functionalities (Technical Report), Digital Audio-Visual Council (DAVIC), 1.3.1 Part 1,:1998. (86 pages).
Dial M for Movie, Periodical Funkschau, vol. 11/1994, pp. 78-79.
Dialing the printed page, ITT in Europe Profile, 11/Spring 1977, 2 pages.
Dias, D. "A Scalable and Highly Available Web Server", IEEE, Proceedings of COMPCON '96, p. 85-92, 1996.
Dickson, G., "KPTV Gets on the Sony Digital Train," Broadcasting & Cable, 2 pages, Jan. 8, 1996.
Digital Video Broadcasting (DVB); DVB specification for data broadcasting, European Telecommunications Standards Institute, Draft EN 301 192 V1.2.1 (Jan. 1999), 33 pages.
Dimitrova, et al. "Personalizing Video Recorders in Multimedia Processing and Integration." ACM 2001. (4 pages).
Dinwiddie et al., "Combined-User Interface for Computers, Television, Video Recorders, and Telephone, Etc.," IP.com Prior Art Database Bulletin, Aug. 1, 1990, 3 pages.
DIRECTV Digital Satellite Receiver—Operating Instructions, Sony Electronics Inc., 60 pages (2001).
DIRECTV Plus2 System, Thompson Consumer Electronics, Inc., 2 pages (1999).
DIRECTV Receiver—Owner's Manual, DIRECTV, Inc., 119 pages (2002).
DIRECTV Receiver with TiVo Digital Satellite Receiver/Recorder Sat-T60—Installation Guide, Sony Corporation, 43 pages (2000).
DIRECTV Receiver with TiVo Installation Guide, Philips, TiVo Inc., 68 pages (2000).
DIRECTV Receiver with TiVo Viewer's Guide, Tivo Inc., Sony Corp., 152 pages (1999, 2000).
DiRosa, S. "Pinochle's BIGSURG Netguide", Jul. 1995, vol. 3.1, pp. 260-270 (27 total pages).
DiRosa, S., "BIGSURF Netguide," Jul. 1995, vol. 3.1 (Sections 18, 21, and 28—renumbered as pp. 1-27).
DishPro Satellite System—User's Guide, Dish Network 144 pages (Sep. 1, 2001).
Does NBC Get It, Aug. 14, 1995, retrieved from the internet at http://www.open4success.org/db/bin19/019687.html, retrieved on Dec. 11, 2013. (1 page).
Don Imus: The Thinking Man's Shock Jock, Broadcasting Cable, Jun. 13, 1994, 6 pages.
Dr. Dobb's, "Implementing a Web Shopping Cart," from the internet at https://www.drdobbs.com/article/print?articleId=184409959 &siteSect . . . , Sep. 1, 1996, printed from the internet on Sep. 13, 2012, 15 pages.
Draft Grounds of Invalidity for EP (UK) 0 880 856 (Trial B), No. HC1 1 C 04556, between Starsight Telecast and United Video Properties (Claimants) and Virgin Media, Virgin Media Payments, and TiVo (Defendants), 7 pgs., Oct. 2013.
Draper et al., TV Anytime, Proceedings International Broadcasting Convention, 1999, pp. 103-108.
Duck Tales,'(1987)[TV Series 1987-1990], Internet Movie Database (IMDB) [Retrieved on Apr. 7, 2007]. (5 pages).
Eckhoff, "TV Listing Star on the Computer," Central Penn Business Journal, High Beam Research, 4 pages (Mar. 15, 1996).
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997 (30 pages).
Electronic Program Guide via Internet, Research Disclosure, Kenneth Mason Publications, Hampshire, GB, vol. 385, No. 2, May 1, 1996, ISSN: 0374-4353. (1 page).
Electronic Programme Guide (EPG); Protocol for a TV Guide using electronic data transmission by European Telecommunication Standards Institute, May 1997, Valbonne, France, publication No. ETS 300 707, 89 pages.
Enhanced Content Specification, ATVEF, from the internet at http:--www.atvef.com-library-spec.html, printed Aug. 22, 2001, the document bears a Copyright date of 1998, 1999, 2000. (41 pages).
EP99935637 Opposition against Fast TV Server AG (Aug. 3, 2005) (35 pages).
EP99935637 Opposition against Velocity 303 Limited (Aug. 3, 2005) (17 pages).
EPO Opposition Against EP1213919 by Virgin Media Limited dated Dec. 16, 2010. (16 pages).
EPO Opposition Statement of Grounds of Appeal for EP1099341 dated Feb. 28, 2011. (18 pages).
EPO Opposition Submission for European patent EP-B-1099341 dated Mar. 19, 2010 918 pages).
European Search Opinion dated Dec. 19, 2005, EP Patent Application No. 05077272.2 (7 pages).
European Search Report (Partial) dated Apr. 3, 2012 in EP Application No. 10168916. (19 pages).
European Search Report dated Nov. 19, 2002 from European Application No. 989446111.7, (3 pages).
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994, ETS 300 468. (64 pages).
Extended European Search Report dated Aug. 17, 2012 in EP Application No. 10168916 (19 pages).
Extended European Search Report dated Oct. 27, 2010 in EP Application No. 10177836.3. (7 pages).
Extended European Search Report dated Nov. 10, 2008 in EP Application No. 08005467.9 (7 pages).
Extended European Search Report dated Nov. 11, 2008 in EP Application No. 08103136.1 (6 pages).
Extended European Search Report dated Nov. 12, 2008 in EP Application No. 08005468.7 (8 pages).

(56) References Cited

OTHER PUBLICATIONS

Extended European Search Report dated Nov. 7, 2008 in EP Application No. 07075470.0 (6 pages.
Facsimile Transmission, NHK Research Monthly Report, Dec. 1987(Unknown author). (78 pages).
Fall 2001 TiVo Service Update with Dual Tuner!, TiVo Inc., 9 pages (2001).
Fall, K., A Peer-to-Peer I/O System in Support of I/O Intensive Workloads, PhD Dissertation, University of California, San Diego (1994) 133 pages.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
File History for EPB11940158 (49 pages).
File History for EPB1940157 (43 pages).
File History Opposition EP08103136 (51 pages).
File History Opposition EP0900499n (2 parts; 214 pages).
File History Opposition EP1940159 (51 pages).
File History Opposition EPB1763234 (15 parts; 705 pages).
File History Opposition for EP0976243B (136 pages).
Fixmer, "Windows 98 Feature Combines TV, Terminal and the Internet," New York Times, Aug. 18, 1998 (1 page).
Fortino et al., A Cooperative Playback System for On-Demand Multimedia Sessions over Internet, 2000 IEEE, pp. 41-44.
Fox, A., et al., Adapting to Network and Client Variation Using Infrastructural Proxies: Lessons and Perspectives, Personal Communications IEEE, pp. 10-19 (Aug. 1998) (15 pages).
Fry et al., "Delivering QoS Controlled Continuous Media on the World Wide Web," Proceedings of the 4th International IFIP Workshop on QoS, Paris, Mar. 6-8, 1996 (12 pages).
FTP file listing of doc/resource-guide/front-matter at ftp.cs.toronto.edu (undated) (1 page).
GameSpot: Allied General—Download It Now!!!!, accessed from the internet at http://web.archive.org/web/19970206133452/http://www.gamespot.com/strategy/allie . . . , copyright 1997, printed on Sep. 19, 2013. (1 page).
GameSpot: Allied General at a Glance, accessed from the internet at http://web.archive.org/web/19970205153530/http://www.gamespot.com/strategy/allie . . . , copyright 1996, printed on Sep. 19, 2013. (1 page).
GameSpot's Downloads for Allied General, accessed from the internet at http://web.archive.org/web/19970205060703/http://www.gamespot.com/strategy/allie . . . , copyright 1997, printed on Sep. 19, 2013. (1 page).
Gateway Destination: The PC for the Office and the Family Room, PC Magazine, First Looks section, pp. 39-41, Jun. 11, 1996.
Gavron, Jacquelyn, Moran, Joseph, How to Use Microsoft Windows NT 4 Workstation, 1996, entire document, pp. 1-5.
Gemstar Buys VideoGuide Stake, Consumer Electronics, Feb. 26, 1996, 2 pages.
Gemstar Development Corporation, VCR plus +, 1990 pp. 1-6.
General Instrument Features the Latest Interactive, Revenue-Generating Applications on its Advanced Analog CFT-2200 Platform at the National Cable Television Association's Show, PR Newswire—NY May 4, 1998, 2 pages.
Getting Started Installation Guide, Using StarSight 1 Manual, and Remote Control Quick Reference Guide. Undated. (93 pages).
Goff, Leslie, "Subs Find Lots of Program Guides Online," Multichannel News, vol. 17, No. 19, May 6, 1996, p. 38, Abstract (3 pages).
Goldberg, "A 35 inch Zenith TV premieres Star Sight's onscreen guide," Video, pp. 41. (Apr. 1995). (1 page).
Gondow et al., "The Architecture of Communication Migration and Media State Management for Distributed Applications on Wearable Networks," Information Processing Society of Japan 61st National Conference, Oct. 3-5, 2000, (with English language translation ), 8 pages.
Google News Archives Printout, Mar. 22, 2007. (2 pages).

Growing US interest in the impact of viewdata, Computing Weekly, Jul. 20, 1978. (1 page).
Haas et al., Proceedings of ICIP 2002 Personalized News Through Content Augmentation and Profiling:, Rochester, NY, Sep. 2002. (4 pages).
Hallenbeck et al., "Personal Home TV Programming Guide," Digest of Technical Papers of the International Conference on Consumer Electronics, Jun. 6-8, 1990, pp. 310-311.
Hallenbeck Witness Statement Exhibits PDH1 through PDH35 dated Sep. 30, 2012 (10 parts; 492 pages).
Han et al., "Dynamic Adaptation in an Image Transcoding Proxy for Mobile Web Browsing," IEEE Personal Communications, Dec. 1998, pp. 8-17.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75.
Harmandas V. et al., "Image retrieval by hypertext links"—Proceedings of the 20th Annual International ACM-SIGIR Conference on Research and Development in Information Retrieval Jul. 27, 1997 (pp. 296-303).
Harrison, "A review of multimedia technology and dissemination systems," Electronic Publishing, 7:3:117-146 (1994).
Hartwig, Rautenberg, Bollmann, "Broadcasting and Processing of Program Guides for Digital TV," SMPTE Journal, pp. 727-732, Oct. 1997.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012]. (1 page).
Healey, "Smart TV Recorders Get Another Player", San Jose Mercury News (California), Sep. 11, 1998. (2 pages).
Hedger, "Telesoftware: Home Computing via Broadcast Teletext," IEEE Transactions on Consumer Electronics, vol. CE-25, No. 3, Jul. 1979, pp. 279-287. (11 pages).
Hirtz et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP000581417, ISSN: 0015-0142 (Translation, pp. 1-9).
Hitachi Consumer Electronics Co., Ltd., Certification of market introduction in 1993 of Hitachi Projection TV Model 55EX7K. (1 page).
Hitachi Projection Color TV Operating Guide, for Models 55EX7K, 50EX6K, 50ES1 B-K, and 46EX3B-4K, undated. (38 pages).
Hitachi Service Manual, No. 0021, Projection Color Television, Models 55EX7K, 50EX6K, 50ES1 B-K, 46EX3B-4K, and 46EX3BS-4KS, Aug. 1993. (1 page).
Hjelsvold et al., "Modelling and Querying Video Data." Proc. of the 20th VLDB Conference, Santiago, Chile, 1994 (pp. 686-694).
Hoarty, "Multimedia on Cable Television Systems," Symposium Record Table TV Sessions, 18th International Television Symposium and Technical Exhibition, Montreux, Switzerland, Jun. 10, 1993, pp. 555-567.
Hobbes' Internet Timeline 10.2, by Robert H'obbes' Zakon, from the internet at http://www.zakon.org/robert/internet/timeline/, printed from the internet on Sep. 13, 2012. (29 pages).
Hobbes Internet Timeline, Mar. 22, 2007 (17 pages).
Hodge, et al., Video on demand: Architecture, Systems, and Applications, Selected Papers from the SMPTE Advanced Television and Electronic Imaging Conference, Feb. 4, 1994, pp. 120-132.
Hofmann et al, "Videotext Programmiert Videorecorder," Rundfunktechnische Mitteilungen, Nov.-Dec. 1982, pp. 254-257 (translation attached).
Hofmann, "The Consumer Electronic Bus: An Integrated Multi-Media LAN for the Home," International Journal of Digital and Analog Communication Systems, vol. 4, No. 2, 1991, pp. 77-86.
Holland, "NAPLPS standard defines graphics and text communications," EDN, Jan. 10, 1985, at 179.
Honey, is there anything good on the remote tonight?. advertisement from Multichannel News, Broadband Week Section, p. 168, Nov. 30, 1998.

(56) References Cited

OTHER PUBLICATIONS

Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, (11 pgs).
How Evolve Works, from the Internet at http://www.evolveproducts.com/network.html, printed on Dec. 28, 1998. (1 page).
Hua et al. "An adaptive hybrid technique for video multicast," Proceedings of the International Conference on Computer Communications and Networks, Lafayette, USA, Oct. 12, 1998, pp. 227-234, XP010587052.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation "IBM VideoCharger for AIX Version 2.0 Streaming the power of video to your desktop, pp. 1-5 " Visit the IBM VideoCharger Website at: www.software.ibm.com/data/videocharger/ (undated) (5 pages).
IBM Corporation, "IBM Video Charger Server", pp. 1-2, Jun. 1998.
IBM Interface Device for Conventional TVs to Improve Functionality, IBM Technical Disclosure Bulletin, vol. 36, No. 7, Jul. 1993, pp. 53-54.
IBM Technical Bulletin Interactive Computer Conference Server, vol. 34, No. 7A, Dec. 1991, pp. 375-377.
IBM Technical Disclosure Bulletin, vol. 33, No. 3B, published Aug. 1990. (3 pages).
IEEE 1990 International Conference on Consumer Electronics Digest of Technical Papers, Table of Contents, Jun. 6-8, 1990. (14 pages).
Iizuka, Honbashi, Kuwana, Building Internet TV Guide Service 1 and 2, the 53rd National Conference Proceedings, Japan, Information Processing Society of Japan, Sep. 6, 1996 p. 3-227 to 230.
Ikejiri, et al., "Maruchimedia wo riido sum apurikeishon kaihatu," ("Application Development for Leading Multimedia"), Journal of NTT Technologies, Japan, The Telecommunications Association of Japan, vol. 7, No. 9, Sep. 1, 1995, pp. 48-55.
Imke, Interactive Video Management and Production, Educational Technology Publications, May 1991, http://www.amazon.com/Interactive-Video-Management-Production-Steven/dp/0877782334/ref=sr_1_1?ie=UTF8&qid=1416426739&sr=8-1&keywords=interactive+video+management+and+production&pebp=1416426742553, 2 pages.
Indiana Gazette, Published Feb. 16, 1991, Showing Uniden is on the Market with Included Price. (2 pages).
InfoBeat television program guide website of InfoBeat, Inc. This website is located at www.infobeat.com (as printed from the Internet on Dec. 8, 1997). (33 pages).
Information Technology—Generic Coding of Moving Pictures and Associated Audio Information—Part 6: Extensions for DSM-CC, International Standard First Addition, Sep. 1, 1998 (626 pages).
Inouye et al., "System Support for Mobile Multimedia Applications", Proc. of the 7th Intl. Workshop on Network and Operating System Support for Digital Audio and Video, 1997, pp. 143-154.
Insight Telecast various publications, 1992 and 1993. (10 pages).
Instruction Manual Using StarSight 2, StarSight Telecast, Inc., 1994. (27 pages).
Instructional Manual, "Sonic the Hedgehog," Sega of America, 1992. (11 pages).
Interactivity for the Passive, published in Dec. 6, 1993 issue of Forbes, 5 pages.
Internet User Forecast by Country, Computer Industry Almanac—Press Release, from the internet at http://www.c-i-a.com/internetusersexec.html, printed from the internet on Sep. 13, 2012. (3 pages).
Irven, "Multi-Media Information Services: A Laboratory Study," IEEE Communications Maqazine, vol. 26, No. 6, Jun. 1988, pp. 27-33 and 36-44.
IS-60.3 Physical Layer and Medium Specifications. Part 3-CS Physical Layer & Medium Specification, CX Specification, Revised Mar. 19, 1992, Table of Contents and pp. 1-41 (45 pages).
Ishii, et al, "Clearface: Translucent Multiuser Interface for TeamWorkStation," ECSCW, Sep. 1991, pp. 6-10.
Ishii, et al, "Toward an Open Shared Workspace: Computer and Video Fusion Approach of Team Workstation," Communications of the ACM, Dec. 1991, vol. 34 No. 12, pp. 37-50.
Isobe, et al., "Interactivity in broadcasting and its Application to ISDB Service," IEEE Transactions on Broadcasting, vol. 42:3 (Sep. 1996), pp. 179-185.
ITC Investigation of Certain Products Containing Interactive Program Guide and Parental Control Technology, Investigation No. 337-TA-845, "Commission Opinion" Dec. 11, 2013 (27 pages).
ITC Investigation of Certain Products Containing Interactive Program Guide and Parental Control Technology, Investigation No. 337-TA-845, Complainants' Initial Submission in Response to Commission's Determination to Review the Final Initial Determination Aug. 23, 2013 (55 pages).
ITC Investigation of Certain Products Containing Interactive Program Guide and Parental Control Technology, Investigation No. 337-TA-845, "Complainants' Reply Submission in Response to Commission's Determination to Review the Final Initial Determination" Aug. 30, 2013 (32 pages).
ITC Investigation of Certain Products Containing Interactive Program Guide and Parental Control Technology, Investigation No. 337-TA-845, "Notice of Commission Determination to Review in Its Entirety a Final Initial Determination Finding No Violation of Section 337" Aug. 9, 2013 (6 pages).
ITC Investigation of Certain Products Containing Interactive Program Guide and Parental Control Technology, Investigation No. 337-TA-845, "Notice of the Commission's Final Determination Finding No Violation of Section 337; Termination of the Investigation" Nov. 1, 2013 (4 pages).
ITC Investigation of Certain Products Containing Interactive Program Guide and Parental Control Technology, Investigation No. 337-TA-845, "Respondent Netflix Response to Complainants' Petition for Review" Jul. 12, 2013 (64 pages).
ITC Investigation of Certain Products Containing Interactive Program Guide and Parental Control Technology, Investigation No. 337-TA-845, "Respondent Netflix, Inc.'s Summary of Issues for Its Response to Complainants Petition for Review" Jul. 12, 2013 (6 pages).
ITC Investigation of Certain Products Containing Interactive Program Guide and Parental Control Technology, Investigation No. 337-TA-845, "Respondents Netflix, Inc.'s and Roku, Inc.'s Response to Complainants' Initial Submission in Response to Commission's Determination to Review the Final Initial Determination" Aug. 30, 2013 (43 pages).
ITC Investigation of Certain Products Containing Interactive Program Guide and Parental Control Technology, Investigation No. 337-TA-845, "Respondents' Response to the Commission's Determination to Review the Final Initial Determination" Aug. 26, 2013 (62 pages).
ITC Investigation of Certain Products Containing Interactive Program Guide and Parental Control Technology, Investigation No. 337-TA-845, "Complainants' Opposition to Respondents' Contingent Petition for Review of Final Initial Determination" Jul. 2, 2013 (51 pages).
ITC Investigation of Certain Products Containing Interactive Program Guide and Parental Control Technology, Investigation No. 337-TA-845, "Final Initial Determination" Jun. 7, 2013 (375 pages) Parts 1 and 2.
ITC Investigation of Certain Products Containing Interactive Program Guide and Parental Control Technology, Investigation No. 337-TA-845, "Open Session Transcript" Mar. 5, 2013 (642 pages) Parts 1 and 2.
ITC Investigation of Certain Products Containing Interactive Program Guide and Parental Control Technology, Investigation No. 337-TA-845, "Respondents' Notice of Prior Art" Oct. 12, 2012 (39 pages).

(56) References Cited

OTHER PUBLICATIONS

ITC Inv. No. 337-TA-845: Complainants' Opp to MSD of Invalidity of USP '776, '762, and '709 (redacted) and Complainants' Statement of Facts filed Jan. 14, 2013. (31 pages).
ITC Inv. No. 337-TA-845: Complainant's Post-Hearing Brief (redacted) filed Mar. 22, 2013. (50 pages).
ITC Inv. No. 337-TA-845: Complainant's Post-Hearing Reply Brief (redacted) filed Mar. 29, 2013. (96 pages).
ITC Inv. No. 337-TA-845: Complainants' Pre-Hearing Statement (redacted) filed Feb. 8, 2013. (96 pages).
ITC Inv. No. 337-TA-845: Corrected Respondents' PHS (Parts 1 and 2) (redacted) filed Feb. 25, 2013 (87 pages).
ITC Inv. No. 337-TA-845: Expert Report of Peter D. Hallenbeck filed Dec. 13, 2012. (182 pagegs).
ITC Inv. No. 337-TA-845: Joint Submission Re Claim Constructions and Accused Products (redacted) filed Oct. 2, 2012. (151 pages).
ITC Inv. No. 337-TA-845: Motion for Leave to File Reply ISO MSD re '776, '762, and '709 filed Jan. 18, 2013. (11 pages).
ITC Inv. No. 337-TA-845: Netflix and Roku's MSD of Invalidity of '776, '762, and '709 filed Jan. 3, 2013. (3 parts; 200 pages).
ITC Inv. No. 337-TA-845: Netflix Motion for Summary Determination of Invalidity of '776 filed Jan. 3, 2013. (3 parts; 230 pages).
ITC Inv. No. 337-TA-845: Netflix's Memorandum of Points and Authorities in Support of Motion for Summary Determination of Invalidity Under Section 102(e) of the Asserted Claims of the '776 Patent filed Jan. 14, 2013, (31 pages).
ITC Inv. No. 337-TA-845: Order No. 40 Denying Summary Determination Motion filed Apr. 5, 2013. (6 pages).
ITC Inv. No. 337-TA-845: Public Final Initial Determination on Violation filed Jul. 2, 2013. (3 parts; 370 pages).
ITC Inv. No. 337-TA-845: Respondents' Post-Hearing Reply Brief (redacted) filed Mar. 29, 2013. (24 pages).
ITC Inv. No. 337-TA-845: Respondents' Post-Hearing Statement (redacted) filed Mar. 22, 2013. (50 pages).
ITC Inv. No. 337-TA-845: *Rovi v. Netflix* Complaint and Claim Charts filed Apr. 30, 2012. (129 pages).
ITC Inv. No. 337-TA-845: Rovi's 4th Supp. Response to Netflix's First Set of Interrogatories (Nos. 1, 3, 4, 5, 6, 8, and 1 0) with Attachments A & B (redacted) filed Oct. 9, 2012. (11 pages).
ITC Inv. No. 337-Ta-845: Rovi's Rebuttal Expert Report of R. Griffin (redacted) filed Jan. 9, 2013. (94 pages).
ITC Inv. No. 337-TA-845: Rovi's Responses to Vizio's Second Set of Interrogatories (Nos. 64-150) (CBI) (redacted) filed Nov. 23, 2012. (39 pages).
ITC Inv. No. 337-TA-845: Rovi's Supplemental Response to Netflix's Contention Interrogatories with attachments (redacted) filed Dec. 13, 2013. (57 pages).
ITC Inv. No. 337-TA-845: Third Supp. Responses to Vizio's First Set of Interrogatories (Nos. 1-12, 25-36, 62-63) (redacted) filed Oct. 9, 2012. (6 pages).
iTunes v4-1.pdf, Oct. 2003, version 4.1, 6 pages.
Jaidev, "XSLT—A Wired and Wireless Case Study," http://csharpcomputing.com/XMLTutorial/Lesson15.htm, 6 pages, printed Oct. 14, 2005.
James, "Oracle—Broadcasting the Written Word," Wireless World, Jul. 1973, vol. 79, No. 1453, pp. 314-316.
JiniTM Architecture Overview, by Jim Waldo, from the Internet at http://Java.sun.com/products/jini/whitepapers/architectureoverview.pdf/ printed on Jan. 25, 1999. The document bears a copyright date of 1998. (18 pages).
Judice, "Move Over Cable, Here Comes Video via Voice Lines," Network World, Sep. 1986, p. 26.
JVC Service Manual, 27" Color Monitor-Receiver, Model AV-2771S (U.S.), Jul. 1991. (89 pages).
Kai et al., Development of a Simulation System for Integrated Services Television, Report from Information Processing Society of Japan, Japan, Sep. 13, 1996, vol. 96, No. 90 p. 13-20.
Karon, "Replay to Bow, Instant VCR", Daily Variety, Sep. 8, 1998 (2 pages).
Karstad, "Microprocessor Control for Color-TV Receivers," IEEE Transactions on Consumer Electronics, vol. CE-26, May 1980, pp. 149-155.
Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Kembery, Network based video storage for retrieval over the ISDN, International Conference on Storage and Recording Systems, Apr. 5-7, 1994, pp. 124-128.
Khoo et al., "An Expert System Approach to Online Catalog Subject Searching," Information Processing & Management: An International Journal, vol. 30, No. 2, 1994, pp. 223-238.
Knutsson, et al., "Transparent Proxy Signalling", Journal of Communications and Networks, vol. 3, No. 2, p. 164-174, Jun. 2001.
Komarinski, Anonymous FTP p. 1, May 1, 1995 Linux Journal, entire document (5 pages).
Komarinski, Anonymous FTP p. 2, May 1, 1995 Linux Journal, entire document (2 pages).
Kornhaas, "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574. (4 pages).
Large, "Throw away the books—Viewdata's coming," Guardian, Jan. 10, 1978. (1 page).
Large, "Viewdata, the invention that brings boundless advice and information to the home, also sets a test for the Post Office," Financial Guardian, Jun. 29, 1978. (3 pages).
Larsson, Creating a Serials Database in Access: A Primer for Resource Center Managers, Jun. 23, 1998, accessed Dec. 23, 2011 at http://faculty.washington.edu/larsson/conf/aiha98/primer/reports.htm., 22 pages.
Leftwich et al., StarSight Interactive Television Program Guide, Phase III, Functional/Interactional Architecture Specification Document, Orbit Interaction, Palo Alto, California. (36 pages).
Leftwich et al., StarSight Interactive Television Program Guide, Phase IV, Functional/Interactional Architecture Specification Document, Orbit Interaction, Palo Alto, California, published before Apr. 19, 1995. (88 pages).
Li et al., "Vision: A Digital Library, Proceedings of the ACM Conference on Digital Libraries," Mar. 20-23, 1996, pp. 19-27.
Li, et al., "Distributed Multimedia Systems," Proceedings of the IEEE, vol. 85, No. 7, pp. 1063-1108 (Jul. 1997).
Limongiello, et al. An Experimental Open Architecture to Support Multimedia Services based on CORBA, Java and WWW Technologies, TELECOM Italia Headquarters (undated) pp. 69-75.
Listing of computer code for operating system within the Cable Computer in 1985 (Plaintiff's Exhibit 298). (97 pages).
Listing of computer code for Video HTU Program (Plaintiff's Exhibit 299). (1 page).
List-Mania, published in May 1992 issue of Video Review, 5 pages.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*. (4 pages).
Little et al., "Prospects for Interactive Video-on-Demand," IEEE Multimedia, Fall 1994, pp. 14-24.
Lloyd, "Impact of technology," Financial Times, Jul. 1978. N(2 pages).
Loen et al., "Subscriber Terminal Units for Video Dial Tone Systems," IEEE Network, Sep./Oct. 1995, pp. 48-57.
Louth Automation website (www.louth.com) dated Aug. 1997 (6 pages).
Lowenstein et al., "The Inevitable March of Videotex," Technology Review, vol. 88, Oct. 1985, p. 22.
Lynch's timeline of net related terms and concepts, Mar. 22, 2007 (8 pages).
M-A-COM, Inc., "Videocipher II Satellite Descrambler Owner's Manual," dated Prior Feb. 1986, pp. 1-17.

(56) References Cited

OTHER PUBLICATIONS

Mah et al., "Providing Network Video Service to Mobile Clients," 1993 IEEE, pp. 48-54.
Martins, "Movie and Video Guide—for Palm Powered Handhelds", New York, Net Book, 1992, Landware.com, pp. 1-14. (14 pages).
Mannes, "Smart Screens: Development of Personal Navigation Systems for TV Viewers," Video Magazine, Dec. 1993. (6 pages).
Manual for Internet Explorer 4—Chapter 9—Browser Features and Functionality, Jan. 10, 2008 (34 pages).
Mar. 19, 1985 letter from G. Knapp of CableData to R. Hansen of Weststar Communications, Inc. (Plaintiffs Exhibit 325). N (6 pages).
Markowitz, "Companies Jump on Interactive Bandwagon," Discount Store News, Dec. 6, 1993, pp. 4 and 131.
McKenzie, "Oracle—An Information Broadcasting Service Using Data Transmission in the Vertical Interval," Journal of the SMPTE, Jan. 1974, vol. 83 No. 1, pp. 6-10.
McMurray, "Overview of Dedicated Hosting," Cloud Computing Talk, 1 page, Apr. 24, 1997; retrieved from http://noveltieshere.com/overview-of-dedicated-hosting, Sep. 16, 2014 (1 page).
McNab et al., "A Distributed Digital Library Architecture Incorporating Different Index Styles," IEEE International Forum on Research and Technology Advances in Digital Libraries, Apr. 22-24, 8 pages (1998).
Melton, "The Uniden Super 4800," OnSat magazine, Jun. 10-Jun. 16, 1990, pp. 2-4.
Merrell, "Tac Timer," 1986 NCTA Technical Papers, pp. 203-206.
Miller, "A Scenario for the Deployment of Interactive Multimedia Cable Television Systems in the United States in the 1990s," IEEE, 1994. (5 pages).
Model D9500 Switched Digital Video (SDV) Server, Scientific Atlanta, Apr. 2006. [http://www.cisco.com/en/US/prod/collateral/video/ps9159/ps9195/ps9258/product_data_sheet0900aecd806cec4a.pdf](2 pages).
Money, "Teletext and Viewdata," Butterworth & Co. Ltd., London, 1979 (159 pages).
Mosley, "NAPLPS chip sets, though scarce, satisfy limited US videotex demand," EDN, Mar. 21, 1985, at 57. (4 pages).
Moss, 500 Channels Awe Advertisers, Multichannel News (Apr. 19, 1993), p. 1A (4 pages).
Motorola, Inc.; "Integrated Datacasting Solutions for Digital Television XP-002204351;" Jun. 1999. (13 pages).
MSI Datacasting Systems, TV Communications Journal, 2 pages, Jan. 1973. (2 pages).
Network World, "NetWare users get audited," 11(17), 2 pages (Apr. 25, 1994).
Neue, Digitale Strategien Bericht Von Den 5. Dermastaedter Fernsehtagen, FKT Fernseh Und Kinotechnik, vo. 49, No. 3, Mar. 1, 1995, pp. 135-139, XP000507348, Fachverlag Schiele & Schon GMBH., Berlin, DE ISSN: 140-9947 (5 pages).
Neumann, "WDR Online Aufbau Und Perspektiven Automatisierter Online-Dienste Im WDR," Rundfunktechnische Mitteilungen, vol. 41, pp. 56-66, Jun. 1997. (45 pages).
Nguyen, et al., "Evolving Switched Broadcast Beyond First Generation Deployments," BigBandNet.com, SCTE Cable-Tec Expo Conference Presentation, 2006. [http://www.bigbandnet.com/index.php/tech_whitepaper_evolve.html] (12 pages).
Norton Backup, Version 1.0, User's Guide and reference, published in 1990 (chapters 3 and 4) (18 pages).
O'Brien, Jr., "Physical and Media Specifications of the CXBus," IEEE Transactions on Consumer Electronics, vol. 37, No. 3, Aug. 1991, pp. 357-366.
Ochiai (Random TV: Next-generation TV program watching system with random access media), Information Processing Society of Japan, 56th National Conference Proceedings (3) (1998, first part) Mar. 17, 1998 3-302 to 303 (English translation attached) (6 pages).
Ochiai et al., "@randomTV: A New TV System," NEC C&C Media Research Laboratories, Mar. 17, 1998, pp. 3-302-3-303 (2 pages).
Ohyama et al., Teletext System, National Technical Report, vol. 27, No. 4, Aug. 1981 (includes English Translation). (91 pages).

Okimi, et al., "Shinban ISDN," ("New ISDN Edition"), Japan, Ohmsha, Ltd., First Edition, Oct. 5, 1995, pp. 261-285.
Open TV fur interaktives Fernsehen, Trend and Technik, 9-95 RFE, p. 100. (English language translation attached). (4 pages).
Open TV Launches OpenStreamer™ Technology for Broadcasters to Deliver First Ever Real-Time Digital Interactive Television, from the internet at http:--www.opentv.com-news-openstreamer_press_final.htm, printed on Jun. 28, 1999, the document bears a copyright date of 1999. (2 pages).
Orphanoudakis et al., "I2Cnet: Content-based similarity search in geographically distributed repositories of medical images," Image and Graphics, Citeseer, 1996 (pp. 1-23).
Overview of Pro-Bell/Chyron's MAPP software published on or after Jan. 1999 (45 pages).
Owen, "How dial-a-fact is coming closer to home," The Times, Sep. 30, 1977. (2 pages).
Owen, "Why the Post Office is so excited by its plans for a TV screen information service," The Times, Sep. 26, 1976. (4 pages).
Papers Delivered (Part 1), 61st National Conference, Information Processing Society of Japan, Oct. 3-5, 2000. (6 pages).
Paryzek et al., "Raising the Bar on SDV," CedMagazine.com, Oct. 1, 2006. [http://www.cedmagazine.com/raising-the-bar-on-sdv.aspx] (5 pages).
Patentee's Response to the EESR, filed on Aug. 1, 2006 in European Patent Application No. 05077272.2 (10 pages).
PCT International Preliminary Examination Report, International Application No. PCT/US97/18664, Dec. 7, 1998 (10 pages).
PCT International Search Report and Written Opinion in International Application No. PCT/US2008/009669 dated Jan. 30, 2009 (12 pages).
PCT International Search Report for International Application No. PCT/US2006/047423 dated Jun. 21, 2007 (3 pages).
PCT International Search Report of the International Searching Authority for Related Foreign Application PCT/US2006/049398 (3 pages).
PCT Notification of Transmittal of International Search Report, International Application No. PCT/US00/05887, Aug. 2000 (2 pages).
Peddicord, Ross, "New on TV: You Bet Your Horse," The Sun, Baltimore Maryland Dec. 15, 1994 (1 page).
Periodical RFE, vol. 995, p. 100: Trend and Technology Open TV for Interactive Television (4 pages).
Personal Entertainment Guide-User's Guide, Version 1.0, Copyright 1991 by Lookahead Communications Inc. (82 pages).
Pfister, "Teletext: Its Time Has Come," Prepared for the IGC Videotext-Teletext Conference, Andover, Massachusetts, Dec. 14, 1982, pp. 1-11.
Pham et al "Exploiting Location-Based Composite Devices to Support and Facilitate Situated Ubiquitous Computing," HUC 2000, LNCS 1927, pp. 143-156.
Pogue, "State of the Art: For TiVo and Replay, New Reach," N.Y. Times, May 29, 2003 (4 pages).
Pohlman, House Calls, Video Magazine, vol. 20:6 (Oct. 1996), 2 pages.
Poole, "Demand for Viewdata grows," Sunday Times, Feb. 10, 1977. (3 pages).
Postel, et al., "Request for Comments: 959 File Transfer Protocol," Oct. 1985, entire document (70 pages).
PR Newswire, NextLevel Systems, Inc. And nCUBE demonstrate their integrated near-video-on-demand solution on NextLevel's advanced analog CFT 2200 platform, Dec. 10, 1997 (3 pages).
Premium Channels Publishing Company Inc., Premium channels publishing will market a weekly program guide listing pay TV, cable and broadcast offerings by daypart, Cable Television Business, Nov. 15, 1982, p. 194.
Prevue Channel Sep. 1, 1995 (part 1), Prevue Guide, from the internet at http://www.youtube.com/watch?v=OVuI78nH6RY, retrieved on Nov. 26, 2013, (1 page).
Prevue Networks and OpenTV(R) Agree to Work Together on Deploying Interactive Program Guides Worldwide, from the internet at http:--www.opentv.com-news-prevuefinal.htm, printed on Jun. 28, 1999. (2 pages).
Prevue Networks Guide Brochure, Spring 1984. (2 pages).

(56) References Cited

OTHER PUBLICATIONS

Prevue Networks Guide Brochure, Spring 1994. (22 pages).
Probe XL Brochure, Auto Tote Systems Inc., (Newark, Delaware) (undated) (59 pages).
Proceedings of Patent Infringement Action for European Patent Application No. 05077272.2, Jun. 12, 2009. (668 pagesS).
Prodigy Launches Interactive TV Listing, Apr. 22, 1994, Public Broadcasting Report. (1 page).
Program and System Information Protocol for Terrestrial Broadcast and Cable, ATSC, Dec. 23, 1997, 95 pages.
PTV Recorder Setup Guide, Philips (2000). (68 pages).
Qayyum, "Using IVDS and VBI for Interactive Television," IEEE, Jun. 10, 1996 (11 pages).
Rajapakshe et al., "Video on demand," (last modified Jun. 1995) <http://www-dse.doc.ic.ac.uk/~nd/suprise_95 /Journal/vol4/shr/report.html>. (14 pages).
Ramachandran, "Space-Time Memory: a Parallel Programming Abstraction for Interactive Multimedia Applications, SIGPLAN Notices", vol. 34:8 (Aug. 1999), pp. 183-192. (10 pages).
Randerson, "Let Software Catch the Game for You," New Scientist, Jul. 3, 2004. (3 pages).
Rath et al., "Set-Top Box Control Software: A Key Component in Digital Video," Philips Journal of Research, vol. 50, No. 1/2 1996, at 185.
Rayers, "Telesoftware by Teletext," 1984 IEEE Conference Papers, vol. 240, p. 323.
Raz et al., "What's Ahead for Switched Digital Video," CedMagazine.com, Dec. 1, 2006. [http://www.cedmagazine.com/Article-What-is-ahead-switched-digital-video.aspx] (2 pagtes).
RCA Satellite Receiver User's Guide, Thomson Multimedia Inc. (2001). (80 pages).
RCA User's Guide Color TV with TV Plus + Guide, 1997. (88 pages).
Reaching your subscribers is a complex and costly process—until now, from the Internet at http://www.evolveproducts.com/info.html, printed on Dec. 28, 1998. (1 page).
Realplayer 8 Plus User Manual, Rev. 1, Real Networks, Inc. p. 32 (2000) (4 pages).
Re-Exam Documents for U.S. Appl. No. 90/013,279, filed Jun. 13, 2014, U.S. Pat. No. 7,543,320 (94 pages).
Re-Exam Documents for U.S. Appl. No. 90/013,283, filed Jul. 2, 2014, U.S. Pat. No. 7,162,729 ( 88 pages).
Replay TV 5000 series manual, 2002, entire document (86 pages).
Research Disclosure, No. 329, Sep. 1991, Havant GB, p. 657, XP226205, "Installation of consumer apparatus". (1 page).
Rewind, replay and unwind with new high-tech TV devices, by Lawrence J. Magid, LA Times. This document was printed from the Internet on Jun. 6, 1999 and bears a date of May 19, 1999. (4 pages).
RFC 765—File Transfer Protocol Specification, Jun. 1980 (70 pages).
Rogers, "Telcos vs. Cable TV: The Global View With Markets Converging and Regulatory Barriers Falling, Service Carriers Are Ready to Rumble," Data Communications, vol. 24, No. 13, pp. 75, 76, 78, and 80, Sep. 21, 1995. (8 pages).
Rohde, "Bank Breaks the Database Rules," Network World, an International Data Group Publication, vol. 11, No. 17 (1 page), Apr. 25, 1994.
Roizen, "Teletext in the USA," Society of Motion Picture and Television Engineers Journal, Jul. 1981, pp. 602-610.
Rosch, "New data and information system set for commercial market trial," Telephony, Mar. 20, 1978, at 96 (4 pages).
Rovi et al. v. Hulu, LLC, Central District of California Case No. 12-cv-04756, "Order Denying Hulu's Motion for Summary Judgment That the '906 Patent is Invalid," Feb. 5, 2013 (43 pages).
Rovi et al. v. Hulu, LLC, Central District of California Case No. 12-cv-04756, "Plaintiffs' Opposition to Hulu's Motion for Summary Judgment that the '906 Patent is Invalid" Dec. 17, 2012 (19 pages).
Rovi et al. v. Hulu, LLC, Central District of California Case No. 12-cv-04756, "Plaintiffs' Statement of Genuine Issues in Support of Plaintiff's Opposition to Defendant Hulu LLC's Motion for Summary Judgment that the '906 Patent is Invalid" Dec. 17, 2012 (36 pages).
Rovi et al. v. Hulu, LLC, Central District of California Case No. 12-cv-04756, "Reporter's Transcript of Motion Hearing Jan. 7, 2013" Jan. 16, 2013 (95 pages).
Rovi v. Virgin Media, Approved Judgment, Mar. 26, 2014 (82 pages).
Rovi et al., "Switched Digital Video," Cable360.net, Feb. 1, 2006. [http://www.cable360.net/technology/emergingtech/14909.html]n (1 page).
Rowe, et al., A Continuous Media Player, Proc. 3rd Int. Workshop on Network and OS Support for Digital Audio and Video (Nov. 1992) (11 pages).
Rudnick, U.S. Appl. No. 09/283,681, filed Apr. 1, 1999, entitled Interactive Television Program Guide System Having Graphic Arrangements of Program Event Regions (35 pages).
Ruffler et al., "InfoRadio on Demand, WebTV and digiTaz—Telecommerce Case Studies," May 23, 1996. (8 pages).
Rumbaugh, "Controlling Propagation of Operations using Attributes on Relations," 3rd Annual Conference on Object-Oriented Programming Systems, Languages, and Applications (OOPSLA 88), San Diego, CA, pp. 285-296, Sep. 25-30, 1988 (10 pages).
Ryan, "Free Interactive TV Guide," Google Newsgroup, Alleged Date Sep. 29, 1995. (1 page).
Ryan, "Interactive TV Takes a Corporate Twist," Electronic Engineering Times, Jul. 10, 1995. (3 pages).
Saito et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64. (English translation attached) (32 pages).
Sandringham, St. John "Dress rehearsal for the Prestel show," New Scientist, Jun. 1, 1978, at 586.(3 pages).
Sandsta et al., "Design and Implementation of the Elvira Video Server," Norwegian Computer Science Conference NIK'96 (Norsk Informatikkonferanse), 1996, pp. 259-270.
Sanyo Technical Report, No. 44, vol. 22, No. 1, Feb. 1990 (10 pages).
Savage, "Internet's 'What's on Tonite!' Tells You Just That and More," The News, InfoWatch, May 29, 1995. (1 page).
Schauer: Internet Article, [Online] Sep. 28, 1995, XP002378870, Retrieved from the Internet: URL: www.vision2020.moscow.com/Archives/1995/9509/0058.htlm> [retrieved on Apr. 28, 2006] (1 page).
Schepp et al., "The Complete Guide to CompuServe," Chapter 7, "Iquest and General Information Gathering," pp. 211-258, (McGraw-Hill Osborne Media, Har/Dis edition 1990).
Schlender, "Couch Potatoes! Now It's Smart TV," Fortune, Nov. 20, 1989, pp. 111-116.
Schmuckler, "A marriage that's made in cyberspace (television networks pursue links with online information services)," May 16, 1994, Mediaweek, v4, n20, p. 22 (3). (5 pages).
Schroeder et al. "Scalable Web Server Clustering Technologies", University of Nebraska—Lincoln CSE Journal Articles, Department of Computer Science and Engineering, pp. 38-45, Jun. 1, 2000.
Scully, "Turner backs violence guidelines," HighBeam Research, Broadcasting & Cable (1993) (2 pages).
Scully, "For some, interactive future is now," Broadcast & Cable, Jun. 1993, pp. 77-78.
Scully, Digital Librarian Could Prove PPV Boon, Broadcasting & Cable, Jun. 7, 1993, p. 97.
Sealfon, "High Tech TV," Photographic, Dec. 1984. (2 pages).
Selected pp. from the "BBC Online—Schedules" web page. This web page is located at http://www.bbc.co.uk/schedules/ (as printed from the Internet on Oct. 19, 1999 and being dated as early as May 24, 1997). (6 pages).
Sharpless et al., "An advanced home terminal for interactive data communication," Conf. Rec. Int. Conf. Commun. ICC '77, IEEE, Jun. 12-15, 1977, at 19.6-47.
Sheth et al., "VideoAnywhere: A system for Searching and Managing Distributed Video Assets." SIGMOD Record 28(1):104-109 (1999).
Singru et al., "Framework for Interactive Video-On-Demand Service", Proc. of the IEEE 14th Annual Intl. Phoenix Conf. on Computer and Communications, 1995, pp. 636-642.

(56) References Cited

OTHER PUBLICATIONS

Sistla et al., "Temporal Triggers in Active Databases," IEEE Transactions on Knowledge and Data Engineering, vol. 7, No. 3, Jun. 1995. (16 pages).
Smith et al., "An image and video search engine for the world-wide web"—Proceedings of SPIE, vol. 3022, Feb. 13, 1997 (pp. 84-95).
Smith et al., "Searching for images and videos on the world-wide web," CU/CTR Technical Report #459-96-25 Columbia University, 1996. Accessed at http://www.ee.columbia.edu/dvmm/publications/96/smith96e.pdf on Feb. 17, 2011. (19 pages).
Smith et al., "Transcoding Internet Content for Heterogeneous Client Devices", Proc. IEEE Int. Conf. on Circuits and Syst. (ISCAS), May 1998, pp. 599-602.
Smith et al., "Visually Searching the Web for Content", Columbia University; IEEE; Jul.-Sep. 1997 (pp. 12-20).
Smith, "Digital Video Libraries and the Internet", IEEE Communications Magazine, 37:92-97 (1999) (6 pages).
Snoeren et al., "An End-to-End Approach to Host Mobility" 6th ACM-IEEE International Conference on Mobile Computing and Networking (MOBICOM 2000), Boston, MA, USA, Aug. 2000, pp. 1-12.
SONICblue Incorporated: ReplayTV 4000 User Guide 12.17, Chapter Five: Networking, Sep. 10, 2001; retrieved from the internet: http://www.digitalnetworksna.com/support/replaytv/dowloads/ReplayTV4000UserGuide.12.17.pdf (13 pages).
Sony Digital Satellite Receiver Operating Instructions, SATA1, 60 pages (1995).
Sony Digital Satellite System DirecTV, USSB (May 1995). (6 pages).
Sony SLV-760IIF et al. operating instructions (Sony 2"), published in 1995 (68 pages).
Sorce et al., "Designing a Broadband Residential Entertainment Service: A Case Study," GTE Laboratories Incorporated, undated, pp. 141-148 (1990).
Spangler, "How Time Warner Austin Did Switched Digital," Multichannel News, Jun. 21, 2007. [http://www.multichannel.com/article/CA6454447.html] (2 pages).
*StarSight Telecast v. Virgin Media*day 2, Feb. 28, 2014, 66 pages.
Start Here, Sony, TiVo and DIRECTV (undated). (8 pages).
Startup puts MPEG-2 encoder in fast forward, EE Times (undated) (3 pages).
Statement in an Examination Report dated Aug. 2, 1999 for a counterpart foreign application filed in New Zealand in which the foreign Examiner alleges that he has used "The Internet to access television listings for BBC World television as far back as mid 1996 . . . " (2 pages).
Step Up to the Superhighway, The Sunday Times, Innovation section, p. 6, Jan. 7, 1996. (1 page).
Stickland, "It's a common noun," The Economist, Jun. 5, 1978. (1 page).
Stokes, "The viewdata age: Power to the People," Computing Weekly, Jan. 1979. (2 pages).
Student.Net TV Search & Remind, from the internet at http://web.archive.org/web/19970124213237/http://www.student.net/tv/ and http://web.archive.org/web/19970124214926/www.student.net/tv/serch.cgi?searchTerm=Fri . . . , printed on May 12, 2005 (5 pages).
Submission by Velocity in European patent No. 1099341 (Mar. 19, 2010) (6 pages).
Sun's Next Steps in Digital Set-Tops, article in Cablevision, p. 56, Nov. 16, 1998. (1 page).
Sunada, et al, "Teletext Color Television Receiver Model C-29M950, C26M940," NEG Home Electronics, NEG Giho, 1987. (16 pages).
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's™ Features," undated, 12 pages.
Supplementary European Search Report for Application No. EP 97 91 0985, Feb. 25, 2000 (2 pages).
Supplementary European Search Report for Application No. EP 98 93 5889, Sep. 28, 2001 (5 pages).

Sussman, "GTE Tunes in to Home TV Shopping," PC Week, Jun. 28, 1988, p. C15. (2 pages).
Switched Digital Video & Cable's Looming Bandwidth Crisis: Executive Summary, Heavy Reading, vol. 5, No. 16, Dec. 2007, 4 pages. [http://www.heavyreading.com/details.asp?sku_id=2014&skuitem_itemid=1063&promo_code=&aff_code=&next_url=%2Fdefault.asp%3F]. (4 pages).
Tech Notes: Product Updates from M-A-COM Cable Home Group, "Videocipher Owner's Manual Update," Issue No. 6, Feb. 1986. (19 pages).
Technical White Paper, "Open Tv™ Operating Environment,"(© 1998 OpenTV Inc.), pp. 1-12. (12 pages).
Technological Examination & Basic Investigative Research Report on Image Databases, Japan Mechanical Engineering Organization Int'l Society for the Advancement of Image Software, Japan, Mar. 1988. (127 pages).
Technology: Turn on, tune in and print out—An experimental interactive television service is set to alter our viewing habits, Financial Times (London), Oct. 14, 1993, p. 11. (1 page).
Tedesco, Thomson to produce RCA NC box for NetChannel, Broadcasting & Cable, 127:30, p. 100 (2 pages).
Tedesco, "WebTV Clicks on 'TV Guide'," Broadcasting & Cable, vol. 127, No. 3, Jan. 20, 1997, p. 56.
Tedesco, TV—'Net vendors resist the marketing Web, Broadcasting & Cable, 127:21 (May 19, 1997), p. 55 (2 pages).
Teletext presents the alternative view, Financial Times, Oct. 24, 1977. (2 pages).
Teraoka et al., "Host Migration Transparency in IP networks: The VIP Approach" ACM SIGCOMM—Computer Communication Review, ACM Press, New York, NY, USA, Jan. 1993, pp. 45-65. (21 pages).
The clickTV television program guide website of TVData of Queensbury, New York. This website is located at www.clicktv.com (as printed from the Internet on Aug. 13, 1997/Sep. 1, 1998 (5 pages).
The Columbia House Video Club: Download Software, accessed from the internet at http://web.archive.org/web/19961223163101/http://www.columbiahouse.com/repl/vc . . . , copyright 1996, printed on Sep. 19, 2013. (1 page).
The Evolve EZ Guide. The Remote. Control, from the Internet at http://www.evolveproducts.com/display2.html, printed on Dec. 28, 1998. (1 page).
The History Behind Broadcatch—SmarTV (1989), Broadcatch Technologies, from the internet at http://www.broadcatch.com/smartv.html, Jul. 1989, pp. 1-6, printed from the internet on Aug. 31, 2005.
The New Media and Broadcast Policy: An Investigation & Research Conference Report on Broadcasting Diversification, Radio Regulatory Bureau, Japan Ministry of Posts & Telecommunications, Mar. 1982. (114 pages).
The New York Times Website Article, "2 Makers Plan Introductions of Digital VCR", by John Markoff, Mar. 29, 1999. (2 pages).
The television program guide website of Gist Communications, Inc. of New York, New York. This website is located at www.gist.com (as printed from the Internet on Aug. 14, 1997). (272 pages).
The television program guide website of TV Guide Entertainment Network. This website is located at www.tvguide.com (as printed from the Internet on Aug. 14-22, 1997). (139 pages).
Thesis of Bo Zou "Mobile IDS Protocol: A badge-activated application level handoff of a multimedia streaming to support user mobility" (Aug. 2000) available at the website of the Multimedia Operating System and Networking Group of the University of Illinois. (52 pages).
Thibadeau, "The Question of Standard for Digital Interactive Television," Research Paper, 19 pages (Nov. 1993).
Third Party Submission Under 37 CFR 1.290 filed Jul. 31, 2013, U.S. Appl. No. 13/181,915 (30 pages).
Thomas, "Electronic Program Guide Applications—The Basics of System Design," NCTA Technical Papers, 1994, pp. 15-20.
Three men on a Viewdata bike, The Economist, Mar. 25, 1978. (2 pages).
Time Warner Signs Tulsa Firm to Provide Cable Program Guide, Journal Record, May 25, 1994 (2 pages).

(56) References Cited

OTHER PUBLICATIONS

Today's Stop: What's on Tonite, Oct. 3, 1995, retrieved from the internet at http://internettourbus.com/arch/1995/TB100395.TXT, retrieved on Dec. 9, 2013. (3 pages).
Tolenkin, "Determining Navigation Needs," Telemedia Week, Undated. (1 page).
Transcript of the Deposition of John Roop, Oct. 1996, pp. 186-187.
Trial testimony of Michael Axford, *Prevue Interactive, Inc. and United Video Satellite Group, Inc.* v. *Starsight Telecast, Inc.*, May 9, 1998, pp. 186-187, 295-315, and 352-357. (28 pages).
Tsao et al., "A Novel Data Placement Scheme on Optical Discs for Near-VOD Servers," Interactive Distributed Multimedia Systems and Telecommunications Services Lecture Notes in Computer Science, vol. 1309 (1997), pp. 133-142.
Tsao et al., "An Efficient Storage in Near Video-On-Demand Systems," IEEE Transactions on Consumer Electronics, vol. 44:1 (Feb. 1998), p. 27-32.
TV Guide Magazine dated Feb. 4-10, 1989 (excerpts) (4 pages).
TV Guide movie database Internet web pages printed on Aug. 12, 1999 (9 pages).
TV Guide on Screen Prior Use Transcript of Proceedings, "Violence on Television," House of Representatives, Committee on Energy and Commerce, Subcommittee on Telecommunications and Finance, Jun. 25, 1993. (36 pages).
TV Guide Online Set for Fall, Entertainment Marketing Letter, Aug. 1994. (1 page).
TV Listing Star on the Computer, Central Penn Business Journal/HighBeam Research, pp. 1-4, Mar. 15, 1996.
TV Listings Functional Spec., Time Video Information Services, Inc., undated. (11 pages).
Ueda et al, "Impact: An Interactive Natural-Motion-Picture Dedicated Multi-Media Authoring System," Communications of the ACM, Mar. 1991, pp. 343-350.
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.
United Kingdom: BSKyB to launch integrated personal TV recorder, BBC Monitoring Media, Sep. 11, 2000. (3 pages).
United Media Enterprises, United Media Enterprises (New York, NY) affiliate 'TV Watch/DIP' now provides a monthly satellite print guide with schedules for all satellite and pay services, Satellite News, p. 7, Dec. 24, 1980 (1 page).
Using StarSight 2, published before Apr. 19, 1995n (29 pages).
UVSG Offers System-Specific Web Site Development for OPS, press release of United Video Satellite Group, Apr. 12, 1996. (2 pages).
UVSG Teams With Microsoft on Internet Information Server, press release of United Video Satellite Group, Feb. 22, 1996. (2 pages).
Veith, "Television's Teletext," Elsevier Science Publishing Co., Inc., pp. 13-20,41-51 (1983).
Venditto, "Prodigy for Dummies," IDG Books, pp. 57-63, 213 (1995).
Verknuepfung von TV mit Internet, Funkschau, De, Franzis—Verlag K.G. Munchen, vol. 68, No. 18 Aug. 16, 1996, pp. 70-71, XP 000631189, ISSN: 0016-2841 (Translation, pp. 1-3).
Verma, "Content Distribution Networks—An Engineering Approach", p. 24-49 (16 pages) (2002).
Videocipher Stipulation, May 1996. (5 pages).
VideoGuide, Videoguide User's Manual, (28 pages) (Copyright 1995).
Viewdata and its potential impact in the USA: Final Report/vol. One, The UK Experience, Link and Butler Cox & Partners Limited, Oct. 1978. (129 page).
Viewdata moves in US but GEC may lose out, Computing Weekly, Jan. 25, 1978. (1 page).
Viewdata Service Terminal Specification, British Post Office, Issue 5, Aug. 1978.

von Mayrhauser, "Identification of dynamic comprehension processes during large scale maintenance", IEEE Transactions on Software Engineering, 22(6):424-437 (1996).
VPS weiterentwickelt: Service Uber Videotext, Funkschau Recorder-Programmierung, Nov. 1986, pp. 40-43 with English translation.
Web TV and Its Consumer Electronics Licenses debut First Internet Television Network and Set Top Box, Jul. 10, 1996 <http://www.ohlfs.com/keith/self/webtv/home/HTML/home.license.html>. (6 pages).
Wedlund, E. et al. "Mobility Support using SIP", ACM/IEEE International Conference on Wireless and Mobile Multimedia, pp. 76-82, Aug. 20, 1999.
Welcome to Columbia House Online, accessed from the internet at http://web.archive.org/web/19961221085121/http://www.columbiahouse.com/, copyright 1996, printed on Sep. 19, 2013. (1 page).
Whale, "Identification of Program Similarity in Large Populations," The Computer Journal, vol. 33, No. 2, 1990, pp. 140-146.
What is Jini?, from the Internet at http://java.sun.com/products/jini/whitepapers/whatsjini.pdf, printed on Jan. 25, 1999. (4 pages).
What's on Tonite!, Jan. 28, 1995, retrieved from the internet at http://www.library.georgetown.edu/newjour/publication/whatstonite-tm, retrieved on Dec. 11, 2013. (9 pages).
Whitehorn, "Viewdata and you," Observer, Jul. 30, 1978. (1 page).
Why Jini Now?, from the internet at http://java.sun.com/products/jini/whitepapers/whyjininow.pdf, printed on Jan. 25, 1999. The document bears a copyright date of 1998. (16 pages).
Wikipedia article on CompuServe, Mar. 22, 2007 (7 pages).
Wikipedia article, "Geschichte des Internets," from the internet at http://de.wikipedia.org/wiki/Geschichte_des_Internets, page last modified on Apr. 28, 2012, printed from the internet on May 18, 2012 (17 pages).
Wikipedia article, "Internet Explorer," from the internet at http://de.wikipedia.org/wiki/Internet_Explorer, page last modified on Sep. 9, 2012, printed from the internet on Sep. 13, 2012 (14 pages).
Wikipedia article, "MSN TV," from the internet at http://en.wikipedia.org/wiki/MSN_TV, page last modified on May 15, 2012, printed from the internet on Sep. 13, 2012.
Wikipedia article, "NCSA Mosaic," from the internet at http://de.wikipedia.org/wiki/NCSA_Mosaic, page last modified on Sep. 3, 2012, printed from the internet on Sep. 13, 2012. (2 pages).
Wikipedia—Teletext Excerpt (retrieved Jul. 1, 2013) (18 pages).
Willcox, "WebTV Hardware Suppliers Set Complete Related Roster," Twice, Sep. 29, 1997, p. 34 (2 pages).
Williams, et al., "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Wilson, "Programme delivery control for simplified home video recording," IEEE Transactions on Consumer Electronics, vol. 37:4 (Nov. 1991), pp. 737-745.
Wittig et al., "Intelligent Media Agents in Interactive Television Systems," Proceedings of the International Conference on Multimedia Computing and Systems, Los Alamitos, CA, US, May 15, 1995,-May 18, 1995, pp. 182-189, XP00603484 p. 183, left hand column, paragraph 2, p. 184, right-hand column, paragraph 2 figure 4. (8 pages).
Wolfe, "Beyond the SIPC," Electronic Engineering Times, No. 910, Jul. 15, 1996, p. 41, Abstract (2 pages).
Wolfe, "Microsoft Poses PC Specs.," Electronic Engineering Times, Jul. 8, 1996, Abstract (2 pages).
Yang et al., "Automatic Indexing of News Video for the Content-based Retrieval," SPIE vol. 3422, pp. 176-186. From SPIE Conference on Input/Output and Imaging Technologies, Taipei, Taiwan, Jul. 1998 (11 pages).
Yearling's Free Personalised TV Guide, from the internet at http://www.yearling.com/, Dec. 30, 1996. (15 pages).

(56) References Cited

OTHER PUBLICATIONS

Yoshiaki, Kurata; Syun no Video Kyoyu Site wo Tettei Koryaku Mezase! YourTube Expert (Thorough Analysis of Video Sharing Site in Trend), MacPeople, ASCII, Oct. 1, 2006, vol. 12, No. 10, pp. 201-207. Translation not available. (9 pages).

Yoshida, "Interactive TV a Blur," Electronic Engineering Times, Jan. 30, 1995. (2 pages).

Youtube Website, "YouTube Homepage, Categories browsing", pp. 1-4, (Aug. 26, 2006) http://web.archive.org/web/20060826163534/youtube.com/index>. (4 pages).

Yura et al.; "Design and Implementation of the browser for the Multimedia Multi-User Dungeon of the Digital Museum", Computer Human Interaction, 1998 Proceedings, $3_{rd}$ Asia Pacific, Jul. 15-17, 1998, pp. 1-6 or 44-49.

Zahariadis et al., "Interactive Multimedia Services to Residential Users," IEEE Communications Magazine, 1997, vol. 35, pp. 61-68.

\* cited by examiner

```
<?xml version="1.0" encoding="ISO-8859-1" ?>
<GEO-FENCE>
<GEO-FENCE_ID>1</GEO-FENCE_ID>
<LOCATION_LAT>40.760456</LOCATION_LAT>
<LOCATION_LON>-73.984337</LOCATION_LON>
<SHAPE>CIRCLE</SHAPE>
<DIAMETER>1 mile</DIAMETER>
<TIME>Always</TIME>
</GEO-FENCE>
```

FIG. 9

```
<?xml version="1.0" encoding="ISO-8859-1" ?>
<RULE>
<CONDITIONS>(MUED is within "Geo-Fence 1" 30 minutes
before a show time) AND (the user of the MUED is a HARRY
POTTER fan)</CONDITIONS>
<MUED_ACTION>an offer for 15% off of the purchase of two
tickets for the 7pm showing at the AMC Theatre will be
presented on the MUED</MUED_ACTION>
<HUED_ACTION>No Action</HUED_ACTION>
</RULE>
```

FIG. 14

```
<?xml version="1.0" encoding="ISO-8859-1" ?>
<LATITUDE_LONGITUDE>
<MUED_ID>1</MUED_ID>
<MUED_USER_ID>3</MUED_USER_ID>
<LATITUDE>40.760456</LATITUDE>
<LONGITUDE>-73.984337</LONGITUDE>
</LATITUDE_LONGITUDE>
```

FIG. 16

METHODS AND SYSTEMS FOR PERFORMING ACTIONS BASED ON LOCATION-BASED RULES

CROSS-REFERENCE TO RELATED APPLICATIONS

This application is a continuation of U.S. patent application Ser. No. 13/336,678, filed on Dec. 23, 2011, (currently allowed), which is incorporated herein by reference in its entirety.

BACKGROUND OF THE INVENTION

An overwhelming amount of information and/or content can be presented to users via mobile user equipment devices. Users can find it irritating and frustrating to be inundated with information and/or content not relevant to a user's location and/or personal preferences.

SUMMARY OF THE INVENTION

In view of the foregoing, methods and systems for performing actions based on location-based rules are provided. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified. Based on the location-based rule, the location, and the entertainment profile of the user, the action may be performed.

In some embodiments, the entertainment profile is received from a home entertainment device of the user.

In some embodiments, the entertainment media characteristics define an entertainment media preference of the user.

In some embodiments, determining that the user entered a predetermined range of the location comprises receiving global positioning system (GPS) location data and comparing the GPS location data to GPS location data of the location.

In some embodiments, the location-based rule defines a region of locations.

In some embodiments, the location-based rule defines that the action to be taken is to be performed when the user leaves the location, and the action is related to the location the user left.

In some embodiments, the methods and systems also receive a definition of a location-based rule that is based on an address and a distance from the address.

In some embodiments, the location-based rule defines a time parameter, and the action is performed based on the location-based rule, the location, the entertainment profile of the user, and the time parameter.

In some embodiments, performing the action comprises generating for display, on the mobile device associated with the user, an option for the user pertaining to a media asset corresponding to the location.

In some embodiments, performing the action comprises communicating with a home entertainment device of the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows an example of an XML structure for describing a Geo-Fence in some embodiments of the invention.

FIG. 14 shows an example of an XML structure for defining a rule in some embodiments of the invention.

FIG. 16 shows an example of an XML structure for storing location data in some embodiments of the invention.

DETAILED DESCRIPTION OF EMBODIMENTS

Figure 1:
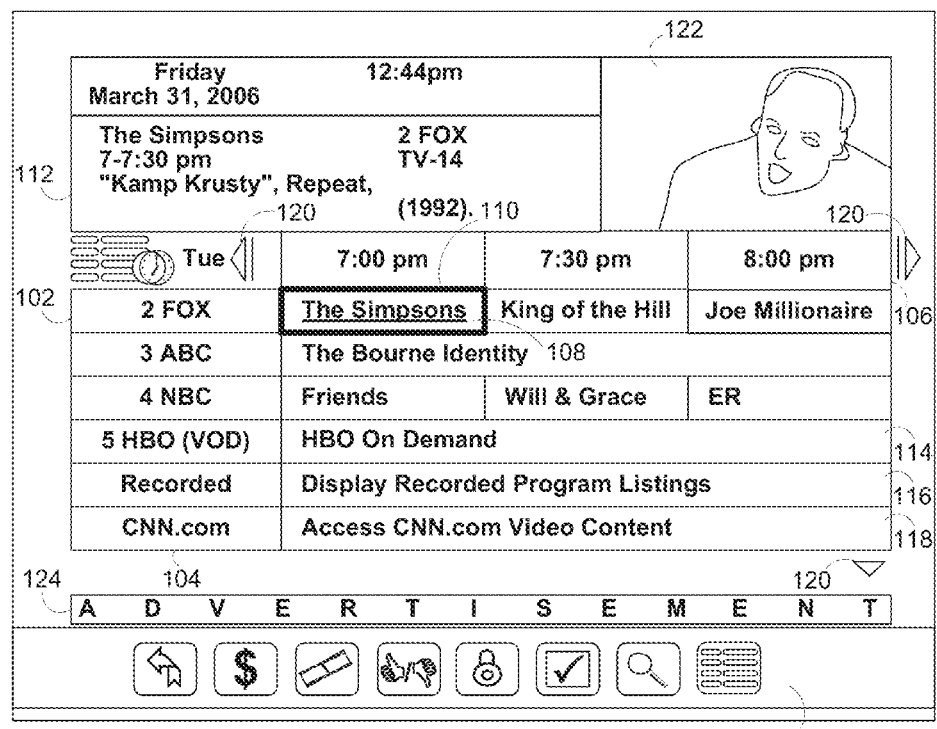
FIGS. 1-2 show various illustrative display screens that may be used to provide media guidance in accordance with some embodiments of the invention.

The invention generally relates to methods and systems for performing actions based on location-based rules. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified. Based on the location-based rule, the location, and the entertainment profile of the user, the action may be performed.

The amount of content available to users in any given content delivery system may be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-ondemand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-PAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. The various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
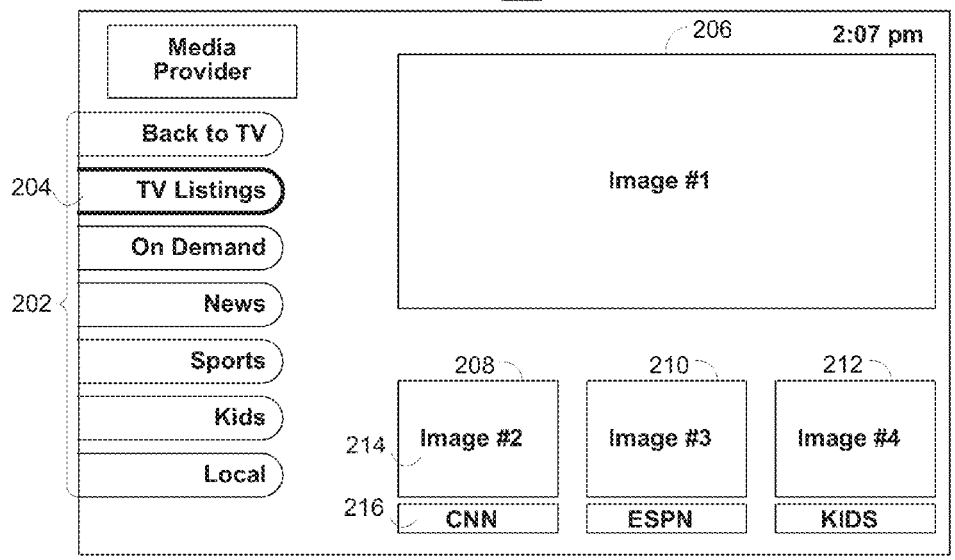

FIGS. 1-2 show illustrative display screens that may be used to provide media guidance data. The display screens shown in FIGS. 1-2 and 7-8 and 10-13 may be implemented on any suitable user equipment device or platform. While the displays of FIGS. 1-2 and 7-8 and 10-13 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or a guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4.

Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
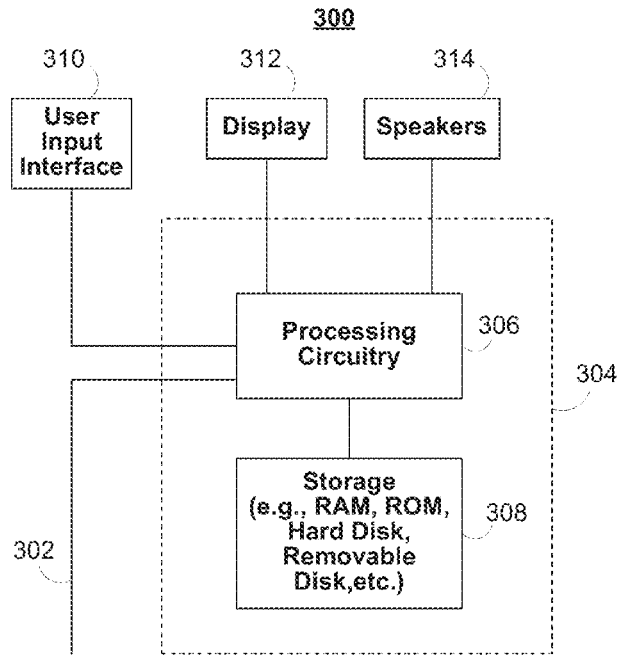
FIGS. 3-4 show generalized embodiments of illustrative user equipment devices, on which a media guidance application may be implemented in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized hardware processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, gesture recognition, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using any other suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
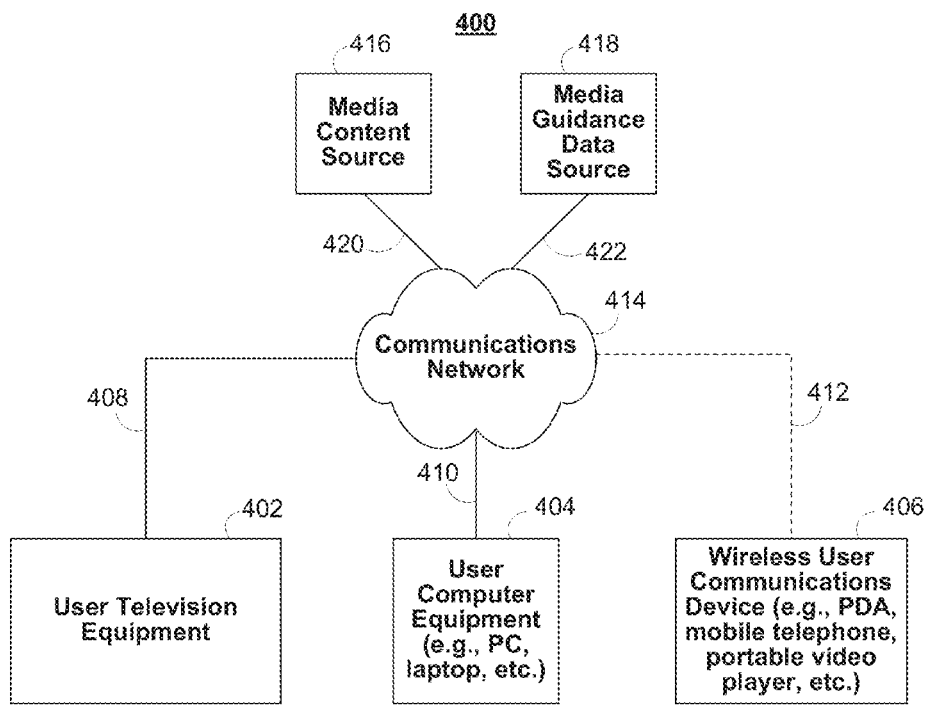

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

Figure 5:
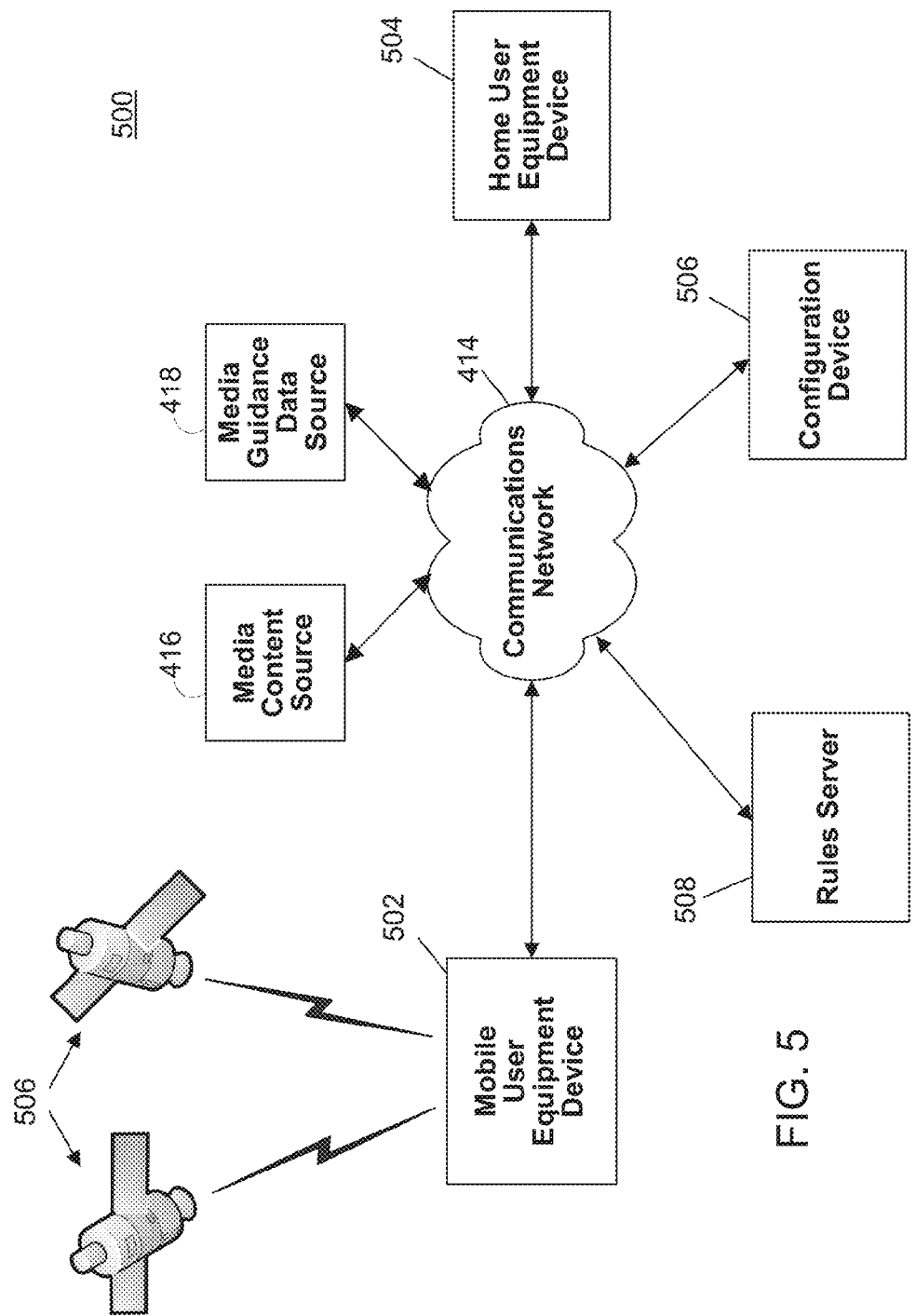
FIG. 5 shows a generalized embodiment of illustrative user equipment devices, on which location-based rules may be implemented in accordance with some embodiments of the invention.

Turning to FIG. 5, an example of a more particular arrangement 500 of some of the components of FIG. 4 that may be implemented in some embodiments is illustrated. As shown, in some embodiments, arrangement 500 may include a mobile user equipment device (MUED) 502, a communication network 414, a media content source 416, a media guidance data source 418, a home user equipment device (HUED) 504, a configuration device 506, and a rules server 508.

MUED 502 may be implemented using any suitable user equipment device in some embodiments. For example, MUED 502 may be implemented using a wireless user communications device 406 (or a device similar to device 406), using a portable variation of user television equipment 402 or user computer equipment 404, etc. In some embodiments, MUED 502 may receive signals from any suitable mechanisms (e.g., such as global positioning system satellites 506, mobile telephone towers, wireless network transceivers, etc.) that facilitate the device determining its location (e.g., using triangulation).

Communication network 414, media content source 416, and media guidance data source 418 may be as described above in connection with FIG. 4.

HUED 504 may be implemented using any suitable device or devices, such as user television equipment 402, user computer equipment 404, and wireless user communications device 406, in some embodiments.

Configuration device 506 can be implemented using any suitable device or devices in some embodiments. For example, configuration device 506 can be implemented using user computer equipment 404 in some embodiments.

Rules server 508 can be implemented using any suitable server, database, or other device capable of performing the functions of rules server 508 as described herein.

Although only a single MUED, a single HUED, a single configuration device, and a single rules server are illustrated in FIG. 5, any suitable number of MUEDs, HUEDs, configuration devices, and/or rules servers may be provided in any suitable application in some embodiments. For example, a MUED may be provided for each person in a household. As another example, multiple HUED's may be located in different portions of a home. As yet another example, each of multiple configuration devices may be provided for different users of those devices (as described below). As still another example, a different rules server may be provided for different geographical areas.

While the terms home, house, household, home user equipment device, etc. are used herein for simplicity and clarity, these terms may apply to any suitable locations including homes and non-homes. For example, one or more HUEDs may be located in a restaurant or a bar, a store, an office, and/or any other suitable location in some embodiments.

In some embodiments, various actions may be taken based on a location of MUED 502 and/or based on a change in location of the MUED. For example, in some embodiments, actions can be taken based on a MUED 502 being within or outside a defined area, or passing into or out of the defined area. Such a defined area may be referred to as being within a "Geo-Fence" in some embodiments. As referred to herein actions the can be taken may include causing the MUED or HUED to display a prompt indicating the entry or exit of the defined area, manually or automatically scheduling a media guidance function (e.g., scheduling a recording, setting a reminder, ordering or purchasing a program) related to content associated with the defined area, transmitting a communication to another user equipment device with instructions to perform a media guidance function related to content associated with the defined area, or any combination thereof.

Figure 6A:
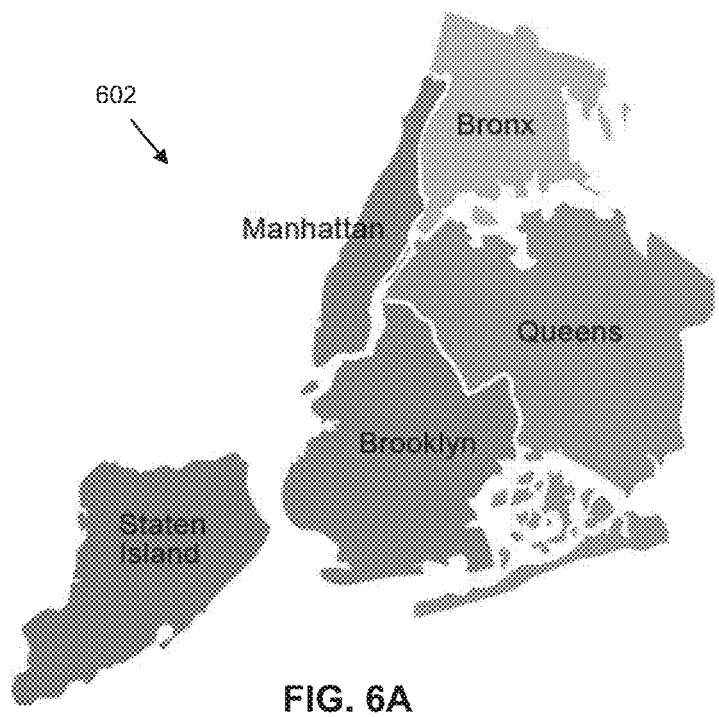
FIGS. 6A and 6B show examples of different types of geo-fenced areas in some embodiments of the invention.
Figure 6B:

Turning to FIGS. 6A and 6B, two examples of Geo-Fences are illustrated. As shown in FIG. 6A, a Geo-Fence 602 can be set up based on one or more city borders such as the borders of New York, N.Y. As demonstrated by this example, in some embodiments, a Geo-Fence can include multiple sub-areas that need not be connected to other areas. As shown in FIG. 6B, a Geo-Fence 604 can also be set up for a much smaller area and have only a simple border (e.g., in this case, a circular border).

Although two particular examples of Geo-Fences that can be used in accordance with some embodiments are illustrated in FIGS. 6A and 6B, any suitable number of Geo-Fences, and any suitably shaped Geo-Fences, can be used in some embodiments.

Figure 7:
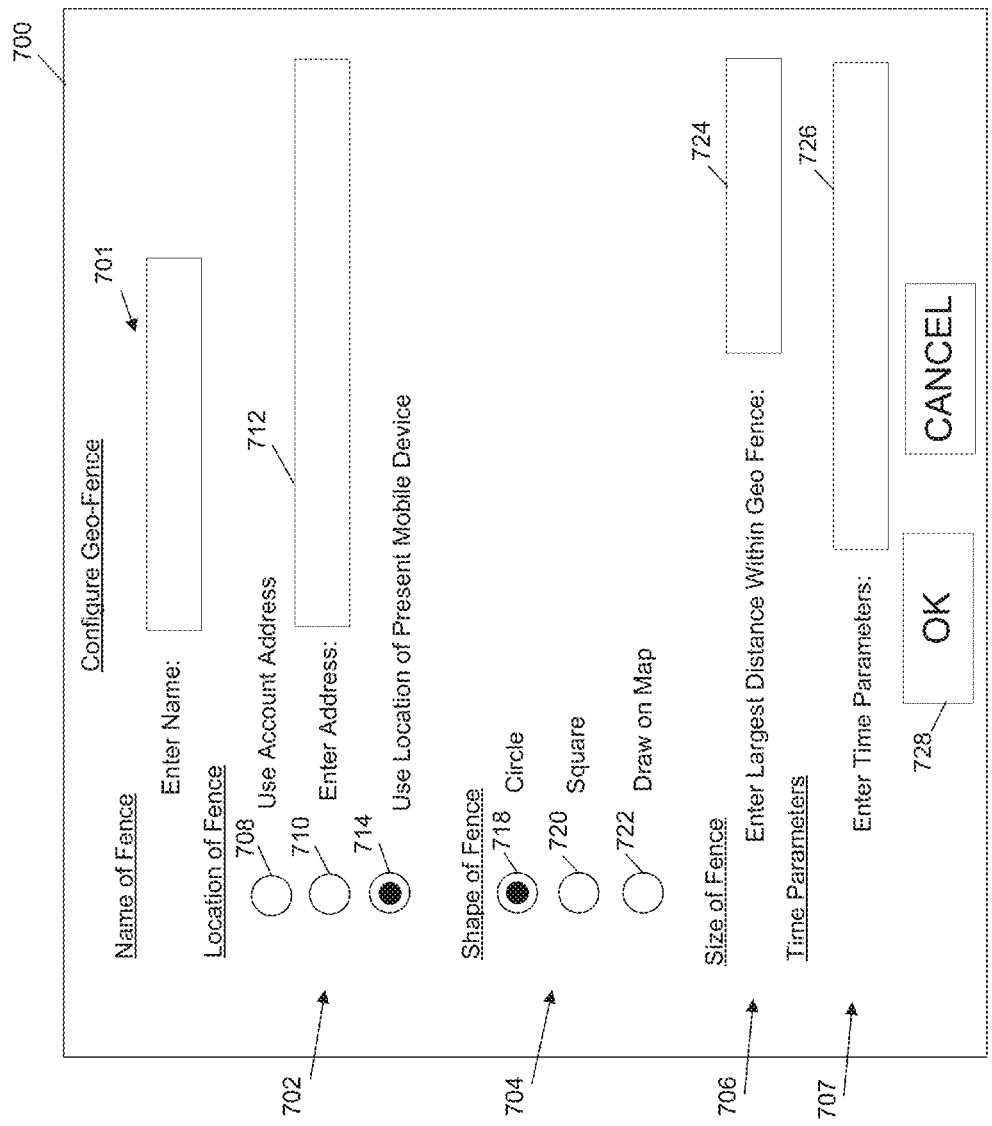
FIGS. 7-8 show examples of user interfaces for configuring a Geo-Fence in some embodiments of the invention.
Figure 8:
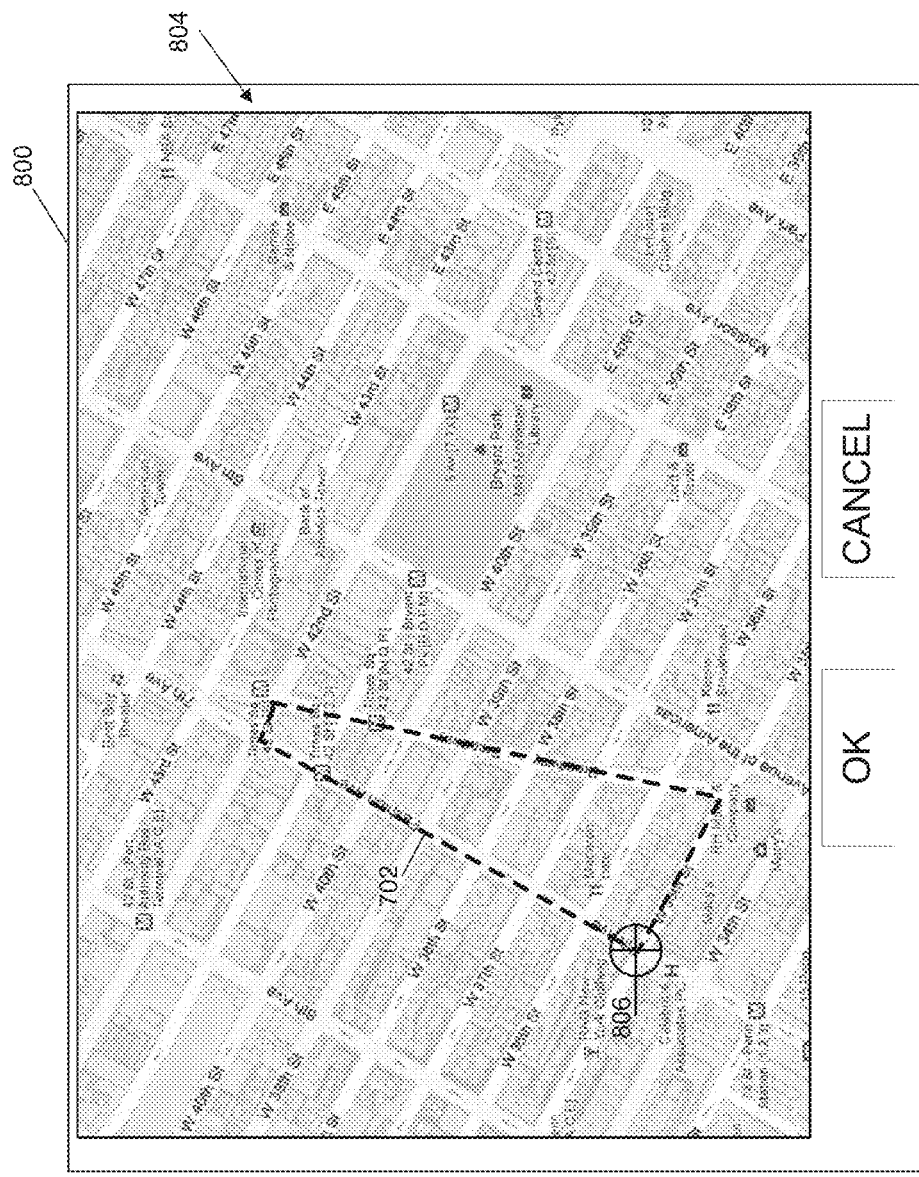

FIGS. 7 and 8 show examples of user interfaces 700 and 800, respectively, that may be presented by control circuitry 304 of configuration device 506 to define a Geo-Fence in some embodiments. As illustrated, a user may specify a name for a Geo-Fence in field 701, a location of the Geo-Fence (e.g., the center of a Geo-Fenced area) using region 702, a shape of the Geo-Fence using region 704, a size of the Geo-Fence using region 706, and time parameters in region 707.

More particularly, in response to receiving user entry of a name in field 701 (e.g., using a user input interface of the HUED), control circuitry 304 may assign a name to the Geo-Fence.

In response to receiving a selection of one of radio buttons 708, 710, and 714, the configuration device's control circuitry may configure the location of the Geo-Fence based on account address of a user (e.g., based on a log-in identification), based on an address entered by the user in field 712, or based on the present location of a mobile device currently being used to access interface 700, respectively. Any other method for determining the location of the Geo-Fence may additionally or alternatively be used in some embodiments.

In response to receiving a selection of one of radio buttons 718, 720, and 722, control circuitry 304 can define the shape of the Geo-Fence as being a circle around the location of the fence, a square around the location of the fence, or a shape to be drawn on a map by the user (as described further below), respectively. Any other suitable shape(s) and any other suitable mechanism for defining the shape may additionally or alternatively be used in some embodiments.

In field 724 of region 706, control circuitry 304 can receive a user's specification of the largest distance within the Geo-Fence. For example, if the Geo-Fence is specified in region 704 as being a circle, the user may specify in field 724 the diameter of the circle. As another example, if the Geo Fence is specified in region 704 as being a square, the user may specify in field 724 a diagonal distance between two opposite corners of the square. As yet another example, if the Geo Fence is specified in region 704 as to be drawn on a map, the user may specify the approximate scale of the Geo Fence in field 724 so that an appropriately sized map can be presented for drawing the Geo Fence. Any suitable distance can be specified in field 724 and the distance can be specified in any suitable units of measure. For example, in some embodiments, the distance can be 50 feet, 5 miles, two city blocks, 2 kilometers, etc. Any other suitable mechanism for specifying a size associate with the Geo-Fence may additionally or alternatively be used in some embodiments.

In field 726 of region 707, control circuitry 304 can receive a user's specification of time parameters for the Geo-Fence. Any suitable time parameters can be used in some embodiments. For example, the Geo-Fence can be specified as always being active, as being active on certain weeks and days, as being active during certain hours, as starting on a certain date, as lasting a certain duration of time, as expiring on a certain date, as never being active, etc.

An example of such a map 804 for drawing a Geo-Fence 802 is illustrated in interface 800 of FIG. 8. This map may be presented by control circuitry 304 of the configuration device upon it receiving a user selection of an OK button 728 after radio button 722 has been selected. Control circuitry 304 may initially display the map based on the location specified in region 702 and the size specified in region 706. Control circuitry 304 may then receive a user drawing of the Geo-Fence in response to: (i) the user moving a cross-hairs icon 806 to a first point on the map using arrow buttons on a user input interface 310; (ii) the user creating a corner of the fence using a single depression of an ENTER button on interface 310; (iii) the user moving icon 806 to a next corner location using the arrow buttons and creating the next corner and a fence portion between the next corner and the previous corner using the ENTER button; (iv) the user repeating (iii) any suitable number of times; and (v) the user creating a fence portion connecting the last corner back to the first corner using a double depression of an ENTER button on interface 310.

Referring back to FIGS. 6A and 7, an interface, such as interface 700 of FIG. 7, may be used to set up Geo-Fence for New York, N.Y. (shown in FIG. 6A) by selecting radio button 710, specifying an address of "New York, N.Y." in field 712, selecting radio button 722, entering the approximate distance across New York, N.Y. in field 724, selecting any desired time parameters in field 726, and outlining the various portions of New York, N.Y. shown in FIG. 6A using an interface 800 as shown in FIG. 8.

Referring back to FIGS. 6B and 7, an interface, such as interface 700 of FIG. 7, may be used to set up Geo-Fence for the circular region of Manhattan (shown in FIG. 6B) by selecting radio button 710, specifying an address at the center of the area (e.g., "525 Broome Street, New York, N.Y.") in field 712, selecting radio button 718, entering the diameter of the area (e.g., 1 mile) in field 724, and selecting any desired time parameters in field 726.

Although the process of setting up a Geo-Fence is described herein as including time parameters, in some embodiments, the time parameters may be omitted.

In some embodiments, any suitable numbers (including none) of Geo-Fences may be set up.

Once set up, each Geo-Fence can be saved to storage 308 of a HUED and/or MUED, to media guidance data source 418, to configuration device 506, to rules server 508, and/or to any other suitable location. The Geo-Fence may be stored in any suitable manner, such as using an XML structure as illustrated in FIG. 9, in some embodiments.

In some embodiments, advertising related content can be presented to a user based on a MUED's location or movement relative to one or more Geo-Fences. More particularly, for example, such advertising related content can include an offer presented on the MUED, an alert presented on the MUED, an advertisement presented on a HUED, and/or any other suitable advertising related content.

In some embodiments, the presentation of this advertising related content can be controlled using one or more rules. For example, such rules may specify one or more conditions that must be met before a corresponding action, such as presenting the advertising related content, can be triggered.

For example, in some embodiments, an operator of a movie theatre may want to advertise a movie showing using a discount offer on tickets to people who are fans of the movie and who are in the area of the theatre shortly before the movie is to be presented. As a more particular example, such a movie could be a HARRY POTTER movie (e.g., "HARRY POTTER AND THE DEATHLY HALLOWS PT 1"), the discount offer could be 15% off of two tickets for the 7 pm showing at the AMC Theatre, and this offer could be presented to anyone who is a HARRY POTTER fan and who is within a half mile of the theatre 30 minutes before the show time.

In such a case, a Geo-Fence can be established one half mile around the theatre, and a rule can be established that specifies that when a MUED is within the Geo-Fence 30 minutes before a show time, and the user of the MUED is a HARRY POTTER fan, an offer for 15% off of the purchase of two tickets for the 7 pm showing at the AMC Theatre will be presented on the MUED.

Figure 10:
FIGS. 10-11 show various illustrative display screens that may be used to present advertising related content on mobile user equipment devices in some embodiments of the invention.

An example of the presentation of such an offer is shown in FIG. 10. As illustrated, an offer 1002 may be presented by control circuitry 304 of a MUED 1004. As also shown, if a user of the MUED is interested in accepting the offer, the user can select CLICK-TO-PURCHASE button 1006 to cause the control circuitry to electronically purchase the tickets from the theatre.

As another example, in some embodiments, a movie-delivery or video-on-demand service (e.g., such as NETFLIX) may wish to promote use of its service by recommending movies for viewing that are related to new-release movies that its subscribers have just seen in particular theatres. As a more particular example, such a new release could be "THE EXPENDIBLES" starring Sylvester Stallone, the relate movies could be the movies in the "RAMBO TRILOGY" (in which Sylvester Stallone also starred), and the recommendation could be to add these related movies to the subscribers' movie queue.

In such a case, a Geo-Fence can be established around one or more movie theatres at which the movie "THE EXPENIDBLES" is playing, and a rule can be established that specifies that when a MUED exits the Geo-Fence area around the time that "THE EXPENDIBLES" finishes, perform an action (e.g., present on the MUED an offer to add the RAMBO TRILOGY to the services queue). In some implementations, the rule may be established that causes the action to be performed when the MUED exits the Geo-Fence area after being within the Geo-Fence area for a predetermined period of time (e.g., 20 minutes). This may avoid inadvertently performing an action that may not be relevant to the user's situation.

Figure 11:
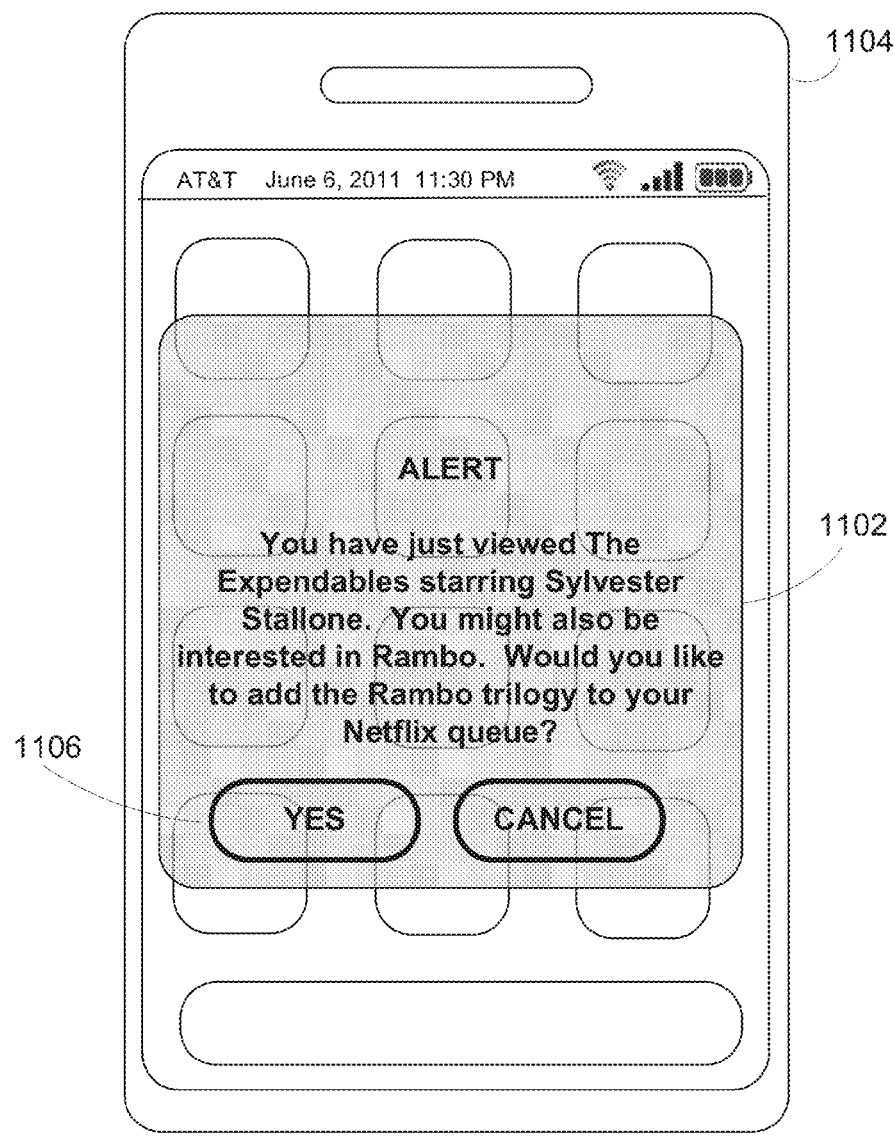

An example of the presentation of such an offer is shown in FIG. 11. As illustrated, an offer 1102 may be presented by control circuitry 304 of a MUED 1104. As also shown, if a user of the MUED is interested in accepting the offer, the user can select YES button 1106 to cause the control circuitry to cause the RAMBO TRILOGY movies to be added to the service's queue.

Figure 12:
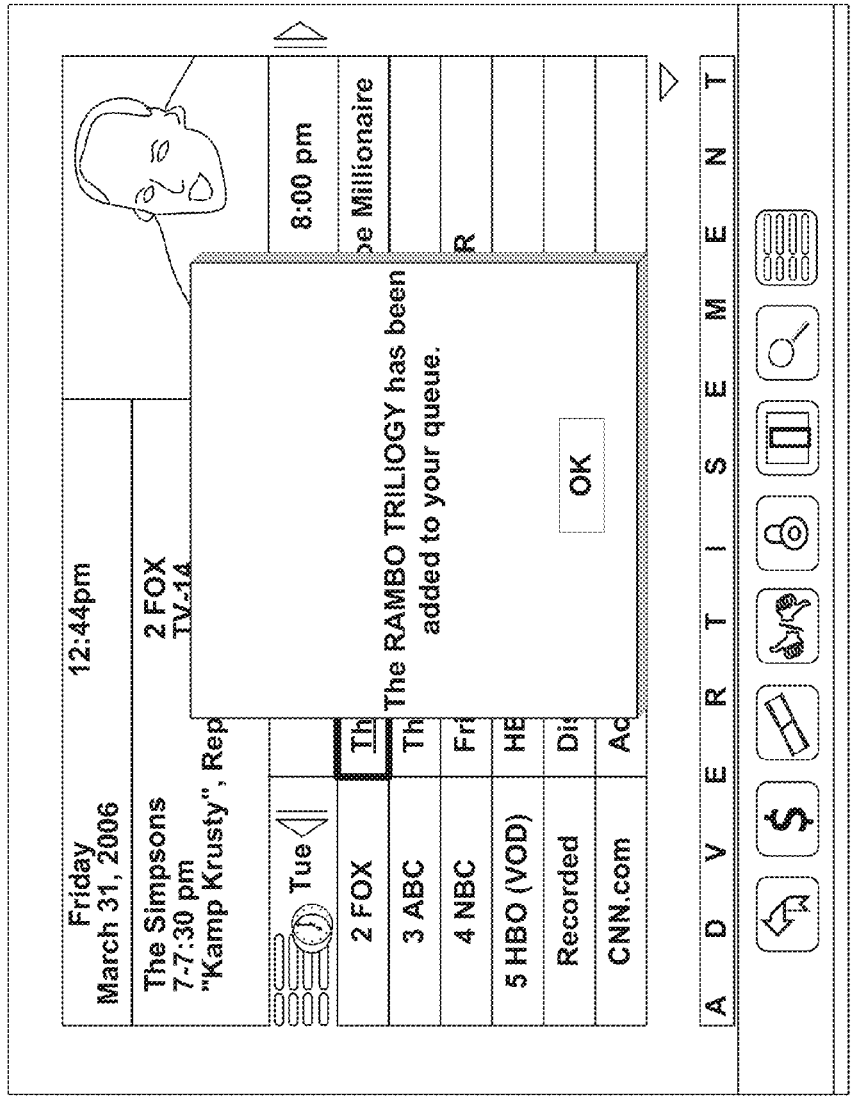
FIG. 12 shows an illustrative display screen that may be used to present advertising related content on a home user equipment device in some embodiments of the invention.

In some embodiments, these rules can additionally or alternatively cause advertising related content and/or any other suitable content to be presented on a HUED of the user of the MUED. For example, as shown in FIG. 12, after accepting an offer (e.g., as presented in FIG. 11), a message may be presented in a media guidance application on the HUED indicating that the RAMBO TRILOGY has been added to the user's queue.

The definitions of these and other examples of rules may be summarized as having a condition and one or more actions for a MUED and/or a HUED as follows:

| Rule | Condition | MUED Action | HUED Action |
|---|---|---|---|
| 1 | (1) MUED is within "Geo-Fence 1" 30 minutes before a show time, AND (2) the user of the MUED is a HARRY POTTER fan | an offer for 15% off of the purchase of two tickets for the 7pm showing at the AMC Theatre will be presented on the MUED | No action |
| 2 | MUED just exited "Geo-Fence 2" around the time that "THE EXPENDIBLES" finishes | An offer to add the RAMBO TRILOGY to the services queue will be presented on the MUED | Present confirmation that movies have been added to queue |
| 3 | MUED just exited "Geo-Fence 2" around the time that "THE EXPENDIBLES" finishes and MUED was located within "Geo-Fence 2" for a predetermined period of time | An offer to add the RAMBO TRILOGY to the services queue will be presented on the MUED | Present confirmation that movies have been added to queue |

If the conditions are met, then the actions for the rule may be performed.

Although the rules illustrated above include time components (e.g., 30 minutes before show time), in some embodiments these time components can instead be implemented using the time parameters of a Geo-Fence. For example, in rule 1, the time component could be removed, and the definition of Geo-Fence 1 could be modified to specify that it is only active 30 minutes before show time.

Although particular examples of rules are shown, any suitable rules and any suitable numbers of rules may be used in some embodiments.

In some embodiments, the presentation of such advertising related content can be configured by advertisers (e.g., such as retail businesses, advertising agencies, business service providers, etc.) using configuration device 506.

Figure 13:
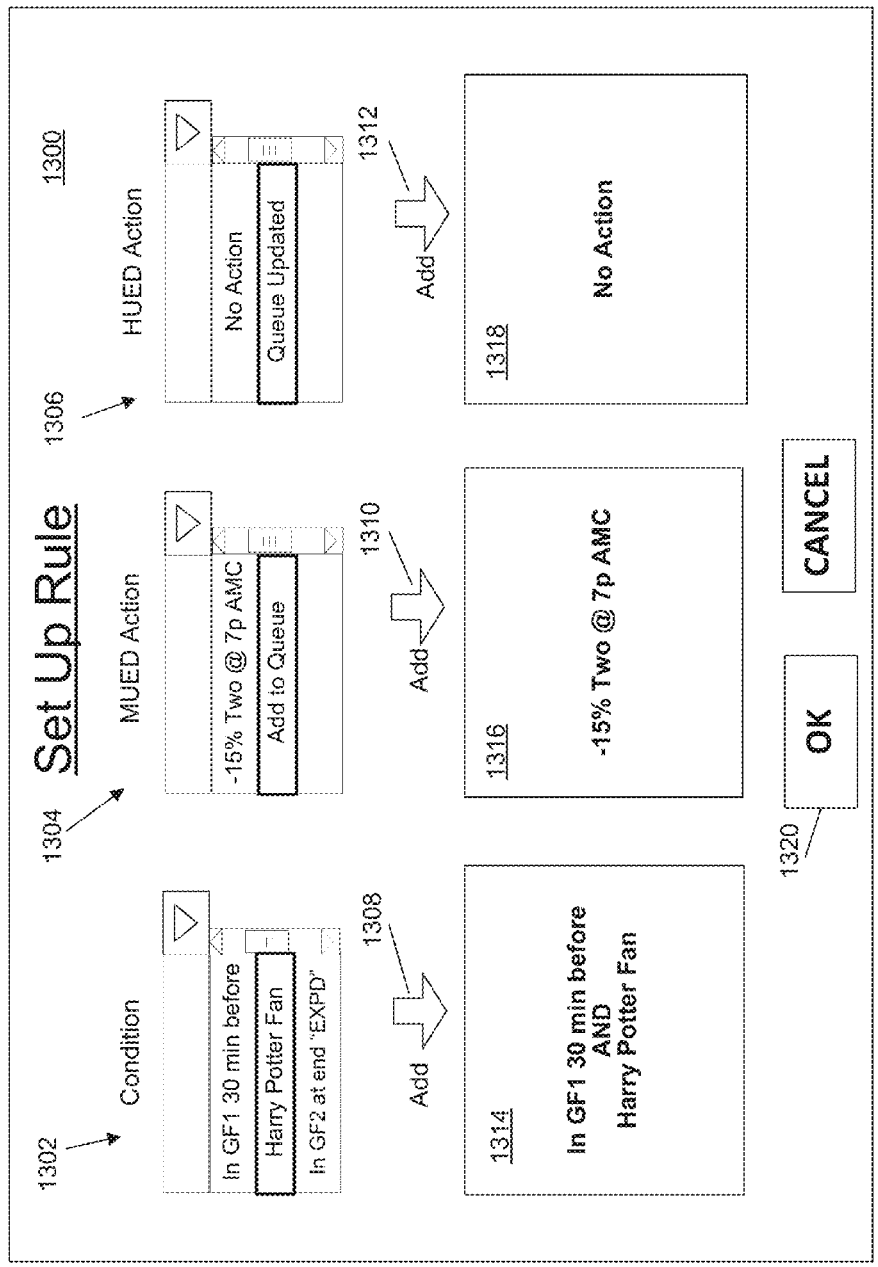
FIG. 13 shows an example of a user interface for configuring a rule in some embodiments of the invention.

Turning to FIG. 13, an example of a user interface 1300 that may be presented by control circuitry 304 of configuration device 506 to set up a rule in accordance with some embodiments is shown. As illustrated, to set up a rule, the control circuitry may receive from a user a selection of a condition from menu 1302. Any suitable condition options may be provided and any suitable number of conditions may be available. Upon receiving a condition selection and a selection of an ADD icon 1308, the condition may be added by the control circuitry to space 1314. Upon a second (or further) selection of a condition and a selection of ADD icon 1308, one or more additional conditions can be added to space 1314 for the rule.

Next, the control circuitry can receive a selection of an action (if any) to be performed at a MUED when the conditions are met. Similarly to the selection of a condition, an action at the MUED can be selected using menu 1304 and icon 1310 so that one or more actions are listed in space 1316. Any suitable actions, any suitable number of actions, and any suitable order of actions can be specified for the MUED in some embodiments.

The control circuitry can then receive a selection of an action (if any) to be performed at a HUED when the conditions are met. Similarly to the selection of a condition, an action at the HUED can be selected using menu 1306 and icon 1312 so that one or more actions are listed in space 1318. Any suitable actions, any suitable number of actions, and any suitable order of actions can be specified for the MUED in some embodiments.

Finally, when a user is done adding a rule, the user can select an OK button 1320 and in response thereto the control circuitry may save the rule in an XML structure such as that illustrated in FIG. 14 in some embodiments.

In some embodiments, in order to facilitate the processing of such rules on the Geo-Fences and the presentation of such advertising related content, one or more processes may be performed in MUED 502, rules server 508, and/or HUED 504. Any suitable processes may be used in some embodiments.

Figure 15:
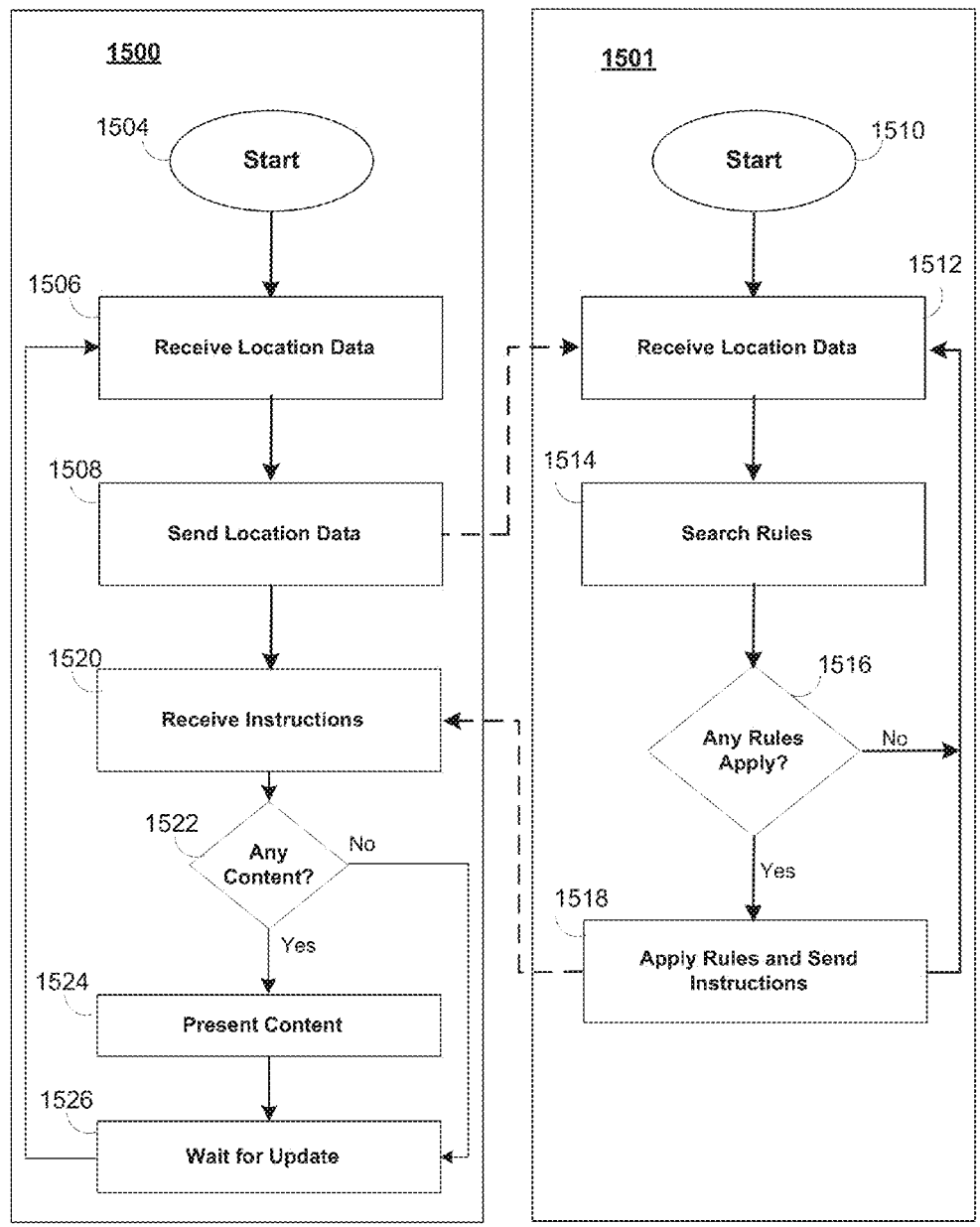
FIG. 15 is a diagram of processes for a mobile device and a rules server in some embodiments of the invention.

For example, in accordance with some embodiments, control circuitry 304 of a MUED 502 and rules server 508 may implement processes such as process 1500 and process 1501, respectively, of FIG. 15.

As shown, after process 1500 begins at 1504, control circuitry 304 of MUED 502 can receive location data at 1506. This location data can be received from any suitable source. For example, this location data can be received from global positioning system circuitry in MUED 502.

In some embodiments, MUED 502 or HUED 504 may include position information circuitry, such as Global Positioning System (GPS) circuitry, location-based services (LBS) circuitry, triangulation circuitry, hybrid positioning systems circuitry, or any other suitable position obtaining circuits or combinations of such circuits. MUED 502 or HUED 504 may use the position information obtained from the position information circuitry to determine the current position or location of MUED 502 or HUED 504. In some implementations, MUED 502 or HUED 504 may obtain the current position or location of MUED 502 or HUED 504 by accessing a social network, such as over the Internet. For example, MUED 502 or HUED 504 may monitor a status update posted to the social network for the user. MUED 502 or HUED 504 may parse the status update for information that identifies a current location of the user (e.g., name of a venue or event the user is attending). In some implementations, MUED 502 or HUED 504 may monitor a status update of a friend of the user on the social network. In particular, MUED 502 or HUED 504 may parse the status update of the friend of the user for information that identifies a particular location or event and the name of the user. In some implementations, MUED 502 or HUED 504 may obtain the current position of MUED 502 or HUED 504 by accessing a calendar associated with the user. In some implementations, MUED 502 or HUED 504 may determine the location of MUED 502 or HUED 504 when the user checks into a location using an application on MUED 502 or HUED 504, such as FACE-BOOK. The application on MUED 502 or HUED 504 may present to the user a list of locations or venues within a predetermined range of the user. The user may select one of the locations or venues in the list to check in and as a result specify to MUED 502 or HUED 504 the location or venue of MUED 502 or HUED 504. This location or venue can be used as the location data received at 1506.

Next, at 1508, the location data can be sent by the control circuitry to the rules server. This data can be sent in any suitable manner. For example, in some embodiments, this data can be sent in an XML structure as illustrated for example in FIG. 16. As shown in FIG. 16, this location data can include an identifier of the MUED, an identifier of the user of the MUED, a latitude value, and a longitude value in some embodiments. Any other suitable data can additionally or alternatively be included.

After process 1501 begins at 1510, this location data may then be received at 1512 by a hardware processor of the rules server.

Next, at 1514, the hardware processor of the rules server can search for rules relating to the location of the MUED. This can be performed in any suitable manner. For example, in some embodiments, the hardware processor can submit a query to a database in its storage containing rules and Geo-Fence definitions in the XML structures illustrated in FIGS. 14 and 9, respectively.

The hardware processor of the rules server can then determine if any rules apply at 1516, and if not loop back to 1512 to wait for the next receipt of location data. Otherwise, the hardware processor can proceed to 1518.

At 1518, any applicable rules can be applied by checking the conditions of the rules and performing any actions specified therein when the conditions are met.

For example, for rule 1 above, at 1518, the hardware processor can determine whether, based on the location data received in 1512, the MUED is within "Geo-Fence 1" 30 minutes before a show time, and whether the user of the MUED is a HARRY POTTER fan. If both of these conditions are met, then the hardware processor can send instructions to the HUED to present an offer for 15% off of the purchase of two tickets for the 7 pm showing at the AMC Theatre.

As another example, for rule 2 above, at 1518, the hardware processor can determine whether, based on the location data received in 1512, the MUED has just exited "Geo-Fence 2" around the time that "THE EXPENDIBLES" finishes. If this condition has been met, then the hardware processor can send instructions to the MUED to present an offer to add the RAMBO TRILOGY to the services queue, and can send instructions to the HUED to present a message in a media guidance application indicating that the RAMBO TRILOGY has been added to the user's queue if and when this is done.

As another example, for rule 3 above, at 1518, the hardware processor can determine whether, based on the location data received in 1512, the MUED has just exited "Geo-Fence 2" around the time that "THE EXPENDIBLES" finishes after being located within "Geo-Fence 2" for a predetermined time period (e.g., 20 minutes). If this condition has been met, then the hardware processor can send instructions to the MUED to present an offer to add the RAMBO TRILOGY to the services queue, and can send instructions to the HUED to present a message in a media guidance application indicating that the RAMBO TRILOGY has been added to the user's queue if and when this is done.

In some embodiments, certain settings data relating to a user's program favorites, programming preferences, favorite artists, etc. (which can be referred to as entertainment media characteristics) can be stored in an entertainment media profile for the user. The rules server may access such entertainment media characteristics (from the entertainment media profile) and any other suitable content, guidance data, preferences, profiles, settings, etc. in checking the conditions of the rules and performing any actions specified therein when the conditions are met. The content, guidance data, preferences, profiles, settings, etc. can be accessed from any suitably location (such as MUED 502, media guidance data source 418, and/or HUED 502) by the rules server. For example, in some embodiments, the rules server may access guidance data from media guidance data source 418.

In the event that no content is to be presented on the MUED, instructions indicating that condition can be sent to the MUED at 1518 in some embodiments.

The instructions sent to the MUED at 1518 can next be received at 1520 and then the control circuitry of the MUED can determine at 1522 if there is any content to be presented. If not, then process 1500 can branch to 1526 to wait for an update period (which can be any suitable duration including none) and then loop back to 1506. Otherwise, the hardware processor can present the content specified in the instructions at 1524. For example, as described above, for rule 1, this content may be presented as illustrated in FIG. 10. As another example, as described above, for rule 2, this content may be presented as illustrated in FIG. 11.

Although not illustrated in FIG. 15, a similar process may be performed in the HUED in which the instructions sent at 1518 may be received, a check may be made to determine if content is to be presented, and if so the content may be presented in accordance with the instructions. For example, as described above, for rule 2, such content on the HUED may be presented as illustrated in FIG. 12.

After content has been presented at 1524, the control circuitry can then continue to 1526 to wait for an update period (which can be any suitable duration including none) and then loop back to 1506.

Although only a single instance of process 1501 and a single instance of process 1502 are illustrated in FIG. 15, any suitable number of each of these processes may be implemented in some embodiments. For example, multiple instances of process 1501 may be implemented on a MUED 502. As another example, multiple instances of a process 1502 may be implemented on a rules server 508.

It should be understood that some of the above steps of the flow diagram of FIG. 15 may be executed or performed in an order or sequence other than the order and sequence shown and described in the figure. Also, some of the above steps of the flow diagram of FIG. 15 may be executed or performed substantially simultaneously where appropriate or in parallel to reduce latency and processing times.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, BLU-RAY discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A method of defining a location based rule, the method comprising:
   receiving, by processing circuitry, a location and a shape, wherein the shape received is one of a circle, a square or a shape drawn on a map, wherein, based on the shape received by the processing circuitry, the processing circuitry is configured to process one of a diagonal distance of the square and the diameter distance of the circle, wherein the diagonal and diameter distances are selected from the group consisting of miles, feet, city blocks, and any unit of measure;
   defining a range of the location based on the location received and the shape received;
   receiving an instruction corresponding to an action to be performed on at least one of a first user equipment device and a second user equipment device, wherein the action is to be performed responsive to detecting a user within the range of the location; and
   storing a location-based rule that comprises the range of the location and the received instruction corresponding to the action to be performed.

2. The method of claim 1, wherein the range is based on city borders.

3. The method of claim 1, wherein the range comprises multiple sub-areas that need not be connected to other areas.

4. The method of claim 1, wherein the range comprises time parameters.

5. The method of claim 1, wherein the location is based on an address received from the user.

6. The method of claim 1, wherein the location is based on a present location of a mobile device currently being used to access a configuration interface.

7. The method of claim 1, wherein the shape includes a largest distance within the range.

8. The method of claim 1, further comprising:
   receiving, by the processing circuitry, a size; and
   further defining the range based on the size received.

9. The method of claim 8, wherein the size is a largest distance within the range.

10. A system for defining a location based rule, the system comprising:
    memory; and
    processing circuitry configured to:
       receive a location and a shape, wherein the shape received is one of a circle, a square or a shape drawn on a map, wherein the processing circuitry is further configured, based on the shape received, to process one of a diagonal distance of the square and the diameter distance of the circle, wherein the diagonal and diameter distances are selected from the group consisting of miles, feet, city blocks, and any unit of measure;
       define a range of the location based on the location received and the shape received;
       receive an instruction corresponding to an action to be performed on at least one of a first user equipment device and a second user equipment device, wherein the action is to be performed responsive to detecting a user within the range of the location; and
       store, in the memory, a location-based rule that comprises the range of the location and the received instruction of the action to be performed.

11. The system of claim 10, wherein the range is based on city borders.

12. The system of claim 10, wherein the range comprises multiple sub-areas that need not be connected to other areas.

13. The system of claim 10, wherein the range comprises time parameters.

14. The system of claim 10, wherein the location is based on an address received from the user.

15. The system of claim 10, wherein the location is based on a present location of a mobile device currently being used to access a configuration interface.

16. The system of claim 10, wherein the shape includes a largest distance within the range.

17. The system of claim 10, further comprising:
    receiving, by the processing circuitry, a size; and
    further defining the range based on the size received.

18. The system of claim 17, wherein the size is a largest distance within the range.

* * * * *